(12) United States Patent
Bare

(10) Patent No.: US 6,577,600 B1
(45) Date of Patent: Jun. 10, 2003

(54) COST CALCULATION IN LOAD BALANCING SWITCH PROTOCOLS

(75) Inventor: Ballard C. Bare, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/228,913

(22) Filed: Jan. 11, 1999

(51) Int. Cl.$^7$ ................................................ G01R 31/08
(52) U.S. Cl. ...................................... 370/238; 370/252
(58) Field of Search .............................. 370/238, 238.1, 370/229, 230, 230.1, 231, 232, 235, 252, 253, 389, 412, 428, 429; 709/241, 238

(56) References Cited

U.S. PATENT DOCUMENTS 5,748,901 A * 5/1998 Afek et al. ............ 395/200.68
5,991,268 A * 11/1999 Awdeh et al. ............... 370/232
6,009,092 A * 12/1999 Basilico ....................... 370/352
6,016,307 A * 1/2000 Kaplan et al. .............. 370/238
6,046,981 A * 4/2000 Ramamurthy et al. ...... 370/232

\* cited by examiner

Primary Examiner—Alpus H. Hsu
Assistant Examiner—Thien D Tran

(57) ABSTRACT

A method for computing cost information associated with a port of a switch in a network of switches. Cost information is computed as a port load factor: a ratio of port latency over available throughput. Port latency is determined as the depth of a queue associated with the port divided by the speed of the port. Available throughput is determined as the speed of the slowest port on a given path associated with the port in question. Preferably, the queue depth is measured in bits and the port speed and available throughput are measured in bits per second. Further, in the preferred embodiment, port latency is computed as a weighted average as ((15×previous latency)+current latency)/16. A higher value for the port load factor indicates a port which is more heavily loaded. The load factor is therefore useful in load balancing among the ports of switches and paths associated therewith.

34 Claims, 19 Drawing Sheets

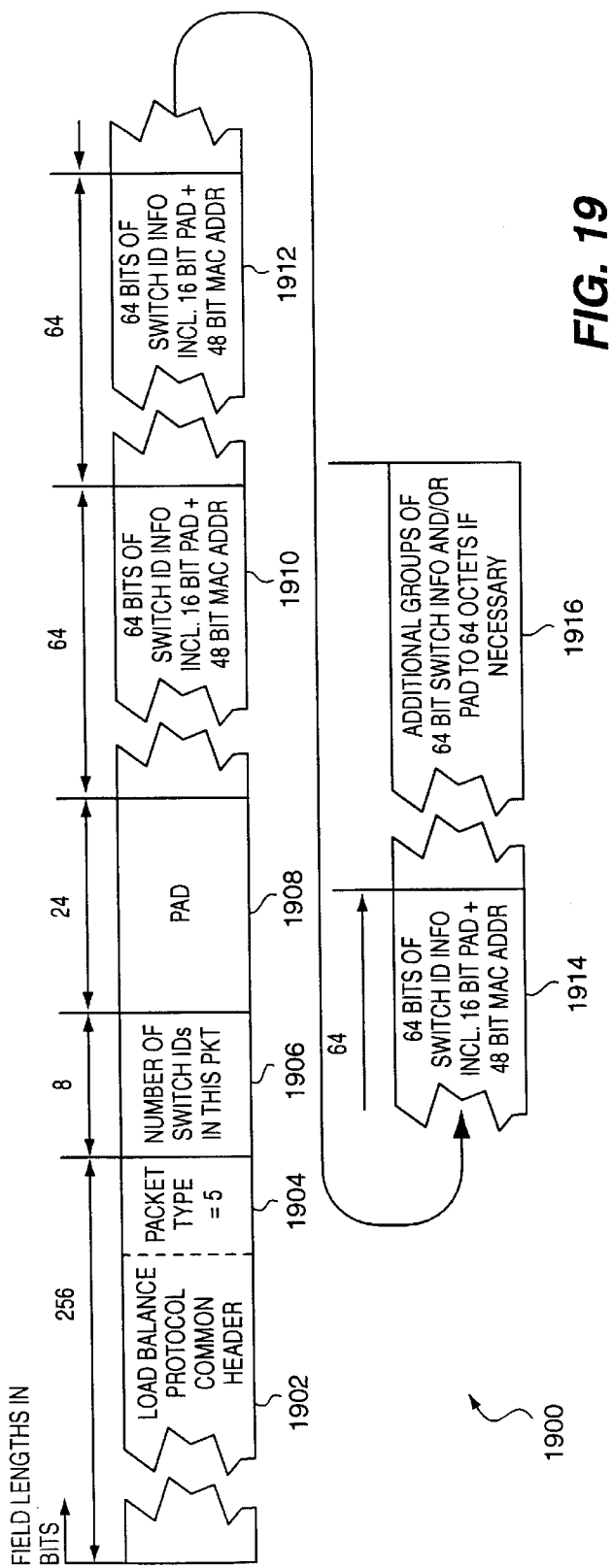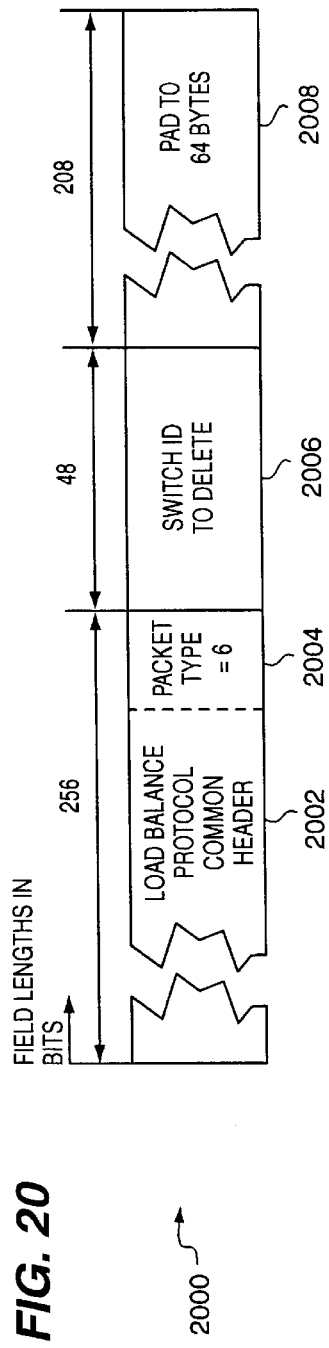
FIG. 19
FIG. 20

COST CALCULATION IN LOAD BALANCING SWITCH PROTOCOLS

RELATED PATENTS

This patent is related to the following commonly owned patents: U.S. patent Ser. No. 09/228,110 entitled Load Balancing Switch Protocols, U.S. patent Ser. No. 09/228,159 entitled Identity Negotiation Switch Protocols, U.S. patent Ser. No. 09/228,890 entitled Cost Propagation Switch Protocols, U.S. patent Ser. No. 09/228,087 entitled Broadcast Tree Determination in Load Balancing Switch Protocols, U.S. patent Ser. No. 09/228,918 entitled MAC Address Learning and Propagation in Load Balancing Switch Protocols, U.S. patent Ser. No. 09/228,992 entitled Path Recovery on Failure in Load Balancing Stitch Protocols, and U.S. patent Ser. No. 09/228,169 entitled Discovery of Unknown MAC Addresses Using Load Balancing Switch Protocols, all of which are hereby incorporated by reference.

BACKGROUND OF THE INVENTION

1. Field of the Invention

The present invention relates to communication networks and more specifically to network switches and associated switch to switch protocols which provide improved bandwidth utilization and load balancing in data processing communication networks having redundant paths between network devices.

2. Discussion of Related Art

It is common in present computing environments to connect a plurality of computing systems and devices through a communication medium often referred to as a network. Such networks among communicating devices permit devices (or users of devices) to easily exchange and share information among the various devices. The Internet is a presently popular example of such networking on a global scale. Individual users attach their computers to the Internet, thereby enabling sharing of vast quantities of data on other computers geographically dispersed throughout the world.

Networked computing systems may be configured and graphically depicted in a wide variety of common topologies. In other words, the particular configurations of network communication links (also referred to as paths) and devices between a particular pair of devices wishing to exchange information may be widely varied. Any particular connection between two computers attached to a network may be direct or may pass through a large number of intermediate devices in the network. In addition, there may be a plurality of alternative paths through the network connecting any two network devices. Present day computing networks are therefore complex and vary in their configurations and topologies.

Most present network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At the lowest level of network communication, such addresses are often referred to as MAC address (Media ACcess address). Network protocols operable above this lowest level of communication may use other addresses for other purposes in the higher level communication techniques. But in most network low level communication levels, operable on the physical link medium, an address is referred to as a MAC address.

In many present commercially available network environments, the network communication medium is in essence a bus commonly attached to a plurality of devices over which the devices exchange. In a simple networking topology, all devices may be attached to a such a bus structured common network medium. Any particular single network medium has a maximum data exchange bandwidth associated therewith. The maximum data exchange bandwidth of a medium is determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards range from approximately 10 Mbit (million bits of information) per second to 1 Gbit per second. Therefore, a single (slow) Ethernet connection, for example, has a maximum data exchange bandwidth of approximately 10 Mbit per second.

In present network computing environments, a number of devices are used in addition to interconnected computing systems to efficiently transfer data over the network. Routers and switches are in general network devices which segregate information flows over various segments of a computer network. A segment, as used herein, is any subset of the network computing environment including devices and their respective interconnecting communication links. As noted above, a single computer network communication link has a maximum data transfer bandwidth parameter defining the maximum rate of information exchange over that network. Where all devices on a computer network share a common network medium, the maximum bandwidth of the computer network may be rapidly reached. The overall performance of the networked computing environment may be thereby reduced because information exchange requests may have to await completion of earlier information exchange requests presently utilizing the communication link.

It is often the case, however, that particular subsets of devices attached to the network have requirements for voluminous communication among members of the same subset but less of a requirement for information exchange with other devices outside their own subset. Though standard switch features generally do not include identifying such logical groupings of devices, some enhanced switching features do permit such logic to be performed within a switch device. For example, some enhanced switch features include the concept of defining and routing information based on virtual LAN (VLAN) definitions. In a VLAN, a group of devices may be defined as logically being isolated on a separate network although physically they are connected to a larger network of devices. VLAN features of enhanced switches are capable of recognizing such VLAN information and can route information appropriately so that devices in a particular VLAN are logically segregated from devices outside the VLAN.

For example, the financial department of a large corporation may have significant information exchange requirements within the financial department but comparatively insignificant needs for data exchange with other departments. Likewise, an engineering group may have significant needs for data exchange within members (computing systems and devices) of the same engineering group but not outside the engineering group. There may in fact be multiple of such subsets of devices in a typical computing network. It is therefore desirable to segregate such subsets of devices from one another so as to reduce the volume of information exchange applied to the various segments of the computer network.

In particular, a switch device is a device that filters out packets on the network destined for devices outside a defined subset (segment) and forwards information directed between computing devices on different segments of a networked computing environment. The filtering and forwarding of such information is based on configuration information within the switch that describes the data packets to be filtered and forwarded in terms of source and/or destination address information (once address locations are "learned" by the switch(es)).

Network switch devices and protocols associated therewith are also used to manage redundant paths between network devices. Where there is but a single path connecting two network devices, that single path, including all intermediate devices between the source and destination devices, represent a single point of failure in network communications between that source and destination device. It is therefore common in network computing environments to utilize a plurality of redundant paths to enhance reliability of the network. Multiple paths between two devices enhances reliability of network communication between the devices by allowing for a redundant (backup) network path to be used between two devices when a primary path fails.

FIG. 1 shows an exemplary, simple networked computing environment in which multiple paths exist for communication between devices A 100, B 102, and C 104. These exemplary network devices are each attached to one of a plurality of switches (S1 106, S2 108, S3 110, and S4 112). Each device has multiple possible paths to each of the other two devices. For example, device A 100 may exchange information with device C 104 through any of three possible paths (via switches S1 106 and S4 112, respectively). The first exemplary path is a direct path connecting device A 100 directly to device C 104 through a port on switch S1 106 and a port on switch S4 112. A second path is through switch S1 106 to switch S3 110 and then through switch S4 112. A third path is via switch S1 106, switch S2 108, and switch S4 114. These three paths may be used as redundant communication paths connecting the two devices A 100 and C 104. Where a first path fails, the second path or third may be activated to assume responsibility for exchange of information between devices A and C. In like manner, there are three paths for communication between devices A 100 and B 102 and between devices B 102 and C 104.

Where redundant paths are available in such network computing environments, it remains a problem to effectively utilize the full available bandwidth. It would be desirable to utilize all redundant paths in parallel so as to increase the available communication bandwidth between two communicating devices. Where only a single path is used, the maximum bandwidth for exchange of information is limited to that of a single communication link. Where, on the other hand, all redundant links are used in parallel, the maximum communication bandwidth is increased by the number of links used in parallel. For example, as shown in FIG. 1, the communication bandwidth between any of the devices could, in theory, be increased by up to a factor of three.

However, as presently practiced in the art, protocols used among switch devices (e.g., S1 106 through S4 112) render such parallel communication paths unusable. Switches 105 through 112 as presently practiced in the art often use a protocol commonly referred to as "spanning tree" to discover the existence of redundant communication paths as known to a network of switches. The spanning tree protocol is described in detail in a proposed IEEE standard P802.1p entitled *Standard for Local and Metropolitan Area Networks Supplement to Media Access Control (MAC) Bridges. Traffic Class Expediting and Dynamic Multicast Filtering.*

The spanning tree protocol as implemented in switches broadcasts (more precisely multicasts) information from the switch out to all devices that recognize the selected multicast address connected to paths from the switch. A multicast message is one which is directed to all devices rather than to a particular destination address on the network. The information in the multicast message describes the address forwarding information known to that switch. From such information shared among all the switches, each switch can derive the various paths in the network. Each switch device so attached to the multicasting device receives the information and forwards (multicasts) the message to each device attached to it (except the path from which it directly received the message), and so on. If such a multicast message returns on a path to the originating device, a loop must exist among the paths connecting the various switches. To reduce the number of messages generated on the network by virtue of such multicast messages, the spanning tree protocol requires that redundant paths so discovered be disabled. In a large network without spanning tree protocol to disable redundant paths, received multicast messages can "cascade" from each receiving switch to all other attached switches. The volume of such cascading messages may grow rapidly or even exponentially. Such multicast messages exchanged among the switched may in fact require a substantial portion of the available communication bandwidth of the network. Such conditions are often referred to as "broadcast storms."

The spanning tree protocol therefore requires the disabling of redundant paths to avoid broadcast storms. Only when a path is known to have failed will a redundant path be enabled and used for the exchange of data. The spanning tree protocol therefore precludes aggregation of the available bandwidth to improve communication bandwidth by using multiple redundant paths in parallel. FIG. 2 is a block diagram of the same exemplary network of FIG. 1 where three communication links 114 between the switches have been disabled to prevent loops in the network and the resultant broadcast storm otherwise inherent in the spanning tree protocol.

Another problem with the spanning tree protocol arises from the fact that a preferred path may be unavailable due to the need to disable paths that cause loops among the switches. For example, as shown in FIG. 2, the preferred path between switches S1 106 and S4 112 may be the direct one which is disabled. To leave this direct communication link enabled would permit loops in the paths among the switches. Rather, a more circuitous route through switches S1, 106, S3 110 and S4 112 must be used to exchange information between switches S1 106 and S4 112. The spanning tree protocol does not assure that the best path between two switches will be left enabled. Rather, it merely attempts to assure that some path between switches is available, specifically, a relatively minimal path connecting all switches—a spanning tree.

The spanning tree protocol therefore precludes maximizing use of available bandwidth in a network of switches.

Some switches have provided a partial solution to this problem by using a technique known as "trunking." Where there are multiple paths directly between two switches, the multiple paths serve as redundant communication paths but are trunked by the switches and treated logically as though they were a single path with higher maximum bandwidth. FIG. 3 is a block diagram of the same exemplary network environment of FIG. 2 wherein a plurality of communication paths between switch S1 106 and S3 110 are trunked. The communication path between switches S1 106 and S3 110 is therefore capable of using the trunked paths between them as though they were a single connection in terms of the spanning tree protocols. Since the redundant paths are treated as a single path for purposes of the spanning tree protocols, they need not be shut down to preclude broadcast storms.

However, trunking does not address the bandwidth issue in a broad sense. Rather, the trunking technique is only applicable where the multiple paths are between a particular pair of switches. The bandwidth limit is merely shifted from that of a single communication link to that of the number of communication links supported by a single switch.

It is a further problem that by precluding use of redundant links between switches, the spanning tree protocol also precludes the ability to balance communication loads among the redundant paths between switches. Where such multiple paths are allowed to simultaneously operate, it would be desirable for the switches to distribute the packet exchange communication among them over such multiple paths. Such distribution, often referred to as load balancing, further enhances the ability of the network to optimize the utilization of available throughput in the network of switches. Underutilized paths may be used to offload packet communication on overloaded paths.

It is therefore a problem in present networks of switches to simultaneously operate redundant paths between switches of the network to thereby maximize utilization of available bandwidth and to thereby communicate among the switches to balance communication loads over redundant paths.

In order to balance the loads over redundant paths, it is desirable to propagate cost information among switches of a network. A switch may, for example, detect that a particular path through the network of switches is heavily loaded with packets to be switched. Where the network topology and protocols permit, it would be desirable in such a case to redirect portions of the packet traffic handled by the overloaded switch to alternate paths less heavily loaded. Large network systems often have multiple alternate routes available for use to transmit packets from one switch to another.

It is generally known to use estimated costs associated with paths among the switches. However, as presently practiced in the art, such estimates represent poor models of actual performance of the path. Rather, estimated cost calculations as presently practiced are often fixed values. The estimated costs therefore do not respond to changes in the network traffic through the ports of the switches.

It is a particular problem to efficiently compute a meaningful cost value representative of the actual cost of passing a packet through a particular switch or more generally over a particular path. Further it is a problem to compute and estimate simply such that it may rapidly adapt to bursts in the switch path usage. It is evident from the above that a need exists for improved cost calculations to estimate the performance of paths in a switch network.

SUMMARY OF THE INVENTION

The present invention solves the above and other problems, thereby advancing the state of useful arts, by providing network switch devices and associated switch to switch protocols which permit the operation of multiple links throughout the network involving multiple switches, and which provide for improved utilization of the aggregate bandwidth of all paths in the network. Further, the present invention provides a technique for computing cost values for port/link performance which is at once simple and effective.

By permitting parallel use of all communication paths and switches in the network, the present invention improves scalability of network communication bandwidth as compared prior techniques. The aggregate bandwidth capability within the entire network may be increased by simply adding additional communication paths and associated switches.

In particular, the present invention includes a method for calculating a cost value associated with each path in the network. The cost calculation methods of the present invention are simple yet accurate in their modeling of performance factors in the path's communication performance. The cost calculation methods of the present invention include two components: a latency component and a throughput component. The latency component provides an accurate estimate of the processing time required by a switch to process a received packet for purposes of forwarding it to its destination. The throughput component is a measure of the data transfer capability of the communication links along a path of the switch network.

The latency component computes a present latency value for an outbound port of a switch as the depth of the queue of outbound packets divided by the port speed. The weighted average is then computed from the present latency value and a number of previous latency values. The present latency and hence the weighted average are computed periodically within each switch. This outbound latency is then adjusted by a multiplication factor when the switch queue for the port is full and therefore packets are rejected or otherwise dropped by the switch. The latency component for an inbound port is computed in like manner except that the port speed used for the latency computation is that of the fastest port of the switch which returns to the originating switch of a packet. The queue depth used in computing outbound port latency is that of the port on which the packet was received. In computing the inbound port latency, the queue depth of the port on which the packet will be forwarded is used. In the preferred embodiment, the switch polls each of its ports to compute the updated latency therefore once per second.

The throughput component of a given path is computed as the speed of the slowest port (communication link) along the path.

The two components are combined into a port load factor as the ratio and throughput. The port load factor (a cost value) is propagated throughout the network of switches so as to inform all switches of the costs associated with transmissions on each port of each switch of the network.

The port load factor (PLF) is then useful in each switch for selecting a preferred port for forwarding of a packet through a switch to an ultimate destination. The switch selects a port which will forward the packet toward the intended destination and which has the "best" PLF value associated therewith. Where the PLF values are identical for multiple choices available to a switch, any of several "tie breaking" selection techniques may be employed. Preferably all switches employ the same tie breaking selection technique so as to minimize the potential for causing a packet to loop through the network switches.

In addition, the inbound link costs associated with a switch is added to all outbound costs propagated from that switch. This technique permits the cost estimation to rapidly adapt to overutilization of particular network paths due to bursty traffic.

Still further, the statistical estimation model used by the present invention is simple to compute as compared to prior techniques. The switch CPU can therefore re-compute the cost information estimates more frequently. The higher frequency calculation improves the accuracy of the estimates to more closely follow actual link performance including bursts of message traffic. Yet another advantage of the techniques of the present invention arise in computing the costs associated with a group port (i.e., trunked lines). The statistical model of the present invention simplifies modeling of the performance of the group port (i.e., trunked lines as a group) as well as the individual paths which comprise the group.

The above, and other features, aspects and advantages of the present invention will become apparent from the following descriptions and attached drawings.

BRIEF DESCRIPTION OF THE DRAWINGS

FIG. 19 is a diagram of a broadcast add packet used in determining a pruned broadcast tree in accordance with the present invention.

FIG. 20 is a diagram of a broadcast delete packet used in determining a pruned broadcast tree in accordance with the present invention.

DETAILED DESCRIPTION OF THE PREFERRED EMBODIMENTS

Figure 1:
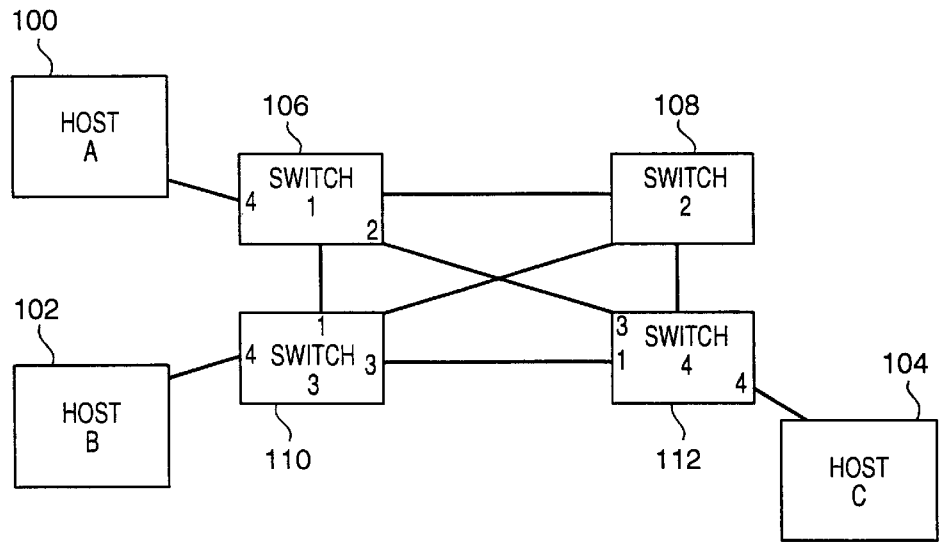
FIG. 1 is a block diagram of a typical switch network having redundant paths connecting a network of switches and associated hosts all of which may be simultaneously operable in accordance with the present invention.
Figure 2:
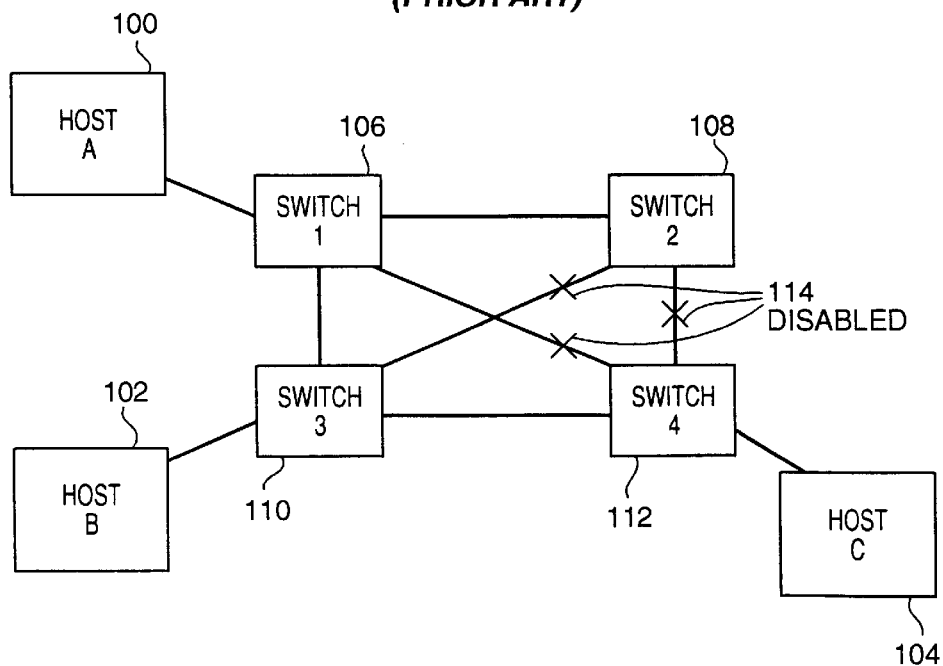
FIG. 2 is a block diagram of a switch network similar to that of FIG. 1 but wherein the spanning tree protocol has disabled redundant links.
Figure 3:
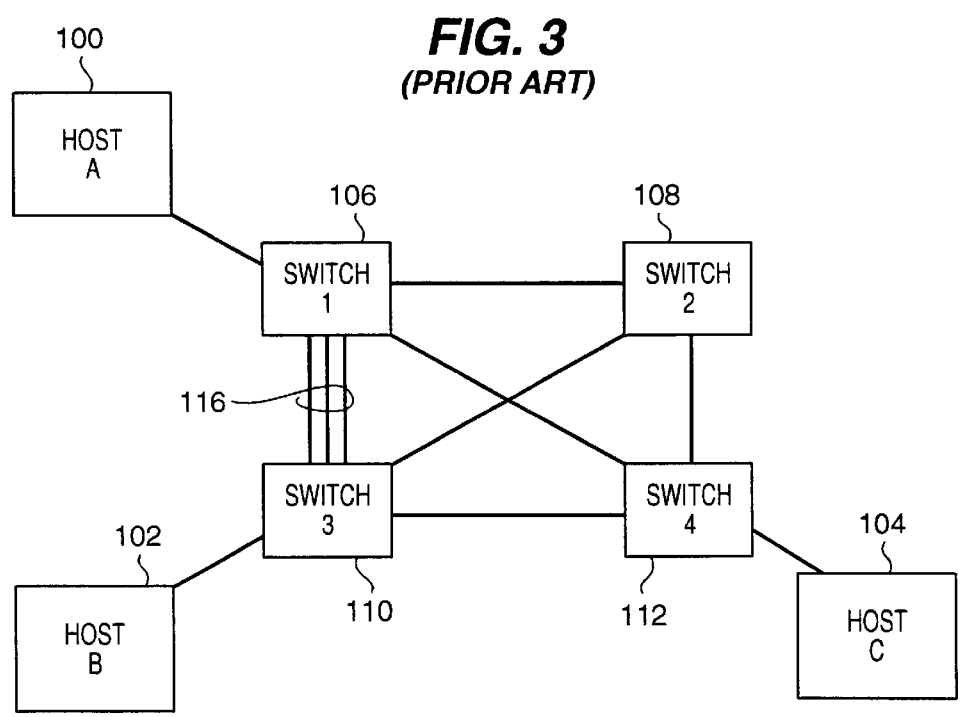
FIG. 3 is a block diagram of a switch network similar to that of FIG. 1 but in which one path between two switches uses trunked lines to improve throughput.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

1. Introduction

The invention of this application is a new switch-to-switch protocol for controlling switches operable in accordance with the protocol. The protocol enables load balancing communication traffic over multiple active switches in a network. As compared to prior techniques, such as the spanning tree protocol, the load balancing protocols of the present invention permit more efficient utilization of available bandwidth in the communication network. Such switches operable in accordance with the present invention are referred to herein simply as "switch" or "load balancing switch." A preferred embodiment of this protocol is discussed in detail below. The goals of load balancing addressed by this preferred embodiment, together with those not addressed, are summarized below:

1. To distribute packet loads fairly across all the load-balancing switch paths.
2. To allow any arbitrary interconnection of switches to automatically load balance across all the links for all traffic. Each source-destination pair will use a single path, and the larger the number of source-destination pairs, the better the load balancing. Broadcast and Multicast packets will also cross multiple links, although loading will not change the path with time. Failure of a link, recovery of a failed link, or discovery of a newly activated switch, will force a choice of new broadcast paths.
3. To recover from any link failure by shifting the load to links that are still up, but without the delay incurred with the standard spanning-tree protocol.
4. To require no user configuration other than on or off.
5. To be completely compatible with layer 3 switching, VLANs, VLAN tagging and legacy switches, and switches running spanning-tree protocol.
6. To be completely independent of any level 3 protocol.

2. Concept Overview

FIG. 1 depicts a simple example of a meshed switch topology. In this example, if Host 100 sends out broadcast packets to find Host 104, the broadcasts will very quickly start looping and duplicating as the broadcasts are repeated out each port. This broadcast storm is prevented with spanning-tree protocol bu shutting down all but one path through this network.

When the preferred embodiment protocol is used, packet streams will be fairly distributed across all possible paths, with an effort to keep latency the same across all paths. The path picked will be based on cost. Those paths with lowest cost will have more traffic added than those with higher cost. The cost determination will be defined based on latency and throughput. The alternate paths and cost information will be discovered and passed between the switches using the preferred embodiment protocol.

Flooded packets (those generally sent out all available port such as broadcast and multicast packets) will also flow down potentially different paths based on the edge switch from which they initially entered the load-balance domain. These broadcast paths are normally set up as links are initialized in the load balance domain, and once setup, do not change unless a link break occurs. This simplifies the protocol and hardware requirements on the switches but still uses all the links for these packets. Broadcast control features such as layer 3 proxy replies and RIP/SAP filtering will complement this feature by preventing the need for many of the broadcasts from crossing the load balance domain in the first place. Unicast packets with an unknown destination MAC address are handled with a MAC address discovery procedure and are not broadcast through the switch domain.

The basic idea of the preferred embodiment protocol is that all switches pass information between themselves so that they can learn the cost to one another of handling additional traffic. All links between the switches must be point-to-point. A point-to-point link is one which connects exactly two devices, one at each end of the link. A multi-point link, by contrast, acts more as a bus where all devices are attached to a common link and monitor for their specific assigned address. If non-point-to-point links are used, the protocol will discover this and shut down all but one link, in much the same way as the spanning-tree protocol. Each switch will keep a table of the costs for all paths to a given switch. The cost associated with a path is with respect to packets transmitted from a first switch, a source switch, to a second switch, a destination switch, via zero or more intervening switches and communication links. The MAC address of the source switch is referred to as the source address and the address of the destination switch is referred to as the destination address.

When a new source address is learned on a switch at the edge of the network (edge of the load balance domain), it will inform all the other switches of this new host address and the fact that the switch can get there. All the switches in the domain then load this new MAC address into their respective switching tables and use the their cost calculations for the given edge switch to determine on which port to send any packets destined for this new address.

Since the cost to get to a given edge switch will vary with time, the preferred embodiment protocol updates the costs periodically so that new sources learned may take a different path than those learned earlier. When source addresses time-out and are relearned, they may take a different path than during their previous instantiation depending on link loads at the current time. The load balancing aspects therefore occur when a statistically large sample of source-destination pairs have paths set up through the network.

As an example assume that all the links in FIG. 1 have the same cost. Using the preferred embodiment protocol the following link paths would be used as the different hosts communicate:

Host 100 to Host 102 . . . in port 4 switch 106, out port 1 switch 106, in port 1 switch 110, out port 4 switch 110.

Host 100 to Host 104 . . . in port 4 switch 106, out port 2 switch 106, in port 2 switch 112, out port 4 switch 112.

Host 102 to Host 104 . . . in port 4 switch 110, out port 3 switch 110, in port 1 switch 112, out port 4 switch 112.

This path sequence would be impossible with the spanning-tree protocol because the links traversed would define a loop, forcing the protocol to shut one of them down. Spanning-tree would force all the traffic on a single link for at least part of the path.

In the preferred embodiment protocol, flooded packets with a given source MAC address are sent out a pruned tree such that all switches in the domain will receive the packets once via a single best path. The protocol will create the single best path.

There are many subtleties in the preferred embodiment protocol to prevent out-of-sequence packets when links go down and to insure convergence of the paths chosen before they are used. All this and much more is discussed in the following sections. The preferred embodiment protocol is intended to be used on high-speed LAN switches (10 megabit links or greater). If it is used on WAN links or links with very high latency (point-to-point round trip latency>0.5 seconds), some of the time values defined below would need to be changed. The protocol also is intended for use in a LAN backbone build with 2 to 200 switches. The protocol leverages previous experiences with OSPF, RIP and serves to obviate the difficulties and limitations that routing protocols impose.

Packet switches, in general, use a general purpose microprocessor (CPU) to perform management of switch addressing information and to perform the requisite packet forwarding to move received packets to an intended destination. To perform at the required speeds in high performance networks, switches also incorporate custom circuits specifically designed to assist the CPU in performing its packet switching.

Figure 32:
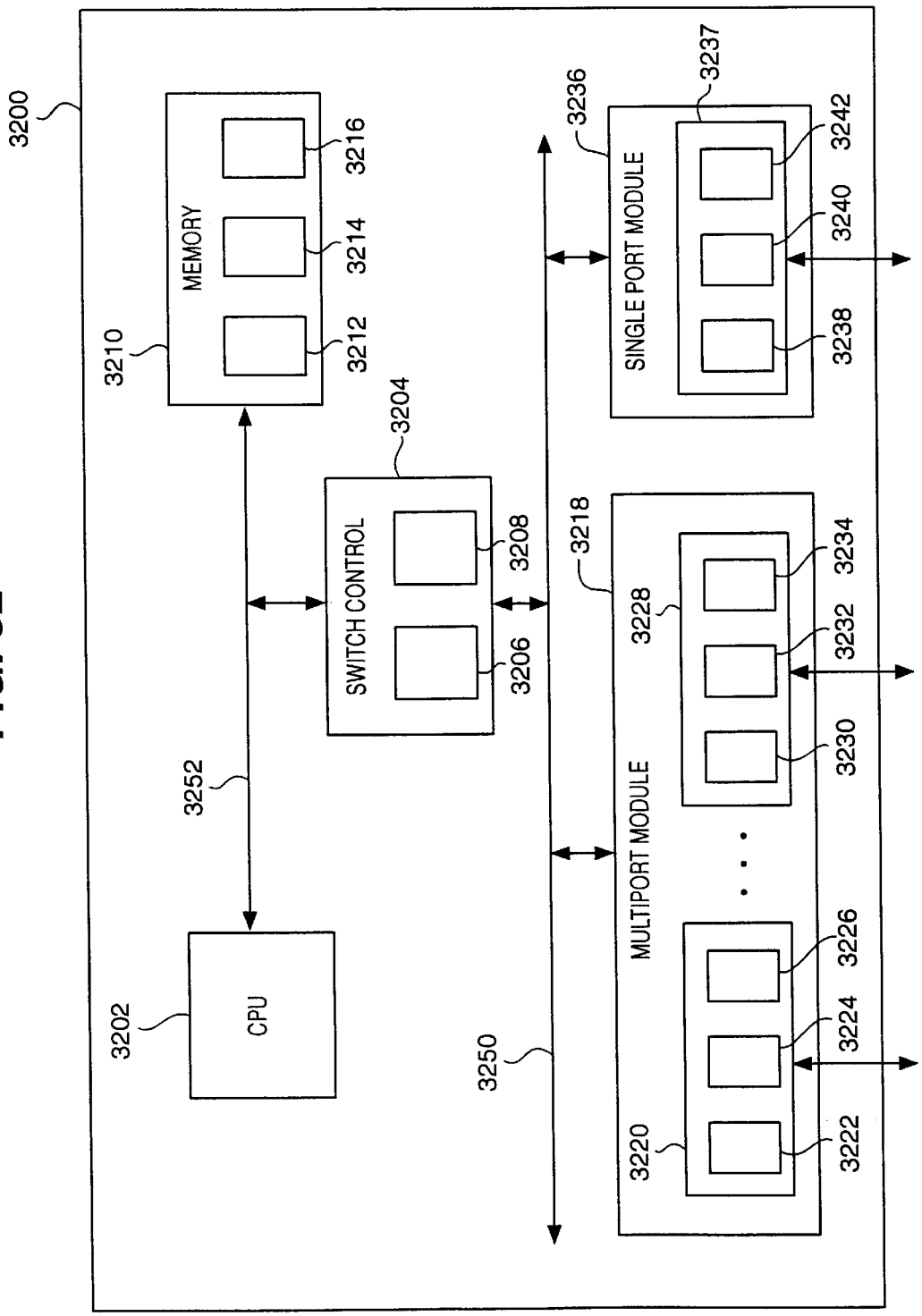
FIG. 32 is a block diagram of the design of an exemplary packet switch operable in accordance with the present invention.

FIG. 32 is a block diagram of a packet switch 3200 operable in accordance with the present invention to permit load balancing over redundant, simultaneously active, paths between switches of a network. CPU 3202 performs overall configuration and control of the switch 3200 operation. As noted however, CPU 3202 operates in cooperation with switch control 3204, an application specific integrated circuit (ASIC) designed to assist CPU 3202 in performing packet switching at high speeds required by modern networks. Switch control 3204 includes inbound and outbound high speed FIFOs (3206 and 3208, respectively) for exchanging data over switch bus 3252 with port modules. Memory 3210 includes a high and low priority inbound queue (3212 and 3214, respectively) and outbound queue 3216. High priority inbound queue 3212 is used to hold received switch control packets (i.e., load balance packets in accordance with the present invention) awaiting processing by CPU 3202 while low priority inbound queue 3214 holds other packets awaiting processing by CPU 3202. Outbound queue 3216 holds packets awaiting transmission to switch bus 3250 via switch control 3204 through its outbound FIFO 3208. CPU 3202, switch control 3204 and memory 3210 exchange information over processor bus 3252 largely independent of activity on switch bus 3250.

The ports of the switch are preferably embodied as plug-in modules that connect to switch bus 3250. Each such module may be, for example, a multi-port module 3218 having a plurality of ports in a single module or may be a single port module 3236. A multi-port module provides an aggregate packet switch performance capable of handling a number of slower individual ports. For example, in the preferred embodiment, both the single port module 3236 and the multi-port module 3218 provide approximately 1 Gbit per second packet switching performance. The single port module 3236 therefore can process packet switching on a single port at speeds up to 1 Gbit per second. The multi-port module 3218 provides similar aggregate performance but distributes the bandwidth over, preferably, eight ports each operating at speeds up to 100 Mbit per second.

Each port includes high speed FIFOs for exchanging data over its respective port. Specifically, each port, 3220, 3228, and 3237, preferably includes an inbound FIFO 3222, 3230, and 3238, respectively for receiving packets from the network medium connected to the port. Further, each port 3220, 3228, and 3237, preferably includes a high priority outbound FIFO 3224, 3232, and 3240, respectively, and a low priority outbound FIFO 3226, 3234, and 3242, respectively. The low priority outbound FIFOs are used to queue data associated with transmission of normal packets while the high priority outbound FIFO is used to queue data associated with transmission of control packets including load balance packets of the present invention as well as spanning tree protocol packets.

Each module (318 and 3236) includes circuits (not specifically shown) to connect its port FIFOs to the switch bus 3250.

As packets are received from a port, the packet data is applied to the switch bus 3250 in such a manner as to permit monitoring of the packet data by switch control 3204. Switch control 3204 processes each packet by performing one of three functions as the packet passes over switch bus 3250, namely, steal, copy or forward. The steal function absorbs the packet information (through inbound FIFO 3206 of switch control 3204) thereby providing the packet only to CPU 3202 for processing. As noted above, the packet data is stored either in the high priority inbound queue 3212 or the low priority inbound queue 3216 in memory 3219 to await processing by CPU 3202. When the packet is so stolen, switch control 3204 prevents the other switch modules on switch bus 3250 from receiving the stolen packet. A copy function is similar, but the packet is copied to an appropriate queue by switch control 3204 and the packet is routed to appropriate other port in a module connected to the switch bus 3250. The forward function routes the received packet to the identified destination port without retaining a copy in memory 3210 and without intervention by CPU 3202.

In general, switch control 3204 manages access to switch bus 3250 by all port modules (i.e., 3218 and 3236). All port modules "listen" to packets as they are received and applied by a receiving port module to switch bus 3250. If the packet is to be forwarded to another port, switch control 3204 applies a trailer message to switch bus 3250 following the end of the packet to identify which port should accept the received packet for forwarding to its associated network link.

Switch control 3204 controls the "forwarding" of received packets to appropriate locations within the switch for further processing and/or for transmission out another switch port. In the preferred embodiment, switch control 3204 performs the following operations:

recognize packets of the load balance protocol and pass them only to CPU 3202. Switch control 3204 must be careful not to be confused regarding this function when ACK packets are returned having a source MAC address of the switch receiving the packets.

transmit load balance protocol packets to selected ports in the switch.

determine the number of bytes queued on the inbound and outbound queues associated with each port (this is preferably performed in conjunction with ASIC interface devices operable within the port).

recognize packets addressed to the switch MAC address as directed to CPU 3202 for processing as a load balance protocol packet.

maintain tables (under control of CPU 3202) which direct packets for particular destination MAC addresses to a selected port or ports.

drop a received packet directed to a specific destination MAC address in accordance with information entered in the addressing table (alternatively, the MAC address could be removed from the addressing table so that the packet will be passed to CPU 3202 and discarded there). This feature is needed when packets must be sent to the "bit bucket" when a new path is being created after a link failure.

receive a load balance protocol packet with a specific source MAC address to be received on one port and forwarded to another specified port using the same source MAC address (e.g., for load balance protocol cost packets and associated ACKs).

maintain a broadcast path (under control of CPU 3202) for a given MAC address, however, the broadcast path for all MAC addresses from a given edge switch can use the same broadcast path. Preferably this pruned tree path is maintained as a bit mask field with a bit representing each switch in the pruned tree path and the mask may be the same for all MAC addresses from a given switch.

pass to CPU 3202 any received packet from and unknown source MAC address.

pass to CPU 3202 any received packet destined for an unknown destination address. Optionally, under control of switch control 3204, the packet may be flooded to all non-load balance ports of the switch.

block ports from packet exchange other than control packets (i.e., processing and passing load balance and spanning tree control packets to CPU 3202 as required but blocking data packets from or to identified blocked ports).

not interrupt CPU 3202 to indicate that a MAC address has moved when a source MAC address is received on a load balance port other than the load balance port it was programmed to transmit out of.

Those skilled in the art will recognize many other functions that may be performed in an ASIC assist device such as switch control 3204. Similarly, those skilled in the art will recognize that the above and other functions may be performed by a suitable programmed general purpose processor having adequate performance or where the packet switching performance is a less critical factor.

3. Protocol Definition

The detailed discussion of the preferred embodiment protocol that follows is based on the following definitions:

1. Load Balance Domain—This is a group of switches exchanging load-balance protocol packets. There may or may not be redundant links within the domain. A given switch may have some links in the domain and some outside the domain. A switch port is only in the domain if it sends load-balance protocol packets and another switch sends back load balance protocol packets. Load-balancing links must be point-to-point switch links. Hub links between the load balancing switch links are not permitted.

2. Edge Switch—This is a switch which has at least one port within the load balance domain and at least one port outside the domain connected to, for example, a host device. Ports outside the load balance domain learn about such hosts via packets sent by the hosts themselves. By contrast, ports inside the load balance domain learn about hosts connected to edge switches via MAC information packets (as described further herein below in section 3.5). A switch that has all ports inside the load balance domain cannot be an edge switch. Those skilled in the art will understand this definition to be different than a similar term used in Asynchronous Transmission Mode communication standards (ATM).

3. Non Edge Adjacent Port—This term refers to a port that goes through another switch(es) before it connects to the edge switch in question. A port may be edge adjacent to 1 switch and non-edge adjacent to 1 or more switches.

4. Edge Adjacent Port—This term is used to refer to a switch port that has a direct connection to an edge switch. At most, a port can be edge adjacent to only one switch at a time, but may be non-edge adjacent to many switches.

5. Adjacent Switch—This is a switch that a given port is connected to. A port can be connected to at most one adjacent switch. If more than one adjacent switch is connected to a given port (e.g., via a hub), then this port is removed from the load balance domain.

6. Switch ID—This is the identifier for a given switch. It is 6 bytes long and is typically the MAC address for the switch (as opposed to the port MAC address). This value must be unique to every switch in the domain.

7. Convergence Period—This is the time allowed for convergence of a given set of paths to a given edge switch. After the initial convergence of the paths, there is always one set of paths converged that are actively used, while another set is converging. The smallest convergence period is defined to be 30 seconds.

8. Trunked Ports—These are multiple ports directly connected to the same adjacent switch.

3.1. Load Balance Packet Header

Figure 4:
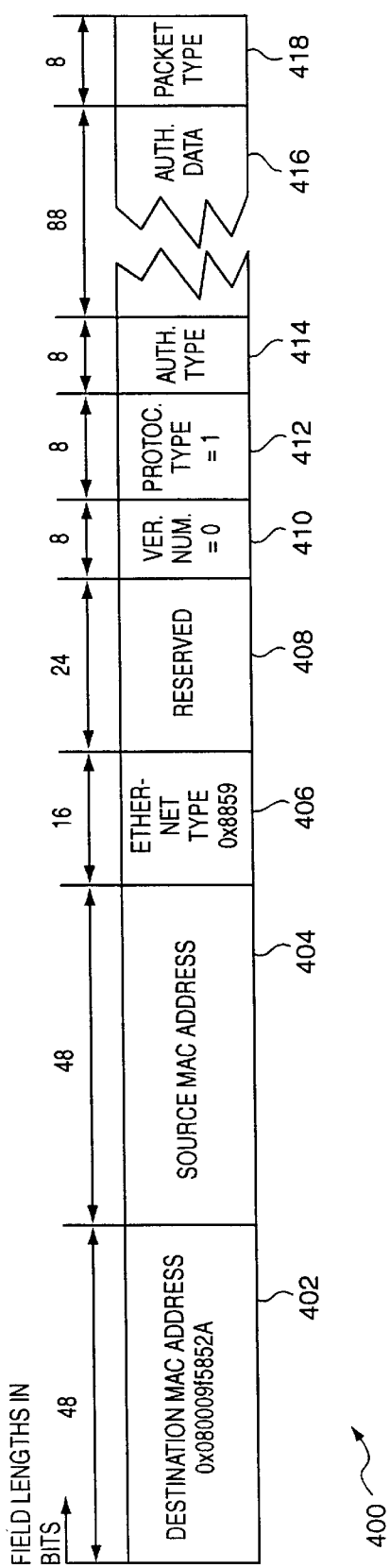
FIG. 4 is a diagram of the loop balance protocol header associated with all loop balance protocol packets of the present invention.

To be as unobtrusive as possible, all the load balancing switch-to-switch packets use the unicast packet format shown in FIG. 4. This packet has the generic Ethernet format with an Ethernet type 406 of 0x8859 (0x8859 is the Hewlett Packard Switch to Switch protocol Ethernet type). The packet is sent to a unique destination MAC address 402 (0x080009f5852A).

By using a globally known but unique unicast destination MAC address 402, only switches that recognize that address will see the packet. In a few select cases, the destination address will be a specific switch. The source address 404 is a MAC address unique to a given switch (or a given port in the case of the hello packet described later). In some cases the preferred embodiment protocol (or "load balance protocol") uses the source MAC address 404 as an identifier for an edge switch, so this value must not only be unique to a given switch, but also must be the same for all ports within the switch when used as a switch identifier.

Following the Ethernet type 406 are reserved bytes 408 (reserved for future use in the protocols of the present), a 1 byte version number 410, protocol type 412, and authentication type 414. Reserved bytes 408 are reserved for general use in the protocol where particular special cases need be handled.

For example, a first bit of the reserved bytes 408 has been allocated as a flag associated with a type 1 query (described below). A type 1 query is used in special circumstances to update cost and path information in an edge switch when failure recovery techniques of the present invention chose an alternate path in response to sensing failure of a presently preferred path between switches. Details of this processing are discussed herein below.

A second bit in the reserved bytes 408 is allocated as a flag in the protocols of the present invention operating in conjunction with the spanning tree protocols. It is necessary in some conditions associated with the spanning tree protocols to temporarily alter timeout values associated with spanning tree protocols to force the spanning tree protocols to remove (flush) old MAC addresses left pointing to ports that are blocked upstream. This bit is set on cost packets transmitted among the switches in accordance with the protocols of the present invention. Details of this feature are discussed herein below with respect to operation in conjunction with spanning tree protocols.

A third bit in reserved bytes 408 is used to distinguish between different uses of type 2 queries. A first usage of a type 2 query is when attempting to discover path information regarding a previously unknown source MAC address. A type 2 query is also used when attempting to discover path information regarding a previously unknown destination MAC address. This third bit is used to distinguish which of the two usages of a type 2 query is intended for a particular instance of the query packet. Details on learning/discovery of path information is presented herein below.

The version number is set to 0 but may be updated in the future if and when more features are added to the protocol. The protocol type of 1 indicates that it is for load balancing. Protocol type 0 is reserved for automatic broadcast control used by Hewlett Packard switches. The next field is the authentication type 414 and defines the meaning of the next 11 bytes, which are the authentication data.

Table 1 shows the currently defined authentication types and the meaning of the authentication data. This authentication method was leveraged from RFC 1583 OSPF (version 2) but increased to 11 bytes to improve 4 byte boundary alignment. The authentication data also starts on a 32 bit boundary to help improve the speed and ease of parsing packets. In general all major packet structures start on 4 byte boundaries in order to make the implementation easier and to speed up processor access. When authentication is used, some level of user configuration will be required (i.e., the password must be set). However, use of authentication is not required.

TABLE 1

Authentication Field Type

| Authentication Type | Description |
|---|---|
| 0 | No Authentication Authentication Data ignored |
| 1 | Simple Password Up to 8 bytes of Password in the Authentication Data |
| 2–255 | Reserved for future use |

When no authentication is used (Authentication Type 0), the data in the 8 bytes following the authentication type must be ignored. This is the default. When the password option is used (Authentication Type 1), all participating switches must exchange the same password. If the password configured does not match the password received, the network manager should be notified and the packet dropped. This protects against inadvertently connecting load balance switches to a load balance domain. This should not be considered as a method to protect against active attack of the network.

The packet type follows the authentication data field and indicates the type of the load balancing packet. The MSB of the packet type indicates if this is a request/response (0 for request, 1 for response); in some packet types its meaning is information/acknowledge (0 for information, 1 for acknowledge).

The different packet types are listed in Table 2 and will be discussed in the following sections. Encoding the packet type after the authentication data field allows these fields to be encrypted in the future when encryption authentication types are supported. It also allows for more modular code since it only needs to call the authentication process once before calling the packet type processing routines, rather than separately in each routine.

TABLE 2

Load Balance Packet Types

| Value (Hex) Request/Response Info/Acknowledge | Description |
|---|---|
| 0/80 | Reserved |
| 0/81 | Hello Packet (Request/Response) used to locate the Load Balance Domain Boundary and detect broken links |
| 2/82 | Loop Bit offset Negotiation Packet (request/negative/positive-acknowledge). Used to negotiate the loop detection bit offset for each load balance switch |
| 3/83 | Switch Cost Packet (information/Acknowledge) used to periodically update the network on the cost to a given edge switch. |
| 4/84 | Switch Update Cost packet (information/acknowledge) Information packet sent out at link up to trigger the exchange of current topology cost information. Also triggered by a query packet. Acknowledgment only used on the directed form of the packet. |
| 5/85 | Broadcast Add Packet (information/ Acknowledge) used to inform an adjacent switch that it should send broadcast packets from a given edge switch on this port. |
| 6/86 | Broadcast Delete Packet (information/Acknowledge) used to inform an adjacent switch that the edge switch broadcast path should be deleted on this port. |
| 7/87 | MAC Address inform (information/ Acknowledge) used to inform adjacent switches about new source MAC addresses and associated edge switch. |
| 8/88 | Switch Query packet (Request/ acknowledge. 4 types of query packets used to find a new path to a switch when a link goes down. Also use to trigger MAC address finds) |
| A/8A–7F/FF | Reserved for future use |

If the preferred embodiment protocol is to be standardized, the front end may need to be changed. For standards use, the destination MAC address will probably need to be an assigned multicast address. For proprietary use, the header defined above should be satisfactory. However if it is changed, the protocol field positions should be considered. Currently the authentication data occurs on an even 32 bit boundary since some processors my find this advantageous for processing. For those switches that support priority, the load balance packets should be sent and received at the highest priority.

Many of the load balance protocol packets have sequence numbers for detection of a duplicate packet. An implementation in general should keep the following information for the last-received copy of those packets that require the detection of duplicate packets, with details described in the sections below:

1. Source MAC address
2. Receive port
3. Sequence number

3.2. Load Balance Domain Discovery

A switch must first determine which links if any are in a load balance domain and which are not. To do so it will use a single packet type called a hello packet.

3.2.1. Hello Packet

The hello packet is periodically sent out all ports (default is to send a Hello Packet out each port once every 15 seconds). These packets inform the remote switch link that a load balancing switch exits on the other end of the link. They are also used for keep the links alive as a watchdog function, to negotiate some parameters as described later, and to detect illegal topologies. Hello packets also are used to determine when trunked ports exist. Once hello packets have been sent and received on a given port, that port is within the load balance domain. When load balancing switches are discovered, the loop detection method negotiates parameters. Not until this negotiation has completed can switch cost packets be sent out on these links (more on this in the next section).

Figure 5:
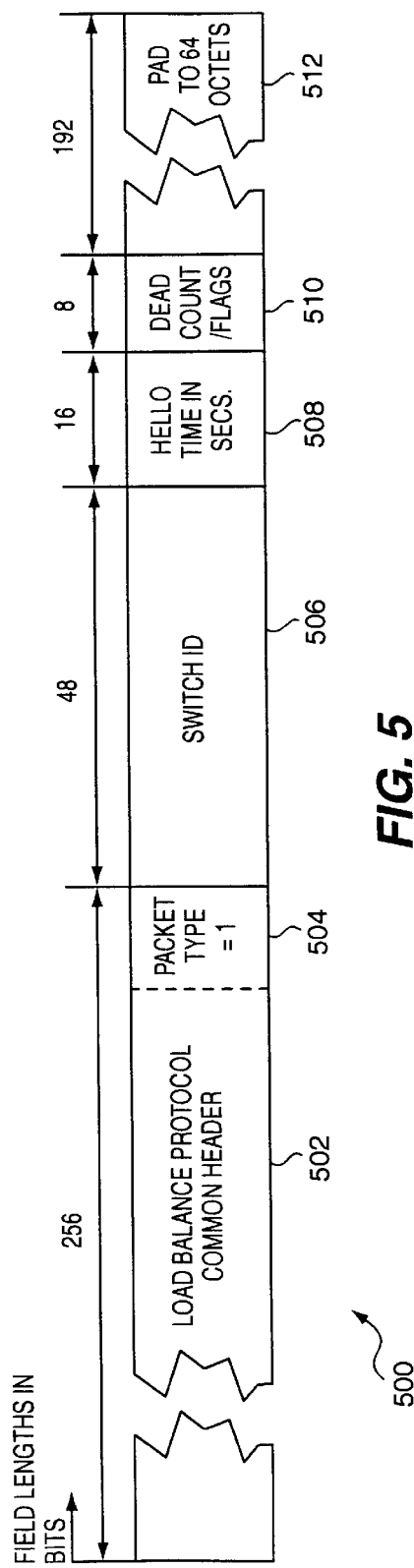
FIG. 5 is a diagram of a hello packet used in the hello protocol of the present invention to identify ports in a load balance domain.

The format of the switch load balance hello packet is shown in FIG. 5.

The packet type 504 for the hello packet is 1. This is the only load balance packet where the source MAC address in the packet is unique to each port. This is done to identify a port and to prevent non-load balance switches that form an external loop to a given load balance switch from seeing an identical (switch) MAC address from different hello transmissions on different ports of the non-load balancing switch. For example, if a single non-load balance switch has two ports connected to two ports on a single load balance switch (i.e., trunked ports), the non-load balance switch might shut down at least one of the ports if it received the same source MAC address in packets from multiple ports. For this reason, the port MAC address rather than the switch MAC address is used in the hello packets to avoid such confusion. After the hello portion of the protocol completes, other portions of the protocols use appropriate MAC addresses in their corresponding packets (i.e., use the switch MAC address or the port MAC address as appropriate. The field 506 following the packet type is the switch ID. This is a MAC address unique to the switch and is used as the source MAC address on other load balance packets.

Figure 6:
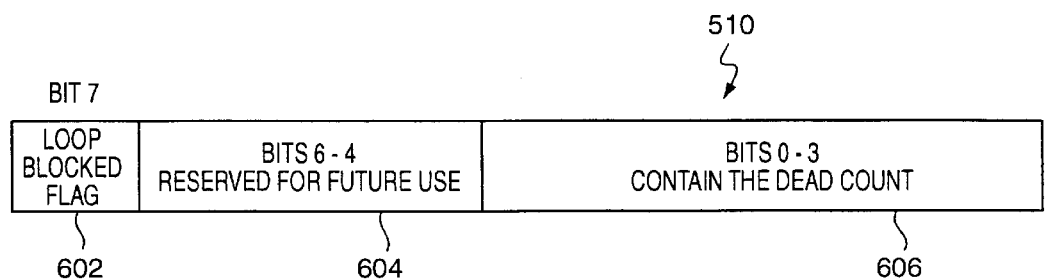
FIG. 6 is a diagram of the dead count/flags field of a hello packet as in FIG. 5.

Following the switch ID is the hello time in seconds 508 and a flags/dead count byte 510 including a dead count value in units of hello intervals. As shown in FIG. 6, the flags/dead count byte 510 preferably uses the lower 4 bits for dead count 610, The upper 4 bits are reserved for flags 602 and 604. Currently only the uppermost flag bit 602 is used as described below in the illegal topology detection. The length of the fields was picked to allow sufficient resolution for timer value and dead count values. If "dead count" hello intervals go by without receiving a hello packet on a link that had previously been receiving hello packets, the load balance switch assumes that this link is no longer in the load balance domain and edge switches cannot be accessed on this link. This triggers transmission of a topology update packet to all links that are still in the load balance domain.

To prevent problems from mis-configuration, a load balance switch link uses the smallest hello time it receives on a hello packet. If a switch link changes its hello time due to receiving a smaller hello time from its peer, it also will use the dead count it receives in the peer's hello even if that dead count is larger. If the hello times are the same, but the dead count is different, the switch link will use the smaller of the two dead times. Legal values and defaults are listed in Table 3 below. This is on a link-by-link basis, so different links may have different hello times and/or dead intervals. The implementor may wish to inform the management agent in the event of mismatched or illegal values.

TABLE 3

Legal and Default Hello packet Values

| Value | Description |
| --- | --- |
| 2–360 | Legal hello times |
| 15 | Default Hello time |
| 2–15 | Legal Dead Counts |
| 3 | Default Dead Count |

When a switch link with load balancing configured first comes up (or a link that was down comes up) it will send out hello packets with the request bit set in the packet type. When a port is coming up (not yet in the "established state" discussed herein below), that port on the switch will only accept load balance packets (similar to blocking in spanning-tree). Not until either all ports are found NOT to be connected to a load balance domain or the first cost packet has converged will other traffic be forwarded (more on this in subsequent sections). The reception of a hello request will trigger the receiving switch to send out an immediate hello response packet. The format of the hello response is the same as the hello request, expect that the request/response bit in the packet type is set for the response packet.

The reception of a hello request or response is sufficient to indicate load balance link existence. In order to provide timely establishment of the load balance links, the initial hello requests are sent at 1 second intervals for 5 seconds regardless of the hello time and dead count. If a hello packet is received before all 5 have been transmitted, this initial flurry can be stopped without sending out all 5 hello requests. However, for every hello request received, a hello response must be returned. The values in the response may be the values either accepted by the responding switch or new values desired by the responding switch.

Once a load balance link is established, hello RESPONSEs are sent at the normal hello interval. The responses are sent as a kept alive function without the overhead of receiving a packet for every response sent. If no link is established, then hello REQUESTs are sent at the normal hello interval. This method allows for quick establishment of the link since a hello request will be responded to immediately with a hello response. This speeds up the load balance link establishment in the corner (i.e., infrequent) case where two separate load balance lines are physically up but disconnected, and then are connected. The first side to receive the periodic hello request sends an immediate reply to establish the link.

Whenever a parameter mismatch is seen in the hello packets, the switch with the lower hello time (or lower dead count if hello times are the same) will send out an immediate hello request with the new lower values. This forces the receiving switch to respond with the new values to confirm their setting. In other words, the switch that wants the values changed is responsible for sending a new request packet. The hello request to correct the mismatch should not change the switch port hello state it if is in the established state. However, if necessary to get the other side to change, the switch should send up to 5 request packets spaced at 1 second intervals. The first response packet with the parameters set with the new values will end the rapid sequence of hellos.

Typically this negotiation should only need to occur when the links come up for the first time. It may, however, occur again later if the user dynamically re-configures hello time and/or dead count or if a new switch is connected with different values. If re-negotiation takes place, it should not change the state of the link. That is, if the state was established and new parameters are negotiated, the state should stay established. This method works even if two hello requests pass each other (e.g., both ports come up at the same time). An implementation of the load balancing protocol should to keep a table that maps the switch ID of received hello packets to the port the packets were received on. This information is used later when determining switch adjacency.

Once a load balance link has been established, the switches will exchange only hello response packets at the hello time. Every time a hello link is established (or re-established if it has gone down) a broadcast delete packet is sent out to inform the other side that no broadcast paths are currently established on the link. This is done to guarantee that both sides agree on broadcast paths.

Figure 8:
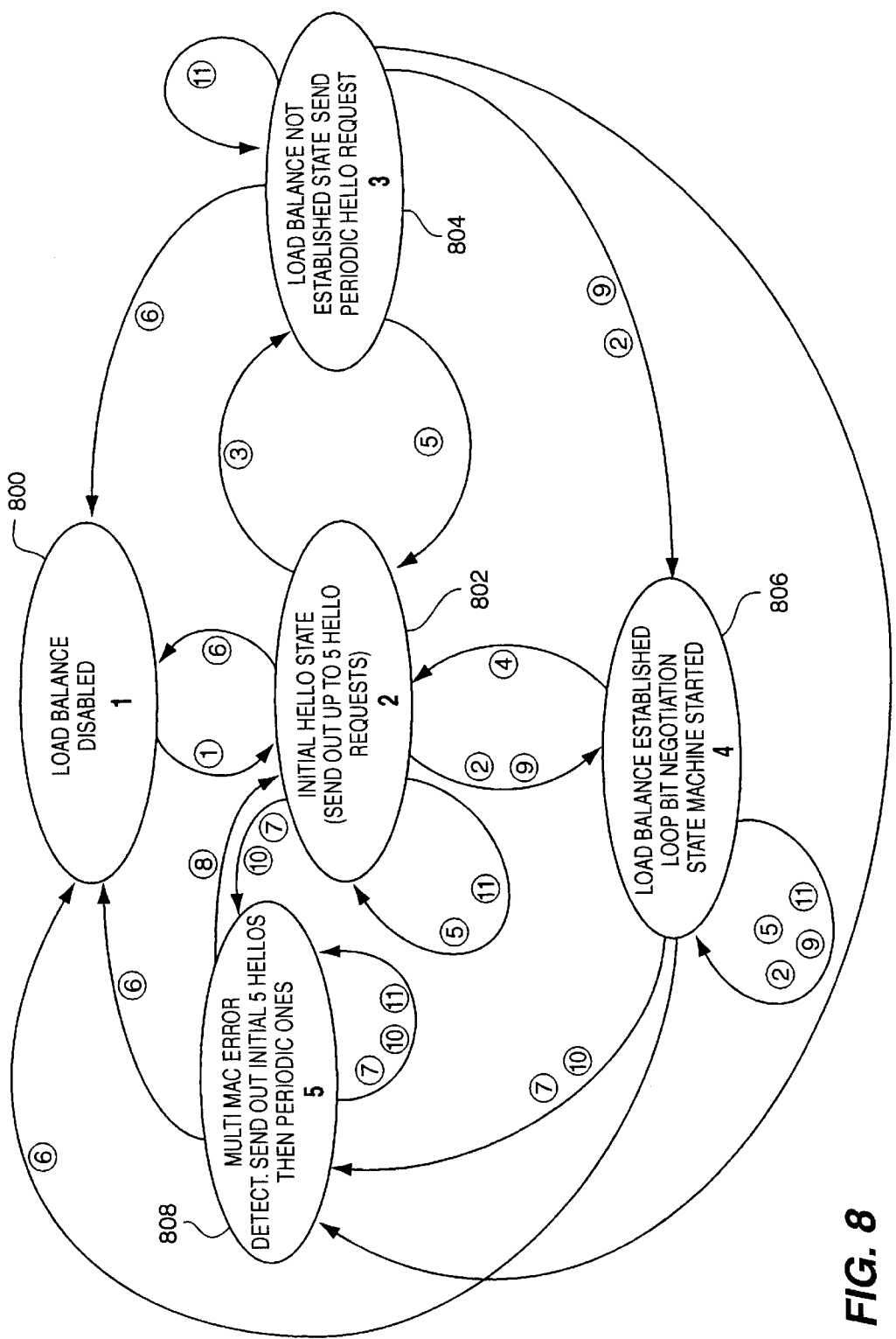
FIG. 8 depicts the hello protocol state machine operable in the protocols of the present invention to detect other ports in the load balance domain and to detect illegal loop configurations in the network.

Each time a hello packet is received, the dead count is reset. Each time a hello packet is sent, the dead count is incremented. If the dead count ever exceeds the dead count configured, then the hello state machine goes back to the initialization state to confirm that the port is no longer in the load balance domain. As illustrated in FIG. 8, load balance domain information for the port is cleared whenever the port leaves the load balance established state.

Since the unique MAC address of an adjacent switch is contained in the hello packet, a switch can determined if it has multiple ports connected to the same switch. (i.e., trunked ports). This information must be kept for use during cost packet analysis.

Figure 7:
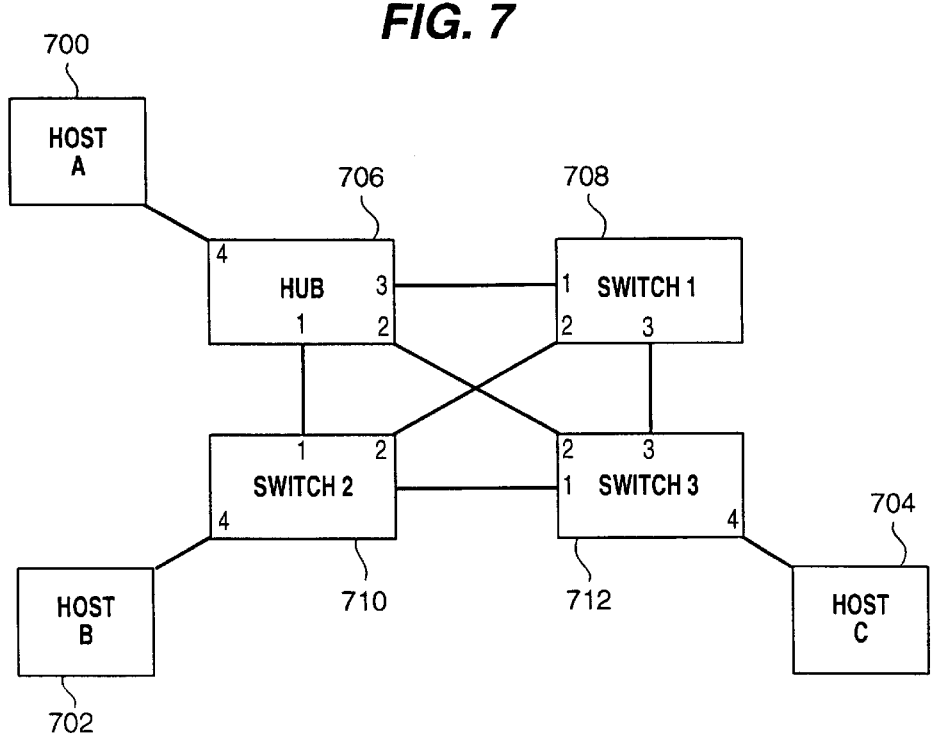
FIG. 7 is a diagram of an illegal switch network configuration detected by the hello protocol of the present invention.

The hello packet is also used to detect and correct illegal configurations, as illustrated in FIG. 7. If a hub or non-load balance switch 706 is placed within a load balance domain loop, then hellos will be received for multiple switches on a single link because the port is connected to more than 1 adjacent switch. To automatically correct this, the switches involved should each send 5 more hellos at 1 second intervals as soon as they detect the condition. This also confirms that the multiple MAC condition still exists, as opposed to a new switch being connected to the port. This will insure that all the interconnected switches see the bad loop. After this, the switch with the lowest MAC address is the only one that will later forward non load balance traffic, while the other switches will leave their ports in a blocked state even after cost packets have propagated.

Figure 10:
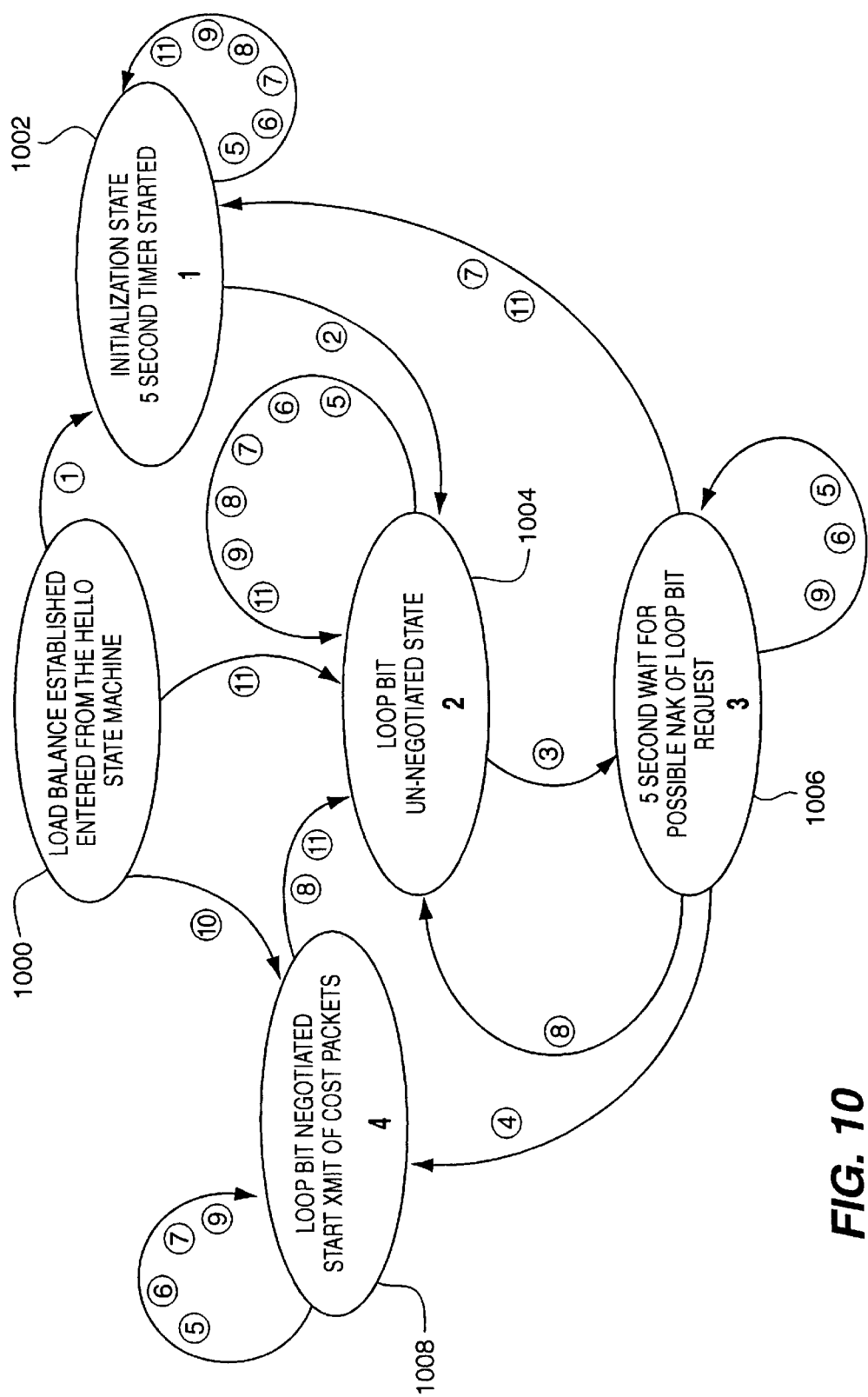
FIG. 10 depicts the loop bit negotiation protocol state machine operable in the protocols of the present invention to assign a short, unique identifier to each port in the load balance domain.

Once chosen then, the switch with the lowest MAC address will remain the only switch allowed to forward non load balance packets. To insure that this is so, it will set the uppermost flag bit (loop blocked flag 602 of FIG. 6) in the hello packets that it sends out, as illustrated in FIG. 10. All the switches continue to send hello requests at the hello time to check if and when the condition has cleared. When this situation is confirmed, then this link is not in the load balance domain, or if it had been, then it is immediately removed. The switches should also inform the network manager that this condition has occurred.

Should another load balance switch try to connect later, it too will detect the duplicate MAC addresses from the responses it will receive. However since one switch is sending a hello with the loop blocked flag (602 of FIG. 6) set true, it will immediately block its port. If two switches claim the bit, then the switch with the lower speed, or lower MAC address if the speeds are equal, will block its port and no longer set the loop blocked flag. This condition could only occur if the user ties ports together via a hub or switch after the initial negotiation. This condition is handled the same way as a broken link (discussed later). If the link goes down and comes back up, the links also start from scratch and assume that load balancing can be done. In this way, the network manager can correct the problem and resume load balancing without waiting for the periodic hello requests to determine that the line is all right again.

Another variation on this would occur if 2 ports from the same load balance switch are interconnected via a loop topology outside of the load balance domain (e.g., a hub connects two ports on the same switch). In this case, the switch will see its own hello packet (its own switch ID in the hello). When this occurs, the switch must block one of the ports (or more if multiple ports are interconnected). As before, a message should be logged, and the hello requests are sent out at the normal interval to detect when the condition has cleared. If a second switch is connected to this hub, the result may be the illusion of a trunked port to this second switch. However if the switch's own hellos are detected, then the situation is corrected when the switch with 2 or more ports connected blocks the redundant ports.

If multiple external loops to the same switch exist, then the switch must recognize these different loops. If it did not, then it could accidently block all paths to a section of the network. To recognize when multiple external loops exist, the switch uses the source MAC address in the packet (each port has a unique source MAC address). If a switch sees its own hello on multiple ports and the source MAC addresses received are the same on those multiple ports (not including the receiving port itself) then only a single loop exists. In this case, all but one port is blocked to break any loops. If the same source MAC addresses are not received on all the ports, then each set of ports receiving the same source MAC addresses are treated as separate loops and all ports but one in a given set of ports is blocked. In this way, all external loops are blocked, but full connectivity is maintained.

This feature is considered optional since an implementation may chose to not support these external loops with the load balancing protocol. In this case, an implementation would block all the ports where it sees its own switch ID and log a message to the system manager and/or send an SNMP trap to any network management stations. Implementations that do not allow this could alternatively give the user a configuration parameter that turns off load balancing on some specific ports and allow the spanning-tree protocol to be run. This would allow the user still to configure the same topology with only a minor amount of required configuration.

If the hub in 706 in FIG. 7 did not have port 2 connected, then no problem would be detected by the hello packets. This would merely look like two connections between switch 708 and switch 710, a form of trunking. There is, however, a way to detect and allow this second scenario when Host 700 talks (discussed later).

If spanning tree protocol is run with load balancing on ports not in the load balance domain (as determined by the hello protocol), the ports are controlled by the spanning tree protocol. In such a case, spanning tree packets are forwarded out these ports of the load balance domain switch using the MAC address of the switch (as opposed to the port MAC address). This allows the spanning tree protocol to manage the non-load balanced ports on the load balanced switch without shutting down the load balanced ports. In particular, the spanning tree protocol views the load balanced ports on the load balanced switch as a single port. This technique assures that the spanning tree protocol cannot bring down the load balance domain. If hello protocol loop detection and correction method is implemented in a switch, then spanning-tree protocol packets should be stopped at the incoming port to prevent spanning-tree packets from blocking on a different port than load balancing. If this detection and correction method is not implemented, then spanning-tree packets should be forwarded by the load balance switches to allow the external devices to block the redundant ports. These matters are presented in additional detail below in presentations of the present invention operating in conjunction with spanning tree protocol switches.

The one condition not correctly detected with the preferred embodiment protocol arises in the case were multiple separate load balance domains are interconnected via a non load balancing switch. In this case, the protocol will see multiple hellos on the same port. The protocol would close down all but one of the ports and lose connectivity between the separate domains. To permit this configuration, the switches must be able to be user configurable to not send hello packets on specific ports. In the future, the protocol can be enhanced to detect and correct this situation by noticing when cost packets are not received on any ports from one or more of the switches whose ports have been shut down.

3.2.2. Hello State Machine

FIG. 8 shows the hello state machine and the different events that drive it. The state machine does not explicitly show the hello response that must be sent out for each hello request received. The loop bit negotiation described in the next section below is referenced in the hello state machine as this state machine is started whenever the hello state machine enters the established state. The implementor may chose to implement this differently as long as the functionality is preserved. The functionality to be preserved is that a loop bit is determined when a switch first starts up. Once so negotiated, the assigned loop bits need not be re-negotiated. A new switch starting up need only participate in negotiation to the extent that it gets a new loop bit assigned. The other switches will not change their present assignments unless a collision occurs as discussed herein below.

Table 4 below shows the hello state machine in terms of current state along the top, events along the side, and resultant state as the fields in the table. The numbered events correspond to the labeled arrows (circled numbers) in the state diagram of FIG. 8. The column labels represent the states for transitions of the state machine. The parenthetic number in the column labels indicate the reference number in FIG. 8 for the corresponding state.

TABLE 4

Hello Event/State Table

| Events/States | Disab (800) | Init (802) | Not Estab (804) | Estab (806) | MAC Error (808) |
|---|---|---|---|---|---|
| 1. Load Balance Port Enabled | Init | NA | NA | NA | NA |
| 2. Receive Hello Packet with Loop Bit negotiation not done. Inform remote side that no Broadcast paths exits on this link with a general Broadcast delete packet | NA | Estab | Estab | Estab | NA (see events 7, 8) |
| 3. No hellos received after initial 5 hellos sent | NA | Not Estab | NA | NA | NA |
| 4. Dead Count expired without receiving a Hello Packet, or Maximum retransmission value reached on the cost packet, broadcast add packet, broadcast delete packet, MAC address information packet or query packet | NA | NA | NA | Init | NA |

TABLE 4-continued

Hello Event/State Table

| Events/States | Disab (800) | Init (802) | Not Estab (804) | Estab (806) | MAC Error (808) |
|---|---|---|---|---|---|
| 5. Receive hello with hello time > configured time. In all cases a hello request is sent immediately after the response to confirm that the other side has changed its hello time down. | NA | Init | Init | Estab | NA (see events 7, 8) |
| 6. Port Disabled | NA | Disab | Disab | Disab | Disab |
| 7. Multiple hellos from different switches received, or a switch receives its own hello packet. | NA | MAC Error | NA | MAC Error | MAC Error |
| 8. Multiple MAC address condition cleared | NA | NA | NA | NA | Init |
| 9. Receive Hello Packet with Loop bit negotiation done. Inform remote side that no Broadcast paths exits on this link with a general Broadcast delete packet | NA | Estab | Estab | Estab | NA (see events 7, 8) |
| 10. Receive Hello Packet with Loop Block Flag set | NA | MAC Error | MAC Error | MAC Error | MAC Error |
| 11. Timer expires to send hello packet (timer value depends on the state. For Estab, MAC Error and Init state a Hello request is sent. For Not Estab state a Hello response is sent | NA | Init | Not Estab | Estab | MAC Error |

3.3. Edge Switch Learning and Cost Discovery

To discover the path and cost to each edge switch in the domain, several different packet types are used. These packets are used for the initial discovery, the update of cost information, and the acknowledgment of the information received. These packet types only run within the load balance domain. Unlike the hello packets, they never are sent out ports that are connected to non-load balancing switches (or possibly servers).

3.3.1. Loop Detection Bit Negotiation Protocol

When a load balance switch first comes up and detects other load balance switches, it will negotiate for the use of a bit required for loop detection. The switch will use this bit until the next time it re-boots. This bit is used in all to switch cost packets as a marker to determine if the switch has already seen a given cost packet before. Although one could use the switch's own MAC address as a marker, this would require each switch to write a 6 byte field in each cost packet and to compare potentially several MAC addresses on each cost packet received (one for each hop that a packet traverses). Inclusion of such multiple MAC addresses would also increase the length of the switch cost packet beyond the minimum of 64 bytes in the typical case.

In short, the negotiation for the use of a bit described above keeps cost packet processing quick, keeps the packet small, and obviates the need for the user to set a separate configuration ID for each switch. The packet used to negotiate the use of this bit identifier serves the dual purpose of teaching all the switches in the domain about all the other switches in the domain. The bit is global to a given switch. There is only one loop detection bit per switch no matter how many ports or VLANs are configured on the switch.

Figure 9:
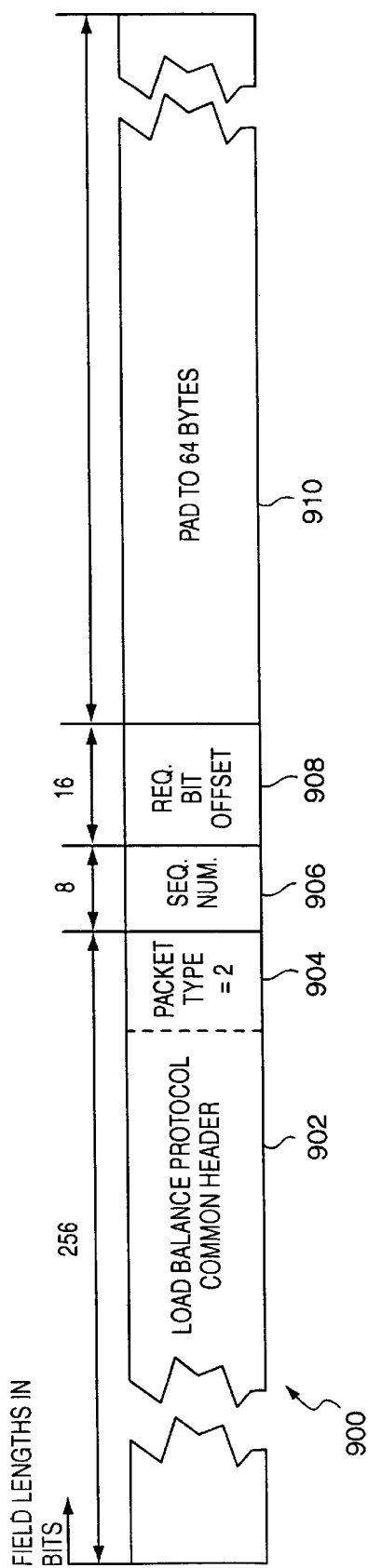
FIG. 9 is a diagram of a loop bit negotiation packet used in the loop bit negotiation protocol of the present invention.
Figure 17:
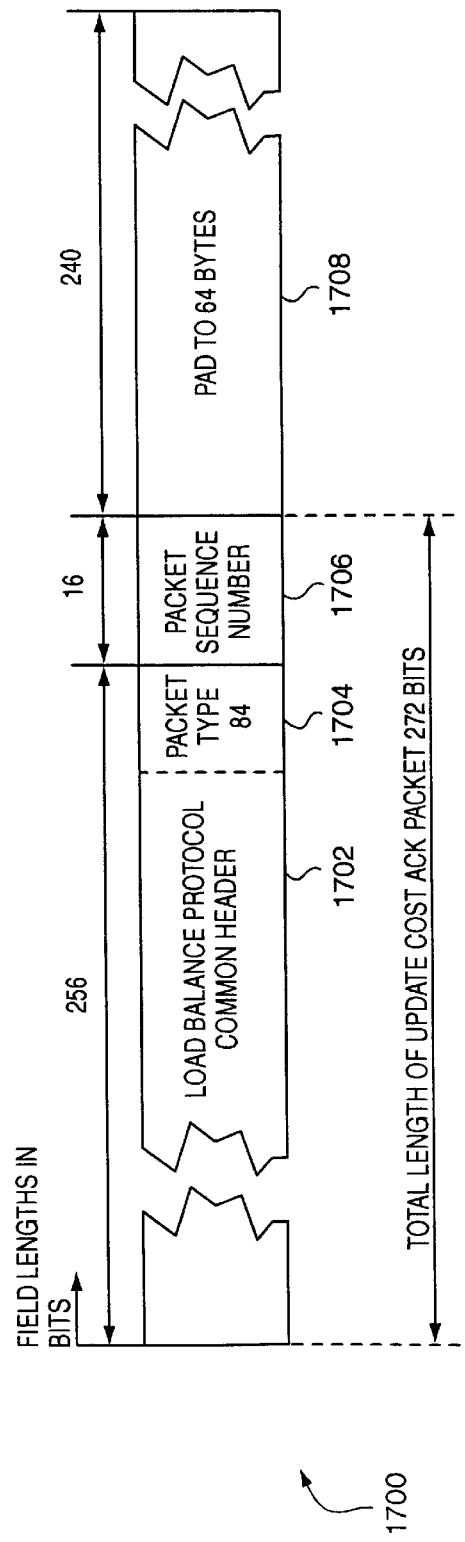
FIG. 17 is a diagram of an update cost acknowledgment packet used in the cost propagation protocol of the present invention.

The format of switch loop bit packet is shown in FIG. 9. The packet type for the switch loop bit 904 packet is 2. Following the packet type is an 8 bit sequence number 906 used to prevent the packet from looping. The sequence number is followed by a 16 bit field 908 that contains the requested bit offset that the switch wishes to use as its loop detection bit. The offset is from the end of the cost data in the cost packet described below. Values are allowed go from 1 to 1024.

Loop Bit Packet Transmission—When a load balance switch is first booted, it will send out a switch loop bit packet out each port as the port comes up and is determined to be in the load balance domain (as described above). On initial switch bootup, an implementation should wait a few seconds (e.g., 5 seconds) from the time the first port goes to the load balance established state to allow time for other ports to reach the same state. The loop bit state machine is in the initial wait state at this point. This will reduce the potential traffic incurred with this part of the protocol since more load balance switches will be informed of the request initially. Otherwise, as each link comes up, a new set of loop detect packets may need to be sent out all ports if a collision occurs with another switch that has already claimed the bit.

Any cost packet received in the initial wait state should be dropped. The path will be learned later once the switch has either successfully chosen a loop bit or at least is in the process of negotiating one.

After the initial wait from the time the first port goes to the load balance established state, the negotiation goes to the un-negotiated state. At this point, a bit offset request value is randomly picked from the range 1–128. The offset value of 0 is not used by load balance switches because this offset would be within the cost packet itself.

If the range of 1–128 for a bit offset request value is insufficient because of a large number of switches in the domain, the range can be extended to 1024. If the range of 1–128 is sufficient, as should be the case for the typical domain of 64 or fewer switches, then the cost packets described below can typically be kept to 64 bytes.

The extension of the range is determined when acknowledgments are received. The initial transmission of the packet for negotiating the loop bit assignments is only done once on a given port after bootup of a switch unless re-negotiation is necessary. In other words, once negotiation has succeed, the packet is not sent out any port even if that port has never sent the loop bit packets. The caveat here is that if loop bit assignment collisions are later detected with cost packets, all ports in the hello established state will again send out loop bit packets.

A cost packet is immediately sent after a port goes into the load balance established state any time after successful loop bit negotiation. The handling of loop bit collisions with the cost packet is discussed later.

The sequence number can start at any value from 1–255, increments up for each negotiation attempt, and wraps at 255 back to 1. This sequence number used for loop bit negotiation is unique to this portion of the protocol and is completely separate from the sequence space of other types of protocol packets described later. However, between switch boots, the sequence number should start at a different value than the last negotiation attempt. In this way, switches that receive the loop bit packet will know to forward it based on the sequence number and switch ID (Source MAC address). The sequence number space on this packet is smaller than on subsequent packets since this packet is not sent frequently and making the sequence space 8 bits allows the packet information to fit in a 4 byte boundary for easier implementation.

The sequence number in the loop bit packet is used to prevent the looping of the packet since it is forwarded out all ports. For the acknowledgment, packet sequence number 0 is reserved to send a negative acknowledgment when a loop bit collision is discovered. The transmission of the loop bit packet puts the state machine into the negotiation wait state, where it allows time for all the switches to respond to the packet.

Loop Bit Packet Reception—When a switch port receives a loop bit packet request, it will determine whether the bit requested is the one it is using. If so, it will send back an immediate negative acknowledgment (NAK) by sending an acknowledgment with the same request bit value set as it received and sequence number set to 0. Unlike the request, the acknowledgment is sent directly to the initiating switch, the destination MAC address being the address of the requesting switch. The requesting switch will then see the acknowledgment with the same offset and be forced to try for a different number.

A switch that does not object to the choice also sends a directed acknowledgment, except that it specifies its offset in the bit offset field. The sequence number in the ACK in this case does not matter. In order not to overwhelm the requesting switch with acknowledgments, the switches that do not object to the requested value should randomly delay the sending of the acknowledgment between 0 and 1 second. Also as duplicate packets are received from various ports, they are not ACKd if an ACK has previously been sent to a sending switch for a given sequence number loop bit offset combination.

As each switch sends an acknowledgment, the requesting switch should build a table to record those bits in use and also learn about all the load balance domain switches. In this way, the negotiation should converge quickly. If a collision occurs, the switch will learn how many load balance switches exist so that it can not only pick a new number to try, but also pick one in the correct range. For example, if more than 64 switches are in the domain, the requesting switch can increase the range to 1024. A switch in the load balance domain will realize that the loop bit range has been extended when first it sees a loop bit offset value (i.e., in a cost packet) greater than 64 or when it detects a cost packet length indicative of an extended bit mask field (as discussed further below).

After sending the request, the requesting switch should wait 5 seconds for all the acknowledgments before using the bit offset. During this period, it does not own the bit (negotiation wait state). It should also wait 5 seconds before trying a different offset should it find that a bit offset collision has occurred. That is, it goes back to the initialization wait state. If a switch receives a request for a bit offset that it itself has an outstanding request for, it must yield the value if it has the lower MAC address. In this case, it will not send out an acknowledgment, but instead re-negotiate at the end of its 5 second wait period. If its MAC address is larger, or it has already successfully negotiated the value, then it will send out the NAK.

A switch considers that it has successfully negotiated the bit if it gets no negative acknowledgments after 5 seconds. It then enters the negotiated state.

In all cases when a switch receives a loop bit request packet, it will forward it out all ports that are in the load balance domain unless it has already forwarded the packet. The sequence number and switch ID (source MAC address) are used to determine whether the loop detection negotiation packet has already been forwarded, meaning that the switch ID and sequence number for this packet must be kept by the receiving switch. The switch ID is needed later for the cost information, and it may make sense to initialize the cost table entry at this point.

Each time a new negotiation is attempted by a given load balance switch, the receiving switches must update the sequence number so that they can detect whether the packet has been looped back, in which case they drop it. Once a switch has negotiated a loop bit, it will keep the bit even if other ports come up later. It will only renegotiate if it receives an NAK or is confronted with special conditions described in the next section. Once loop bit negotiation is complete (converged), a switch will send out switch cost packets on all ports in the hello established state.

If acknowledgments are received that already have bit offsets greater than 128, the switch can use the larger number range if it needs to re-negotiate. If the number of switches sending acknowledgments is greater than 64, then the extended number range can also be used on any subsequent negotiation attempts. 64 was picked because the chances of picking a duplicate are approximately 50% as the 64th switch comes up, and this was felt to be a good point at which to reduce the collision probability.

Since it is possible to lose either a request or an acknowledgment, multiple switches can for a time end up using the same loop detection bit. This is not serious and might only temporarily prevent some paths from being used. This condition will be caught when a switch receives a cost packet from another switch in the load balance domain that it either does not know about, or whose bit offset does not match what it has in its table. It will then update the offset in its table and, if a collision results, it will re-negotiate after it has received the cost packet.

As in the case of a collision during loop bit negotiation, a collision encountered during the reception of a cost packet forces the lower MAC address to do the re-negotiation. In this way, only one side will ever need to re-negotiate, not both. The side with the higher MAC address will send a NAK with sequence number 0 to the switch it collided with. To confirm that a NAK is correct, the switch must compare the loop bit in the NAK to the one it is currently attempting to negotiate, since it may be possible for an old NAK to be received much later in large topologies with heavy traffic.

A loop bit packet is typically sent out before any cost packets have traversed the network. When a switch receives the first copy of this packet from a given switch, it will use the port on which it received that packet as the port from which to send the acknowledgment back. Generally, in the preferred embodiment of the present invention, many of the packet parsing and generation aspects of the protocol are processed by custom electronic circuits to achieve desired packet switching performance. Such custom circuits are often referred to as application specific integrated circuits, or more simply ASICs. In general, switches have ASIC devices which monitor the MAC addresses of packet exchanges (to forward the packets and for other purposes), in general, when the ASIC of a switch detects changes in the location of a device (i.e., reception of a packet with a MAC address not programmed in its table in association with a particular port), the ASIC notifies the switch CPU with a MOVE signal (or may automatically reprogram the tables and then inform the CPU).

The ASIC of the preferred embodiment includes tables for storing addresses of devices or groups of devices which may be accessed through each port of the switch. In accordance with the protocols of the present invention, a particular pair of devices may exchange packets over multiple paths. Transmissions from a particular MAC address may therefore appear first on one port of a switch in the load balance domain and later on other ports of the same switch. This is not considered a MOVE as described above if the relevant ports are all within the load balance domain.

An implementation may MOVE the MAC address entry later when cost packets determine a better path exists. This is not required, however. Only if the port that is chosen goes down need the port be changed, and then only if another path is known to exist (see below).

3.3.2. Loop Bit Negotiation State Machine

FIG. 10 shows the loop bit negotiation state machine and the different events that drive it. Although loop bit negotiation occurs on a per switch basis, it does interact with the hello state machine since at least one port must be in the hello established state before it can progress. Loop bit negotiation also interacts with cost packet transmission, since the loop bit must be negotiated before cost packets can be sent out any port. The loop bit negotiation state machine is described herein as a single state machine operable to manage loop bit negotiation of a single port of a switch. Those skilled in the art will recognize that a plurality of such state machine may be operable within a switch, one for each port of the switch. Alternatively, an implementor may choose to design a single state machine within the switch which equivalently manages negotiation of loop bit assignment for all ports of the switch. Keep in mind, however, that if the negotiation state of the loop bit changes, it changes for all ports. For example, if a NAK is received on any port, the state would transition to the un-negotiated state for all ports.

The states of the loop bit negotiation state machine are as follows:

1. Init-wait (1002 of FIG. 10): This state is used as a wait time and occurs when the first port after switch bootup goes into the hello established state. During this period the switch will wait for up to 5 seconds for other ports to come up before transmitting the loop bit packet. Any Cost packets received on any port during this state is dropped. This state can also be entered when negotiation has started but failed. In this case it is used to wait for all responses to be received before trying again.

2 Un-neg (1004 of FIG. 10): This state exists for only a moment, it is during this time that the switch picks a loop bit to negotiate for. It then sends out the loop bit packet on all ports in the hello established state. Should an implementation be able to receive cost packets during this point they should be dropped.

3 Neg-wait (1006 of FIG. 10): This period is when a loop bit packet is outstanding. The switch is in this state for 5 seconds as it waits for responses from the other switches. If a cost packet is received during this period it will attempt to use the loop bit it is currently negotiating for.

4 Neg (1008 of FIG. 10): This is the point where the negotiation has completed (i.e., the 5 seconds in Neg-wait has completed without the without the reception of a NAK. Typically the state will remain this way no matter what the state of the hello machine on the ports unless a collision is detected with cost packets.

The relationship between these states and the events that drive transitions among them is summarized in the following Table 5. The numbered events (rows) correspond to the labeled arrows (circled numbers) in the state diagram of FIG. 10. The column labels represent the states for transitions of the state machine. The parenthetic number in the column labels indicate the reference number in FIG. 10 for the corresponding state.

TABLE 5

Loop Bit Negotiation Event/State Table

| Event | Init-wait (1002) | Un-neg (1004) | Neg-wait (1006) | Neg (1008) | Hello Estab (1000) |
|---|---|---|---|---|---|
| 1. First port has entered hello established state | NA | NA | NA | NA | Init-wait |
| 2. 5 second wait timer Expired from Init-wait state | Un-neg | NA | NA | NA | NA |
| 3. Xmit of Loop bit packet | NA | Neg-wait | NA | NA | NA |
| 4. Timer expired and no NAKs received | NA | NA | Neg | NA | NA |
| 5. Positive acknowledgments received. | Init-wait | Un-neg | Neg-wait | Neg | NA |
| 6. Reception of loop bit packet with identical loop bit offset. Source has smaller MAC address | Init-wait | Un-neg | Neg - wait | Neg | NA |
| 7. Reception of loop bit packet with identical loop bit offset. Source has larger MAC address | Init-wait | Un-neg | Init-wait | Neg | NA |
| 8. Reception of Cost packet with identical loop bit offset to receiver. Source has larger MAC address | Init-wait | Un-neg | Un-neg | Un-neg | NA |
| 9. Reception of Cost packet with identical loop bit offset to receiver. Source has smaller MAC address | Init-wait | Un-neg | Neg-wait | Neg | NA |
| 10. Entered from hello state machine with loop bit negotiation completed previously | NA | NA | NA | NA | Neg |
| 11. Reception of a NAK | Init-wait | Un-neg | Init-wait | Un-neg | Un-neg |

3.3.3. Cost Propagation

As soon as a switch has determined that a load balance link exists on a port and has successfully negotiated a loop detection bit offset, it will send out a switch cost packet. The purpose of this packet is to propagate switch cost information throughout the load balance domain. This packet also serves as the loop detection mechanism.

After the link has initially come up, it will start an update timer. Use of one timer per switch, irrespective of VLANs, makes implementation easier. When this timer expires, the switch will again send a switch cost packet out all up ports. This packet is passed from switch to switch, with the cost and hop count incremented along the way. This information is used by all the switches to update all the paths to a given edge switch. Later, when host addresses are associated with a given edge switch, the possible paths for these packets will already be in place. Not until the first cost packet has converged will non load balance links be allowed to receive and send normal traffic. This initial wait period is somewhat like the listening and learning phase of the spanning-tree protocol.

Sending the switch cost packet out periodically has the following benefits:

1. It prevents excessive update traffic. If the updates were sent out whenever costs changed, a network with large fluctuations might generate a large number of cost packets. These packets themselves could then create even more fluctuations.
2. The amount of update traffic overhead is predictable and can be controlled by the cost transmission interval.
3. Network debugging is easier since paths will not change faster than the update interval.
4. It adds robustness to the protocol since updates will always propagate to all switches whether costs have changed or not. Thus, if some switch lost the information or was not updated before, it will be when the packet is sent next.

One of the key aspects of the cost method used is that after one set of paths has converged, meaning that all switches agree on the non looping paths to other switches, a new set of paths are converging. Only a converged set of paths is ever used, and this prevents loops from occurring in the topology. The continuous re-convergence of paths and recalculation of path costs permits the load balancing protocol to determine how to spread the packet load evenly. Transmission of a switch cost packet can be triggered by not only periodic updates, but also by other switches that need updated information due to ports going up and down.

Figure 11:
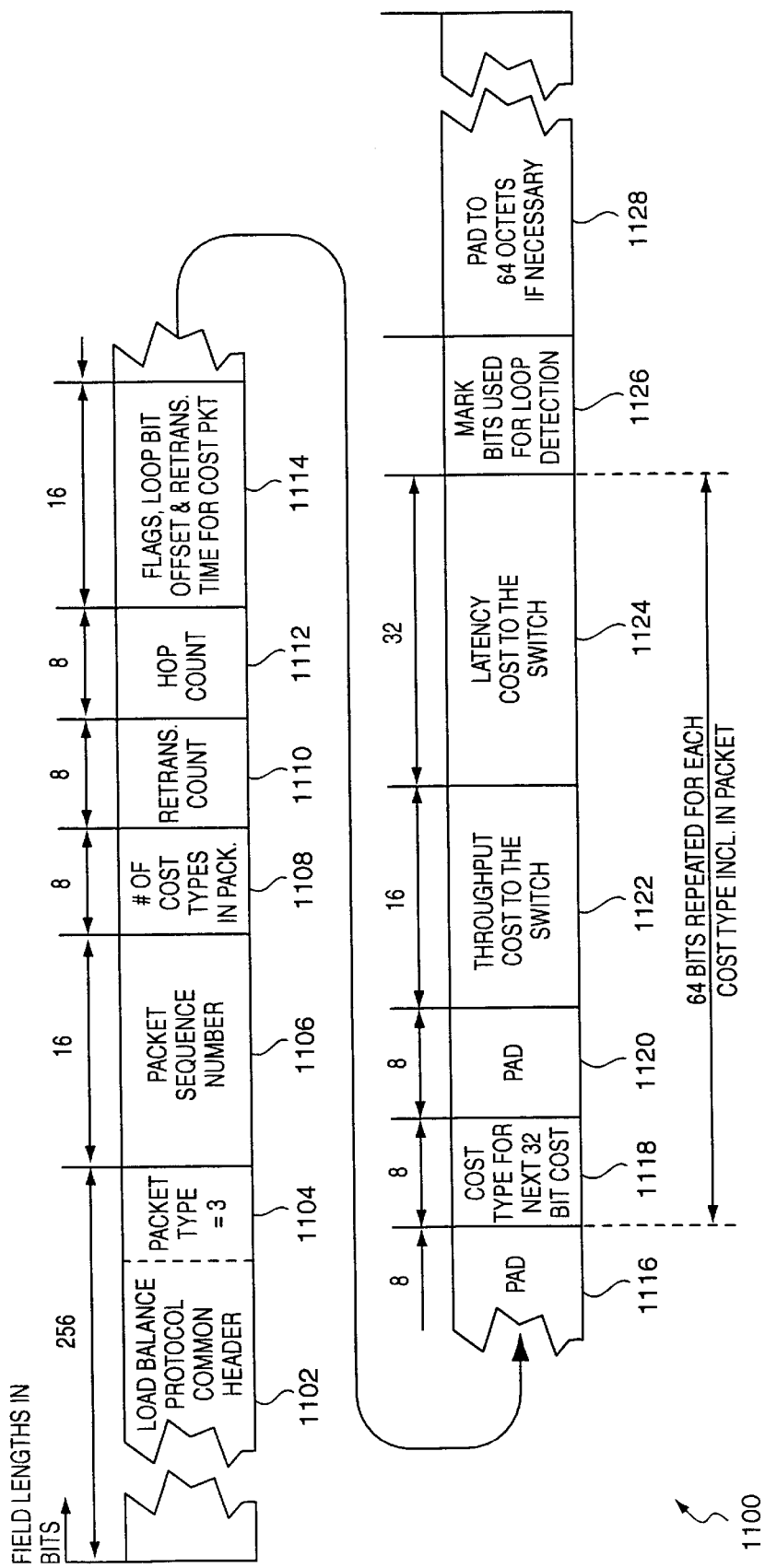
FIG. 11 is a diagram of a cost packet used in the cost propagation protocol of the present invention.

The format of the switch cost packet is shown in FIG. 11. The packet type for the switch cost packet 1104 is 3. Following the packet type is a 16 bit sequence number 1106 for the packet. This field is used to confirm acknowledgments for the packet and to determine when cost information is to be used. Before a switch cost packet can be sent, previous packets must be acknowledged. That is, only one unacknowledged packet can be outstanding from a given port. The sequence number space starts at 0 and goes to 0xFFFE, at which point it wraps back to 0. The value of 0xFFFF is reserved to indicate that a broadcast packet should be used to learn a MAC address. Those skilled in the art will note that comparisons of sequence numbers must account for the wrap of values from 0xFFFE to 0 such that, for example, a value of 2 must be detected as greater than 0xFFFE.

Following the packet sequence number is a field 1108 representing the number of "cost types" included in this packet. Although this 8 bit field allows for 255 different cost types, only 168 could be included in a single packet (168 cost entries makes a 1512 octet packet including 128 bytes for loop detection bits). Realistically only a handful of cost types will ever be used.

At present only one "cost type" is defined (cost type field=0). In the future, other "cost types" may be defined based on monetary cost, pure link speed, cost/latency for high priority packets, cost/latency for low priority packets, and the like. Switches would use these different cost types to direct packets with different priority tags (or possibly other packet fields) though potentially different paths. For example, high priority routing might use the lowest cost of a high priority cost type parameter, while low priority routing might use the lowest cost of a low priority cost type parameter. Using multiple paths based on different "cost type" would require the switching ASICs to maintain multiple routes for a given destination MAC address and base the route on characteristics decoded on a per packet basis.

As illustrated in FIG. 11, the next 8 bits 1110 of the switch cost packet contain an 8 bit retransmission count followed by an 8 bit hop count 1112 followed by a 16 bit field 1114 that contains the loop bit offset for the initiating switch, a flag bit, and the timer value for cost packet transmission.

The next 8 bits 1116 are a pad to get to a 32 bit boundary. The next 64 bits are repeated for each cost type included in the packet. The first element in this 64 bit field is an 8 bit field 1118 defining the cost type for the throughput and the associated latency cost fields which follow. The next value is an 8 bit pad 1120 followed by a 16 bit throughput cost field 1122.

Next is a 32 bit field 1124 defining latency cost for the referenced cost type (discussed further below). Following the 64 bit cost elements are bits 1126 used for loop detection. The ID of the edge switch this information is intended for is determined by the source MAC address in the packet as described earlier.

The retransmission count is used to keep track of how many retransmissions have occurred on a given switch cost packet as it works its way through the network. If the re-transmission count gets above 0x0F (15), the packet is dropped. This prevents a path from getting established after the paths for a given sequence number have converged.

The hop count field in the first element is set to 0 by the edge switch that initiates the packet and is incremented along the way by each switch the packet encounters. If the hop count gets above 0x0F, it is considered infinite and a path that cannot be taken. This prevents large topologies that may take more than 30 seconds to converge. This does not mean, however, that the topology is limited to 15 switches, but only that a path that takes more than 15 hops is not permitted within a given load balance domain. In effect, the hop count is used to limit the diameter of the network to insure convergence.

The latency cost (further described below) builds in the effect of hop count so that hop count is not directly used in forwarding path decision. Hop count may also be used in some cases as a tie breaker. If topology constraints are desired, then an implementation may reduce the allowed hop counts to an even smaller value (e.g., 5). The hop count limit could also optionally be user configurable for the sophisticated user. However, it should not be larger than 15 with the currently defined timers and must be set the same on all switches within a given load balance domain.

As with the other parameters, the retransmission and hop count limits may need to be adjusted as real convergence times are measured. Typically, a load balance domain topology should have a number of short hop routes and not as many long hop routes, since this adds a considerable latency and would defeat some of the benefits of the load balancing. Allowing the advanced user to specify the hop limit within a range may be advantageous, as this could be used to limit the possible number of routes and keep latency at a minimum.

Figure 12:
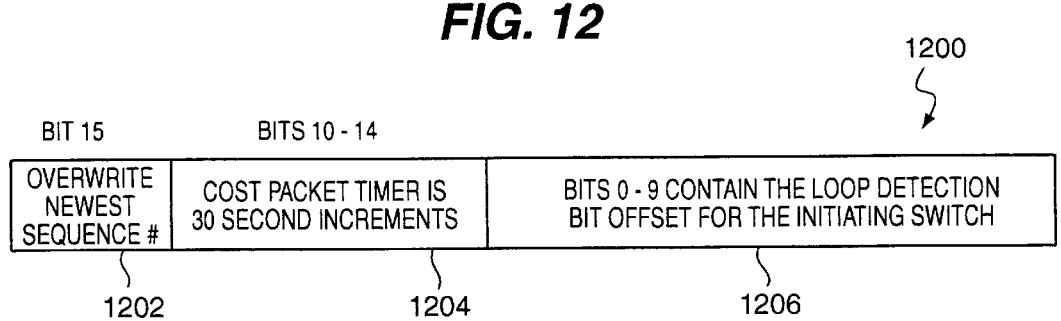
FIG. 12 is a diagram of a flags field of the cost packet of FIG. 11.

As illustrated in FIG. 12, bit 1202 of the flag/cost timer/ loop bit offset word is defined to indicate which sequence number a switch should overwrite in its switch table when it receives a cost packet. If set, the newest sequence number should overwritten. If clear (the typical case), the oldest sequence number should be overwritten.

This bit is also set when a new broadcast path must be set up by all switches to an edge switch. Typically the first cost packet sent out by an edge switch will always have this bit set true. All subsequent cost packets will have it set false until a line fails or a switch sends a switch update cost packet.

Bits 1204 contain the cost packet timer. This timer indicates how frequently a cost packet will be initiated by the switch. The value is in 30 second increments (i.e., 2=60 seconds). Bits 1206 contain the loop bit offset negotiated by the switch.

The bits following the 64 bit cost elements in FIG. 11 (comprising segments 1118, 1120, 1122 and 1124) are the bits used by each switch to mark the first occurrence of a switch cost packet with a given sequence number from a given edge switch (the loop detection bit). When the first sequence number from a given edge switch is received, the switch will offset to the end of the cost information and set the bit at its negotiated bit offset position. The packet is then forwarded as discussed below. If the same sequence number in another packet and the bit at the negotiated bit offset position is set, the switch knows that this path forms a loop and that the information must be ignored. If the bit is not set, then it is a new path that must be kept.

3.3.3.1. Cost Calculation

There are two parts to the cost calculation of the preferred embodiment protocol. The first is a calculation of the latency cost for each port. The second is a calculation of the total available throughput that a given switch has available to forward packets towards an edge switch on a given port. These cost calculations assume an outbound-queued, store-and-forward switch and may have to be adjusted if other architectures are used.

Latency—To determine the latency cost to a given switch, each switch will need to calculate the latency in the same manner so that consistent results are achieved between switches. A number of factors are used in computing latency. There is both an inbound and outbound component to the latency of a packet forwarding through a switch. As used in cost calculations, the terms "inbound" and "outbound" are relative to a packet (i.e., an application/data packet) moving through a switch toward some network device connected to a port of an edge switch. "Inbound" as used for cost calculations therefore refers to the port on which such a data packet is received while "outbound" refers to the port of the same switch on which the packet will be sent toward the intended device and associated edge switch. It should be noted that the cost packets used to propagate the costs of the various paths are transmitted in the opposite direction. In other words, a cost packet is initiated at an edge switch and is propagated through intermediate switches in the opposite direction of application/data packets. Therefore, cost packets propagate from an "outbound" port (relative to data packet transmissions) to an "inbound" port (relative to data packet transmissions) of the next switch in a particular path.

In general the inbound latency and outbound latency for a particular path through a switch are summed. The outbound latency is the latency for the port on which the cost packet was received (the port on which data packets will be sent toward the intended edge switch and device). The inbound latency is the latency for the port on which the cost packet will be forwarded (the port from which data packets are received to be forwarded out a best cost outbound port).

Other factors then adjust this latency value before passing the latency value on to the next switch on a path. Cost type 0 will use a weighted average packet latency.

For outbound port latency, the following formula is used:
1. Queue depth in BITS/ port speed in megabits/sec= current latency. This calculation adds the latency in the queue. Note that queue depth may be the sum of several queues if multiple queues exist for a given direction on a given port (e.g., if multiple outbound priorities exist for a given port). The port speed used in this calculation is that of the port to which the cost packet is forwarded (after updating the cost information). If different cost types are used based on priority, then the different queues would be used separately. To read queue depth, the switch hardware will need to support an atomic read to gather the information for a given queue. For example, switches may allow direct reads of the queue depth or direct reads of the free memory from which queue depth can be computed, as in the case of the HP 8000 switch. If multiple reads are required (i.e., read multiple pointers in the port chips) the sample accuracy may be in question since the pointers could move between reads.
2. At each second of time, compute the latency for the queue in question and add this value to the previous port latency as follows: ((previous latency*15)+current latency)/16=weighted average. The weighted average is then used as the previous latency at the next second when the computation is repeated.

In the preferred embodiment, the switch should store the weighted average queue depth rather than latency and only divide by the port speed when the latency cost is needed for a cost packet. This is done because inbound queue cost (inbound latency as discussed below) will sometimes use the port speed of an outbound port for the cost calculation. Sampling each second should over time permit a reasonable estimate of the queue depth and hence load on the network. In future switch implementations, it may be possible to have the hardware keep track of the actual minimum, maximum and average queue depths to give a better cost factor. Although it might be possible to use the traffic flow (number of packets sent or received) rather than queue depth, the queue depth has the advantage of indicating when a switch backplane is oversubscribed, since inbound queuing only occurs in the oversubscription case for the standard outbound-queued switch. Queue depth combined with port speed also gives a better feel for traffic latency, which is typically more important that packets per unit time.

For example, if the queue depth is 150K bits and the port speed is 100 megabits/sec the latency cost value=150,000/100 or 1,500. If the previous weighted average was 3000, new weighted average=((3000*15+1500)/16 or 2906. Note that if the weighted latency cost ever gets below 12 on a gigabit port, 121 on a 100 megabit port, or 1214 on a 10 megabit port, the values should be set to these minimums. This will add the latency queuing cost of one 1518 byte packet for each hop though the domain even if there is no traffic (i.e., the store and forward latency for 1 max sized Ethernet packet, (1518*8/port speed), or in other words 1 hop count worth of latency).

If the queues are full and packet drops are starting to occur, this also should be taken into consideration. For every 1 second period, each 10% packet drop rate should double the latency calculated. For example, a 30% packet drop rate should have a latency 8 times that of the same queue size with no drops. This means that some current and previous byte count and drop information are compared at each second. Depending upon the capabilities of the hardware, queued packets transmitted and dropped rather than queue bit or byte depth could be used in these latency modification computations. However the bit/byte depth value is preferred if available. Many equivalent measures of queue depth may be used to effectuate the modifications of the latency computations. The doubling of latency for 10% packet drop rate is an estimate and may need to be adjusted for particular applications of the methods herein. Further, those skilled in the art will recognize that the doubling of latency values should be capped at a predetermined limit to avoid overflow of fixed size fields used to store the latency values.

For inbound latency cost information, the same procedure is used, except that the port speed used is that of the port on the switch having the best cost back to the switch which sent the cost packet (i.e., the lowest port latency) That "best" path port would be the port to which data packets would be directed toward the edge switch which initiated the cost packet. This will tend to overstate the cost for inbound queuing since the packets on the inbound port may be destined for many different output ports. However, if much inbound queuing is occurring, the switch backplane is oversubscribed and it is probably best to overemphasize this cost. Although in theory one could look and see where each inbound queued packet is destined, the added complexity of doing this appears unwarranted since inbound queuing is undesirable in first place. As with the outbound queue, any dropped packets should increase the cost as described above.

A key point to be understood is that the outbound latency and packet drop rate is based on the queue depth of the port the cost packet was received on since this is the port used to forward data packets back to the switch that initiated the cost packet. Conversely, the inbound latency value is based on the queue depth of the port on which the cost packet will be forwarded since this is the port from which data packets will be received to be forwarded to the intended edge switch and device.

In other words, the inbound latency is computed for an intermediate switch in a path as queue depth of the inbound queue of the port on which the cost packet is to be forwarded divided by the port speed of the best port back to the switch which sent the cost packet. Outbound latency is computed as the queue depth of the outbound queue of the port on which the cost packet was received divided by the port speed of the port on which the cost packet was received. One simplification of the above is to use the port speed of the port on which the cost packet was received in computing inbound latency where, for example, the "best" port is not yet known.

Implementation of this latency cost approach implies that the switch processor will poll all the ports at a 1 second interval to compute the weighted outbound latency, inbound latency, and drop rates. As mentioned above, it is probably best to store the weighted average of the queue depth so that the port speed to be used can be divided into the queue as needed when the cost packets are sent out since only then is the inbound port speed to use known.

Figure 13:
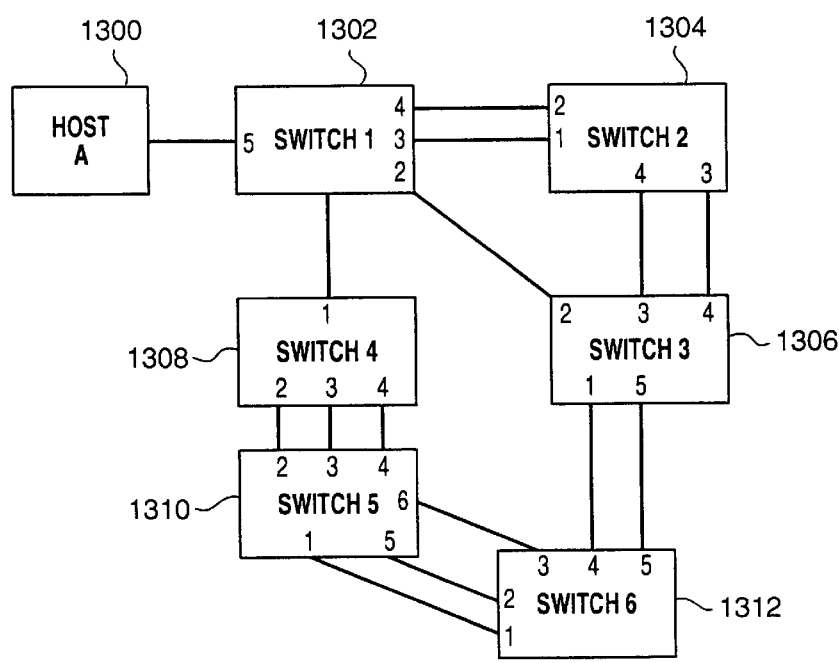
FIG. 13 depicts a switch network in which trunked lines require cost protocols of the present invention to resolve the preferred path for packet exchange between switches of the network.

Available throughput—The throughput information is used to indicate bottle necks along the way. It will identify the speed of the slowest port along a given path. FIG. 13 and the following discussion illustrate why this information is needed.

If throughput from switch 1302 port 2 to switch 1306 port 2 is 10 megabits, and the path from switch 1306 to switch 1302 via switch 1304 is trunked 100 megabit lines, it makes more sense to add MAC address paths that go from switch 1306 to switch 1302 than to use switch 1304, even if the queues are the same depth. Without the throughput measurement, the switch would tend to add more MAC address paths to switch 1302 on port 2 of switch 1306 since this is only a single hop away whereas the alternate path include two hops.

This is obviously the wrong choice since significantly more throughput is available by going through switch 1304. Although this condition would tend to correct itself since the load on the single line between switch 1302 and switch 1306 would increase in latency, it would take at least one convergence time period for this situation to materialize and could potentially overload a line and unnecessarily cause dropped packets. To make a better choice in the first place, the throughput is used in the calculation to determine the best path for a given convergence time.

Figure 14:
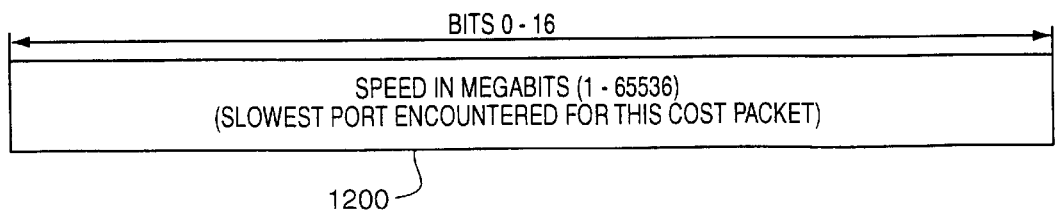
FIG. 14 is a diagram of a speed (throughput) field of a cost packet in accordance with the present invention.

The format of the throughput parameter 1200 is shown in FIG. 14. It contains the speed of the slowest line along the way and a port identifier. Latency will be added to each port as described in the preceding latency section.

With further reference to FIG. 13, when the cost packet from switch 1302 gets to switch 1304, it will forward the packet out ports 2, 3 and 4 with the appropriate additional latency added. Switch 1310 will receive the 3 copies from switch 1308 and, since switch 1310 knows that ports 2, 3 and 4 are trunked ports, it will wait for all 3 cost packets to be received. It will then forward the cost packet with the lowest port load factor (discussed below) to switch 1312 via ports 1, 5 and 6.

This helps prevent the cascading of too many cost packets and should lower cost packet arrival later on a trunk. Note that only on trunk ports is it permissible to distribute multiple MAC addresses on different ports during a given convergence period. In general it is unlikely for a lower cost path to be received after a higher cost path is received at edge switch ports. Exactly how this information is used to distribute MAC address information passing is discussed in the load factor section below.

Port Load Factor is the combination of latency cost and throughput speed on a given port. The port load factor can be used to compare the different paths for a given convergence time. The larger the port load factor, the less desirable the path. Since latency can go from 12 (single gigabit link) to 6,144,000 (15 hops of queued inbound and outbound 10 meg links, assuming 256K bytes per queue (256,000*8*2*15)/10=6,144,000.) and throughput speed can go from 1 to 1000 (1 meg to 1 gigabit), the port load factor is calculated as (latency*1000)/throughput. The multiplier of 1000 makes sure that the range is spread and realistically never gets to 0. If the port load factor ever did get to 0 (say due to 10 gigabit links in the future), it must be incremented 1 for the MAC address distribution calculations below.

The port load factor is a load factor for each port that can be compared to the port load factor for other ports. Care should be taken with the integer math so as not to overflow any intermediated results if 32 bit integers are used. Furthermore, the port load factor calculation may need to be adjusted. For example, more impact from throughput may need to be added to the equation to prevent overloading slower lines. In any case, the switches must all use the same formula to make the same decision on best path.

In cases were the port load factor comes out the same for two or more ports, then implementations must pick between the optional ports. This decision is implementation dependent, since any of the ports picked should work (depending on how good the above algorithm is). Possible methods include:

1. Picking the first port the cost packet came in on. This should select the port with the lowest latency at the time of the cost packet. However it is the latency from the edge switch, not to the edge switch. This would tend to encourage traffic to and from the edge switch to go along the same path.
2. Randomly picking a port.
3. Using a weighted average of the traffic flow out the port. This could be implemented, for example, by monitoring the bytes transmitted during each time interval and performing a weighted average calculation just like the queue depth calculation described above. This is probably the most accurate method, but requires the most implementation work.

Group Load factor is used in the case of trunked ports to distribute MAC addresses during a given convergence period. This can only be done on trunked ports. Otherwise loops would be possible.

When a switch determines the best path during a given sequence time, it will put all MAC addresses learned from a given edge switch during that time on the same path. If the port that path is within is a trunked group, then MAC addresses can be safely distributed across all ports in the trunked group. To do this, the port load factor of each port in the trunk group is compared and MAC addresses are proportionally distributed.

For example, if the port load factors for ports 2,3 and 4 of switch 5 to switch 4 are 100, 200 and 1000 respectively, then for every 10 MAC addresses assigned to port 2, 5 would be assigned to port 3 and 1 would be assigned to port 4 during a given convergence time. This calculation is done by first taking the lowest port load factor and dividing all the other port load factors by it (e.g., 100/100, 200/100, 1000/100), and then by taking the largest resultant value and dividing it by the previous results. (e.g., 10/1, 10/2, 10/10). This gives the relative proportion of MAC address assignments (e.g., 10 for port 2, 5 for port 3 and 1 for port 4.) Although round-off error occurs, this is only an approximation of fairness since no account is taken of the fact that different MAC addresses will offer different loads with time.

The situation is corrected at each convergence period since the latencies are recalculated. In other words, if some ports were given more than their fair share of the load on given convergence period, they will have higher latency the next time and be given less. As long as no port is overloaded to the point of drops, the self correcting nature of the algorithm should overcome the inaccuracies in the MAC address loading algorithm.

Since the distribution of the MAC addresses is solely determined by each individual switch, the exact mechanism chosen to distribute the MAC addresses can be left up to each particular implementation. The only constraint is that the cost calculations be consistent from switch to switch. For example, a given switch may chose to treat trunked ports as a single link and distribute across the trunk using an algorithm based on source destination pairs. This method may work better if many clients are trying to get to one destination (in this case the ports should all have the same link speed). The cost information forwarded could then use the average cost of the ports. The port throughput should not be sum of the throughputs, however, as this could given the impression of a much lower cost port. The latency cost would just go up slowly in this case, allowing more MAC addresses to be assigned to the trunk.

The procedures for reception and transmission of the cost packets are discussed below and will help clarify how latency and throughput are passed from switch to switch. Table 6 shows the type of information that the switch must keep, together with example data. The table is indexed by the edge switch whose costs are kept. For each edge switch, two sets of values are kept, and each set is referenced by the sequence number of, the cost packet that the information reflects. The reason for having two sets of information will become clear later in this section. Definition of the information in Table 6 are as follows:

1. Load Balance Switch ID: MAC address for the edge switch whose information is stored.
2. loop detect bit offset: Loop detection bit offset used by the load balance switch in the table.
3. sequence #: Sequence number for the cost packet whose cost is referenced.
4. throughput/latency: Cost value to get to the edge switch in question. Best path is determined by throughput/latency with the throughput normalized.
5. port #: Port number on which to get to the edge switch.

TABLE 6

Switch Cost Table

| Load Balance Switch ID | loop detect bit offset | seq. #1 | Throughput (speed)/ latency 1 (Dex/Hex) | port # | seq. #2 | Throughput (speed)/ latency 2 (Dex/Hex) | port #2 |
|---|---|---|---|---|---|---|---|
| 080090EF0809 | 37 | 268 | 100/3BD8 | 7 | 269 | 100/3EE4 | 7 |
| 080090A80001 | 6 | 46501 | 1000/7E7 | 9 | 46500 | 1000/3F3 | 8 |
| 080090C3E050 | 151 | — | FFFFFFFF/0 | — | 0 | 100/575F | 1 |

Table 6 would likely have additional cost entries with different ports for a given edge switch ID and sequence number when there are multiple paths back to the edge switch. These are not shown. Also not shown are the port groupings based on the edge switch port that they get back to. Those entries would be used as described above when different source MAC addresses are set up in a given convergence time interval. The particular implementation may limit the number of paths to a given edge switch to some reasonable value to save on memory (say 5 to 10 alternate paths).

Also not shown in Table 6 is the hop count and/or traffic volume, which may be used as a tie breaker in some cases. The implementor will probably want to store the MAC entries with a hash function since the MAC address space is very large and somewhat random.

Cost Packet Reception—When a switch port receives an cost packet, it will immediately update its tables and send out an acknowledgment packet with the send edge switch broadcast flag set appropriately (see discussion in section 3.4). To update its tables, the switch will first add the outbound queue cost for the port it received the packet on to the switch referenced in the packet. This cost information is then used to update the switch cost table with the following rules:

1. If the switch ID is not in the tables, two table entries are created for it with the latency cost set to 0xFFFFFFFF and the throughput set to 0. This condition could only occur if the loop detect bit request had been lost, and then only if the cost packet receipt represents the first time that an edge switch is heard from. The switch then checks to see that the loop detect bit offset is not the same one it picked. If it is, the switch must re-negotiate the bit it wants to use if it has the lower MAC address. Otherwise, it will send a loop bit NAK directed to the switch that sent the cost packet. In the meantime, it can go ahead and use the bit it has, since the switch that initiated the request will not be using it for this cost packet anyway. Once loop bit negotiation completes, the switch must not use the bit until the next sequence number occurs. In other words, it must continue to use the same loop detection bit for a given switch ID (source MAC address)/sequence number pair. This corner case will require a small amount of state information to be kept (i.e., the loop bit used must be kept in the table). In any case, the cost packet is forwarded out all load balance links except the link that received it, with the cost incremented appropriately. Should the cost packet for the edge switch and sequence number be received again and the loop detect bit is set, then the packet is dropped. An implementation may wish to time out switch table entries that are not updated after some time-out period (on the order of twice the worst case cost timer period) if and/or when memory space is lacking. Since this the first time a switch has seen a cost packet from this edge switch, it will set the broadcast learn flag in the acknowledgment of the cost packet (discussed below).

2. If the switch ID exists in the tables and the sequence number of the packet does not match any entries in the tables, then the first entry with a latency of 0xFFFFFFFF is overwritten. If no entries with a latency of 0xFFFFFFFF exist, then the oldest of the two sequence number entries is overwritten if flag bit 15 is clear. Otherwise the newest of the two sequence numbers is overwritten. The packet is then transmitted as described below. This is the typical or steady state case were periodic cost packets are received. Normally the sequence number overwritten will be 2 less (in 16 bit circular number space) than the sequence number that overwrites it. For example, if sequence numbers 2 and 3 are in the table, a packet with sequence number 4 will overwrite 2, a packet with sequence number 5 will overwrite 3, a packet with sequence number 6 will overwrite 4, and so on. Should the loop detect bit offset of the load balance switch not match that in the tables, the tables are updated. If the loop detect bit is the same as the receiving switch, then it must either send a NAK or start the re-negotiation of the loop detect bit as in step 1. If the loop detect bit has been set, then some other switch along the path is using the same loop detect bit offset. In this case, the receiving switch must start a re-negotiation of its own loop detect bit offset since it does not know the owner of the duplicate. However, it can safely enter this first path in its table since this is the first time it has received this sequence number/MAC address pair. This corner case could occur if some of the loop detect bit offset negotiation packets were lost. In any case, the packet is forwarded as usual and the current loop detect bit is used. This transient condition may lead to the loss of a path for one sequence number period, but is guaranteed to prevent loops and still allows full connectivity. Note that if both entries in the table are 0xFFFFFFFF, then this is the first time that the switch has seen a cost packet from this edge switch and, as in case 1 above, it must set the broadcast learn flag in the acknowledgment packet.

3. If the switch ID exists in the tables, the sequence number of the packet matches that of one of the entries in the tables, and the port load factor for the path is lower than the previous value, then the port load factor is added to the table entry and the packet is forwarded out all ports except the port it was received on. The conditions for this step would occur when the cost packet was received once, and subsequently received again via a different path with a lower port load factor. As in step 2 above, it is possible for the loop detection bit to be set. In this case, the receiving switch should also trigger a re-negotiation of the loop detect bit offset. However it can safely enter this first path in its tables since this cannot be a looped path if the port load factor is lower. This corner case with the loop bit set could occur if some of the loop detect bit offset negotiation packets were lost. In any case, the packet is forwarded as usual and the current loop detect bit is used. This transient condition may lead to the loss of more costly paths for one sequence number period, but is guaranteed to prevent loops and still allow full connectivity.

4. If the switch ID exists in the tables, the sequence number of the packet matches that of one of the entries in the tables, and the port load factor for this path is greater than the previous value, the packet is dropped. However, it may be kept as an alternate route if the loop bit is not set.

5. In all cases where an entry is updated, the port to put in the table is the port the packet was received on.

6. If the hop count or retransmission count is 15, then the path may be used in all cases. However, the packet is never forwarded. The value 15 is the maximum and may be configured to a smaller value by advanced users.

7. In all cases where the loop bit offset sent by the edge switch in the cost packet matches the loop bit a switch uses, the switch must either renegotiate the loop bit or send a NAK to the edge switch to force it to renegotiate. This should only be done the first time a given sequence number is received from the switch. The NAK is only sent if the edge switch has a lower MAC address.

8. In all cases where the overwrite newest sequence number flag is set, the receiving switch must reply with the broadcast learn flag set in the acknowledgment, but only on the first instance of this cost packet. A broadcast delete packet must be sent out on the port that previously was used for this broadcast path, unless it is the same port as the one on which the cost packet was received.

9. In all cases where a delete broadcast packet is necessary, the ACK for the broadcast delete must be received before the cost packet ACK is sent with the broadcast learn flag set.

10. In all cases where the receive port is a member of a trunk port, the switch should wait for all the trunk ports to respond before forwarding the cost packet. The worst case retransmission count from the trunk ports should be used in the forwarded packet in this case. The same is true for the hop count although it had better be the same as the worst case retransmission count. The best port load factor is the value forwarded, however. Although not mandatory, this will help cut down on unnecessary cost packet forwarding. If the packet is not to be forwarded, then the only action is to keep the alternate route if it is non-looped. An alternate approach is to average the cost of the trunked ports. This would require waiting for all the cost packets before forwarding the information.

The acknowledgment to the cost packet serves two purposes. One is to indicate to the transmitting switch that the packet has been received. The other is to indicate to the transmitting switch which path broadcast packets, multicast packets and MAC address information packets should be sent down. Unlike cost packets, the MAC address information packets are not sent out all ports, but instead follow the broadcast pruned tree to minimize their impact on the network.

Typically the first cost packet received with a given load balance switch ID is the one chosen. To make this choice, the acknowledging switch will set the broadcast learn flag in the acknowledgment. Future cost packets for this load balance switch ID will not have the bit set. Since the source MAC address of the switch cost packet is that of the initiating edge switch, it is possible (indeed, inevitable in a mesh topology) for a receiving switch to see this packet on many ports. The code on the receiving switch must therefore ignore move interrupts for this MAC address if the hardware provides this functionality. The MAC address table of the receiving switch should associate the edge switch MAC address with both the current port and the best path back to the edge switch.

| Action Overview for Received Cost packet (legend for columns below) | | | | | | |
|---|---|---|---|---|---|---|
| Action | *1 | *2 | *3 | *4 | *5 | *6 |
| Create switch table entry, add the entry to the table wait for the other trunked ports before forwarding the cost packet and add the broadcast path | False | NA | NA | True | False | True |
| Create switch table entry, add the entry to the table wait for the other trunked ports before forwarding the cost packet and add the broadcast path, renegotiate the loop bit. | True | NA | NA | True | False | True |

-continued

Action Overview for Received Cost packet
(legend for columns below)

| Action | *1 | *2 | *3 | *4 | *5 | *6 |
| --- | --- | --- | --- | --- | --- | --- |
| Create switch table entry, add the entry to the table Froward the cost packet and add the broadcast path | False | NA | NA | True | True | NA |
| Create switch table entry, add the entry to the table wait forward the cost packet and add the broadcast path, renegotiate the loop bit. | True | NA | NA | True | True | NA |
| Add entry to table. If the overwrite bit is set, overwrite the newest sequence number, remove the old broadcast path and set up the new broadcast path. Wait for the other trunked ports before forwarding the cost packet | False | NA | True | False | False | True |
| Add entry to table. If the overwrite bit is set, overwrite the newest sequence number, remove the old broadcast path and set up the new broadcast path. Wait for the other trunked ports before forwarding the cost packet. Renegotiate the loop bit | True | NA | True | False | False | True |
| Add entry to table forward the cost packet. If the overwrite bit is set, overwrite the newest sequence number, remove the old broadcast path and set up the new broadcast path. | False | NA | True | False | True | NA |
| Add entry to table forward the cost packet. If the overwrite bit is set, overwrite the newest sequence number, remove the old broadcast path and set up the new broadcast path. Renegotiate the loop bit | True | NA | True | False | True | NA |
| Overwrite the entry in the table. If the overwrite bit is set, overwrite the newest sequence number, remove the old broadcast path and set up the new broadcast path. Wait for the other trunked ports before forwarding the cost packet. | False | True | False | False | False | True |
| Overwrite the entry in the table. If the overwrite bit is set, overwrite the newest sequence number, remove the old broadcast path and set up the new broadcast path. Wait for the other trunked ports before forwarding the cost packet. Renegotiate the loop bit | True | True | False | False | False | True |
| Overwrite the entry in the table, forward the cost packet. If the overwrite bit is set, overwrite the newest sequence number, remove the old broadcast path and set up the new broadcast path. | False | True | False | False | True | NA |
| Overwrite the entry in the table, forward the cost packet. If the overwrite bit is set, overwrite the newest sequence number, remove the old broadcast path and set up the new broadcast path. Renegotiate the loop bit | True | True | False | False | True | NA |

-continued

Action Overview for Received Cost packet
(legend for columns below)

| Action | *1 | *2 | *3 | *4 | *5 | *6 |
|---|---|---|---|---|---|---|
| Keep the entry as an alternate route for link failure. Note: This may be a duplicate packet if the cost and port the cost packet was received on is the same. (In this case the alternate should already have been set up and only an ACK is required. | False | False | False | False | NA | NA |
| Drop the packet | True | False | False | False | NA | NA |

*6 Packet received on a Trunk Port
*5 Packet has been received on all the Trunked ports or on a non-trunked port.
*4 New Edge Switch ID
*3 New Sequence Number
*2 New Smaller Port load factor (lower cost) to known edge switch port
*1 Loop Detect Bit already in use Convergence—Since cost packets should very quickly traverse the switch mesh, convergence to the possible paths should happen very quickly. However, if any packets are lost and retransmissions are necessary, convergence may take as long as 10 or more seconds (say 10 hops each, losing 1 packet with a 1 second retransmission time). The retransmission count in the cost packet prevents packets that get retransmitted too many times from being forwarded after the convergence time for the sequence number. If this was not done, there would be a very small possibility that a loop could form, since a path could be in the process of converging while the edge switch tries to use it.

However, the goal is to use converged paths. To accomplish this, paths are kept for two different sequence numbers. One set of paths is used, and the other is waiting to converge. When an edge switch sends out a cost packet, it will keep track of the sequence number it has sent. When it then goes to inform all the switches about a MAC address it has learned about, it will tell them to use a path back to this edge switch that is at least 30 seconds old. The edge switch will indicate which sequence number path to use and it will not use a cost packet sequence number that is newer than 30 seconds. This interval was chosen as a estimate of the worst case convergence time.

If a new source address is learned before path convergence, a loop could accidently develop. This would "black hole" packets sent to this new source and cause them to loop within the load-balance switches. Not until a new MAC address learn occurs for the MAC address would this situation be corrected.

One solution to this difficulty is to use a new path each time a new cost packet is sent out. This allows a path for a given sequence number to be used for ~50% of the time it exists in a given switch table. For example, when a packet with sequence number 10 is sent out, sequence number 9's path is the one to use; when a packet with sequence number 11 is sent out, sequence number 10's path is the one to use. Doing this implies that the periodic transmission of cost packets should not be less than 30 seconds.

This algorithm has the added advantage that a network with very long convergence can be accommodated by increasing the time between cost packets. The cost packet transmission timer determines how quickly the path to a given switch can change. A default of 30 seconds appears reasonable, although this value should be adjustable by the user. This value does not need to be the same on each switch. However, the time-out for edge switches should not be less than the longest cost packet timer.

The shorter the timer is set for, the quicker the load-balancing can respond to changes at the expense of slightly more network overhead. For trunked ports, a switch will be able to keep multiple paths during a given period and "round robin" the use of these paths as described above. This prevents the over use of a given path if multiple source addresses are learned within the convergence period. All non-looped paths can be kept (implementation may limit how many). The alternate routes are used during link failure and these alternate paths are already converged. The delay between link failure and alternate route use can be very small.

In some cases, an edge switch may wish to restart the 30 second convergence time. This could occur when a new switch or even a new switch port has just come up and the network wants to be able to use the new path as quickly as possible. To do this, the edge switch would send out a new switch cost packet with bit 0 of the flag bit set. This would tell the switches receiving the packet to overwrite the newest sequence number and leave the older converged value in place. The edge switch would then continue to use the older converged value until it sends out the next switch cost packet. This next switch cost packet would be sent out after a 30 second time-out (just like at start-up) to allow the new switch to have a converged sequence number to use. It will only be necessary for the edge switch to set the flag bit in the packet if the newest outstanding sequence number is less than 30 seconds old. If it is more than 30 seconds old, the newest value can be used and the edge switch can merely send out two normal switch cost packets spaced at 30 second intervals.

In practice, it may be wise to wait for 5 seconds before restarting the convergence time. This allows for a greater probability that the overwrite bit need not be set, and also allows for other switch ports that have just come up to be part of the new convergence sequence. For example, the extra 5 seconds may allow the newest outstanding sequence number to age to 30 seconds and/or may allow time for other ports just coming up to be included in the sequence, as when a switch has just booted.

Cost Packet Transmission—As mentioned before, the switch cost packet is sent whenever the port state goes to load balance link established and has negotiated its loop detection bit. At initial boot, it may be worthwhile to wait a moment to give all ports a chance to come up before sending the initial cost packet. In this way, the same packet can be sent out each port. If a port comes up later, then a new set of packets is sent out all the ports with a different sequence number. If a port comes up before the last sequence number sent out has had time to converge, then the packet will need to set the flag to overwrite the newest sequence number so that the older number can be used while the newest value converges.

Each time a packets is sent out, a timer is started for the next time the transmitting switch will send this set of packets out on all ports. The initial value for the timer may be shorter than the subsequent time used (say 30 seconds) so that the first sequence number is ready to use quickly. Each time a port comes up, the timer is started for 30 seconds. The longer value is only used once ports are in a stable state (either up or down for more than the 30 second period). Not until 30 seconds have passed from the initial transmission of the very first cost packet after switch bootup can links not in the load balance domain forward traffic into the load balance domain. Before this time the load balance domain ports are left in a blocked state, allowing only load balance traffic (i.e., load balance hellos).

To remove this limitation, an implementation may use the reserved sequence number of 0xFFFF to indicate that the broadcast path is to be used for the MAC address information packets.

The sequence number for the packet should start at 0 only after initial bootup of the switch. From then on it should increment up, and only be 0 again when it wraps at 0xFFFE. If no acknowledgment is received within 1 second, the switch will retransmit the switch cost packet up to 5 times. If after 5 times the acknowledgment is not received, the state of the port is reset to the initial hello state, at which point the protocol will try and re-establish the load balance link. The reception of an acknowledgment with the correct sequence number will terminate further retransmissions.

The sequence number for the packet is kept the same for each retransmission. Each time a packet is retransmitted, the retransmission count in the packet is incremented. If the count gets over 15, the packet is dropped and no longer retransmitted down a given port. The packet still may be successful down other ports. In fact, it may have been successful on the port it was retransmitted on if the ACK's had been lost. In any case, it will either make it in time or be dropped for a given path.

The retransmission count value of 15 was chosen since each transmission takes 1 second, convergence time is 30 seconds, and the time for queuing and processing overhead in the switches is probably, worst case, on the order of 15 seconds.

Construction of the switch cost packet obeys the following rules:

1. When a switch (an edge switch) initiates the switch cost packet, the cost will only include the inbound queue cost for the link the packet is being sent out on. For this case, the port speed of the port the cost packet will be sent on is used for latency calculation (this is the port from which the edge switch will receive data packets on this particular path). The hop count, retransmission count and all loop detection bits are set to 0. Although the switch could set its own loop detection bit, this is not necessary since it can recognize the packet if it is looped back by the source MAC address. The throughput value will reflect that of the port the packet is being sent out on. When a switch sends the first cost packet out, it should set the overwrite newest sequence bit in the packet. This will force all switches along the path to set up the pruned broadcast tree.

2. When a switch initiates the switch cost packet, the source MAC address is that of the switch, that is, the source MAC address is used as the ID for the initiating edge switch.

3. When a switch initiates the switch cost packet, it will indicate the port speed in the cost packet. This will allow other switches to recognize where bottlenecks exist.

4. When a switch is forwarding a switch cost packet from another switch, it will add the inbound queue cost for the link that the cost packet is being transmitted out on to the received cost in the packet. However, the port speed to use in the calculation for inbound queue is that of the fastest throughput received for the edge switch accessed, not the port that the inbound queuing occurs on. This is because the inbound queue is merely queuing packets for another port's outbound queue. The packet forwarded out each port will probably have a slightly different cost depending on inbound queuing. Other factors added to the cost are the latency from the outbound queue of the port the cost packet was received on as well as packet drop information as discussed herein in cost calculations. The packet is never forwarded back out the port it was received on (split horizon). The hop count is incremented by 1 and the loop detection bit is set for the switch forwarding the packet. If the hop count goes past 15 (or smaller limit set by the user), the packet is dropped. The throughput parameter forwarded in the packet is the smaller of the value in the packet or the port the packet is being sent out on.

5. When a switch is forwarding a switch cost packet from another switch, it must leave the source MAC address as it is, since this indicates which edge switch the packet is referencing.

As noted above, a bit in the reserved portion of the protocol headers in cost packets is used in conjunction with the spanning tree protocol to signify that the receiving switch should flush its address tables after a brief timeout period if no further packets are received from the address. In the preferred embodiment, this bit (also referred to as the STP flush flag) is set whenever the first cost packet is sent out as the mesh comes up (or restarts if all mesh ports were down and now one comes up) and the spanning tree protocol (STP) is enabled.

Figure 15:
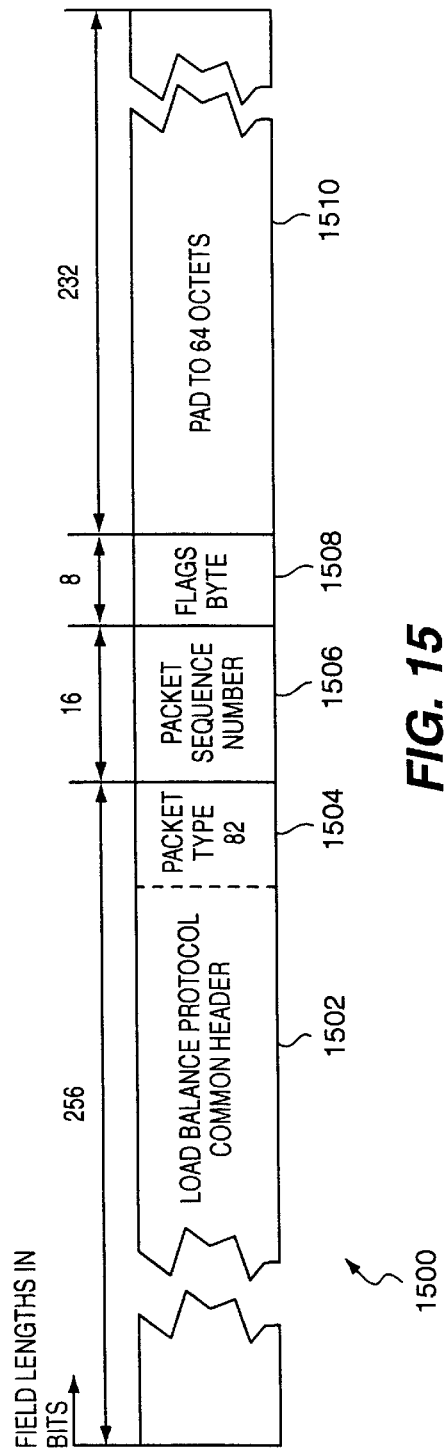
FIG. 15 is a diagram of a cost packet acknowledgment packet used in the cost propagation protocol of the present invention.

Cost Acknowledgment Packet—This packet is sent out every time a switch receives a switch cost packet. The format of the cost acknowledgment packet is illustrated in FIG. 15. As shown, the packet has the same type 1504 as the switch cost packet, only with the acknowledgment bit set.

The cost acknowledgment packet only contains the sequence number 1506 after the packet it is acknowledging and a flag in field 508 to indicate whether broadcast packets from the edge switch should be sent down this path. The broadcast learn flag in field 1508 is set to 0 to indicate that no broadcast packets from this edge switch should go down this path, or set to 1 to indicate that they should be sent down this path. This mechanism is how the pruned broadcast tree is constructed.

To uniquely associate the cost packet acknowledgment and the cost packet it acknowledges, the sequence number and the MAC address of the edge switch that initiated the cost packet are used in the acknowledgment packet. The switch will send the ACK packet with the MAC address of the edge switch set as the source address field in the packet.

The broadcast learn flag should only be used on the first cost packet received from a given edge switch, or if the cost packet has the overwrite newest sequence number set. In all cases, the receiving switch should only set this bit once for a given edge switch. Otherwise, duplicate broadcast packets would be received. The broadcast learn flag is bit 0 of the flags byte 1508 in the packet. The other bits are reserved for future use.

Once a path is picked, the broadcasts stay on that port until re-boot or until the overwrite newest sequence number bit is set in the cost packet. Typically the first cost packet received for a given sequence number will be the one that the switch will set for this purpose. When a switch receives an acknowledgment with the broadcast learn flag set, it will put the port it received the packet on in the broadcast pruned tree for the edge switch MAC address. Future MAC addresses associated with the edge switch via the MAC address learn packet will also use this broadcast pruned tree. The details of how the MAC address learn occurs are discussed in section 3.5.

The ACK packet uses the same source MAC addresses as the cost packet it serves to acknowledge. Further, the sequence number is duplicated in the ACK at the same location as in the cost packet. This allows the implementor to change the cost packet into a corresponding ACK packet for response with minimal effort and complexity.

3.3.4. Switch Update Cost Packet (Non Directed Version is Optional)

The switch update cost packet is used to trigger the early sending of a switch cost packet. This is done to minimize the time it takes for a switch with ports that have just come up to have converged paths available. If the update packet was not sent, it could take up to two cost packet time intervals for some switches to learn about all the paths to edge switches.

When a switch has a link that has just come up, it will send an update packet out all ports but the port that just came up if it knows that an edge switch with known cost can be reached on the port. The switch that receives the packet will check to make sure it is not a duplicate and then forward the packet in conformity with the rules stated below. If no edge switch with known cost is on the port (i.e no switch cost packet has been received on the port) then no update is sent out that port.

A special form of the switch update cost packet is used to direct an update at a specific edge switch (a directed update). This situation would occur if a link is lost and a switch needs to re-establish a broadcast path back to a given edge switch, or if a MAC address information packet is received for an unknown edge switch. While neither event should occur, this feature has been added for robustness In the case of a link failure, the directed form of the packet is used in conjunction with a type 1 query and is sent when the type 1 query has found a new path to the edge switch. The undirected form of this special packet has been left optional since the preferred embodiment protocol will work fine without it. The only consequence of not sending it is that it could take up to 2 convergence times before a new port that has just come can be used.

It should be noted that the undirected form of the switch update cost packet is not a requirement of the protocol but rather reduces the time for a new switch added to the load balance domain of a network to learn information about other edge switches. Without the use of the undirected form of the switch update cost packet, it may take up to 30 seconds for a switch to learn about the existence of other edge switches after first joining the load balance domain.

Without the undirected form of the switch update cost packet, information about other edge switches may be learned from the exchange of hello protocol packets as discussed above. The hello packets would need to be modified to include path information as well as the addresses of the edge switches. The loop bits could be used to identify the path in relatively little space in the hello packets. This technique would not be preferred because the broadcast path would need to be setup first to obtain full connectivity information.

Figure 16:
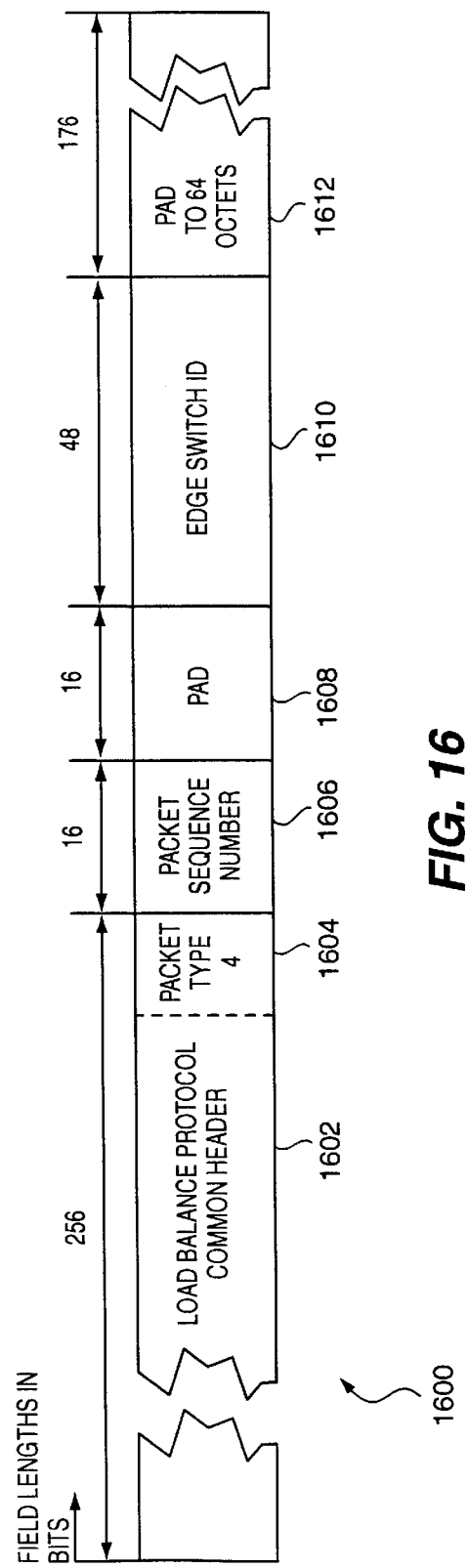
FIG. 16 is a diagram of an update cost packet used in the cost propagation protocol of the present invention.

The format of the switch update cost packet is shown in FIG. 16. The packet type 1604 for the switch update cost packet is 4. Following the packet type is a 16 bit sequence number 1606. The sequence number is used to recognize the same packet from a given switch to prevent looping. The sequence number is also passed in the acknowledgment.

Following the sequence number is a 16 bit pad 1608 to get the packet to a 4 byte boundary, which in turn is followed by an optional 6 byte edge switch ID 1610. The edge switch ID field is normally set to null except for the case where a single specific edge switch has been targeted. Also see section 3.4.2 on broadcast path reestablishment for use of the directed form of the update packet.

Update Cost Packet Reception—When a switch port receives an update cost packet, it will determine whether the packet is a duplicate. If so, the packet is dropped. In the directed update case, the packet is ACKd and then dropped.

The determination that a packet is a duplicate is made by keeping track of the sequence number and source MAC address of the update packet. Implementations may wish to keep the update sequence number as another field in the cost table described in Table 6 above. If sequence number and source MAC address match the last update received, then it is a duplicate. If not, it is a new packet.

This cache of sequence numbers and MAC addresses should be flushed after 30 seconds. This allows a switch that was re-booted after 30 seconds, and is not smart enough to pick a new sequence number at bootup, to still successfully pass a switch update cost packet. Note that the sequence number of a switch update cost packet is not in the same sequence space as that of the switch cost packet or switch loop bit packet. If this is the first time that a switch has seen this switch update cost packet (as determined by the sequence number transmitted therewith), it will forward the packet out all ports but the one it received it on.

In the case of the directed packet, only the target edge switch will see the packet since the destination MAC address is that of the target switch. In the non-directed case, the receiving edge switch will randomly pick a time of 3 to 5 seconds and start a timer the first time it sees the packet. If no new update packets occur before the timer expires, the switch will send out a switch cost packet as described previously section. If this is the targeted edge switch of a directed update, then it will immediately send out the switch cost packet with the overwrite newest sequence flag set, allowing for new broadcast paths to be set up.

In either case, the switch will then restart the switch cost packet timer to 30 seconds so that convergence can occur quickly on the new ports. Any path that is currently converged is still usable.

If a new non-directed update packet is received before the 3 to 5 second interval then, the 3 to 5 second timer is restarted. This gives time to accumulate multiple port up triggers before starting the convergence sequence. The randomness prevents all switches from sending out cost packet at the same time. In the directed case, the target edge switch will immediately send an ACK directed at the source of the packet. If duplicate directed packets are received (and this is likely), the switch must send an ACK for each one.

However, it will only initiate a cost packet transmission for the first one. If the edge switch ID does not match the switch's MAC address (and this should not happen), the packet is dropped.

Update Cost Packet Transmission—As mentioned earlier, the non-directed switch update cost packet can optionally be sent when the port state goes to load balance link established and the switch has entries in its tables. This form of the packet has the destination MAC address set to the special load balance MAC address normally used by load balance packets and the MAC address ID of the edge switch set to 0, triggering all edge switches to send cost packets.

If the switch does not know about any other switches when the port comes up, it will not send an update packet. This can happen at initial boot, where the switch knows only about itself and nothing about any other edge switches. In this case, the switch depends on switches that it is connected to to initiate the update. Alternatively, if all the switches in the domain are booted at once, then the normal sending of switch cost packets will update it. If the switch does not have switch entries in its tables, then it constructs the switch update cost packet with a new sequence number. Ideally this number is not re-used until it wraps, even between switch re-boots. The packet is then transmitted out all up ports except the port that just came up.

The switch on the other side of the port that just came up will handle the far side. Since this command is optional, no acknowledgment is sent. If the packet gets lost along the way, subsequent switch cost packets will update it and make the path usable within 2 convergence times.

When a link is broken, a switch sends out a type 1 query to find an alternate path to any edge switches whose paths are lost due to the link failure. The type 1 query is propagated as described herein and completes when it finds an alternate path. The switch that terminates the type 1 query propagation then generates a directed update cost packet with updated information for the switch to which the path was lost. This update packet will force that switch to send out a new cost packet with the override bit set to force reconstruction of the broadcast path. If the cost update is not responded to after 5 retransmissions, the target edge switch is removed from the addressing tables. As with other acknowledgment packets, the source MAC address in the ACK packet is that of the sending switch. This along with the sequence number allows the sending switch to associate the acknowledgment with a given update packet.

3.4. Switch Broadcast Paths

Although broadcast path set up has been discussed in previous sections, this section will consolidate the information and discuss other aspects such as rebuilding the pruned broadcast tree after a link failure. Unlike the unicast packets where the paths are picked based on cost back to the edge switch, broadcast paths are picked going from the edge switch. The pruned tree is set up once back to each load balance switch and all user MAC addresses connected to that switch will use the same pruned tree. Only when link failures occur, or when new or recovered links are brought up, will this pruned tree be rebuilt.

Although it may be possible in theory to have a different pruned tree for each source MAC address, this would require the hardware to have a list of ports associated with each MAC address for the transmission of broadcasts from that MAC address. Though an implementor may compress the list representation to, for example, a bit mask field using the loop bit offset identifiers of each switch, this would add considerable overhead to the protocol when link failures occurred. This same pruned tree can also be used for multicast addresses. Note that multicast protocols such as IGMP can be used to further prune back the tree to those ports that have joined the multicast traffic at the edge of the load balance domain. Section 4.2 below provides additional details regarding operation of the IGMP protocol in switches operable in accordance with the present invention. For switches that run the IGMP protocol, the packets for the protocol would only be sent along the pruned tree.

Note that since multiple pruned trees exist (e.g., one per edge switch), it may be possible to get out of sequence control traffic. For example, if one switch sends multicast request packets to 2 other switches and they (or their connected hosts) respond to the packet with multicast responses, it is possible for the response to get to one of the switches before the original multicast request While no known protocol does this, should one come up, it may be necessary to enhance the preferred embodiment protocol to allow for a single path for all switches. This would, however, remove the throughput advantage for broadcast/multicast packets that the preferred embodiment protocol provides.

3.4.1. Broadcast Path Establishment

When the first cost packet from a given edge switch is received, the receiving switch will send back an ACK packet with the broadcast learn flag set. This will tell the switch that receives the ACK packet that all future broadcast packets that originate from hosts connected to the referenced edge switch will be sent out this port. The broadcast state of the edge switch being set up goes from the un-established state to the established state with no broadcast dependencies. That is, the broadcast path is set up and no other switches depend on this switch for the broadcast path. This also includes MAC address information packets sent from the edge switch since they are transmitted in accordance with the broadcast pruned tree. All subsequent cost packets on different ports will not have the broadcast learn flag set in the ACK packet. Implementations may choose always to set the broadcast learn flag on all cost packets from a given edge switch on the port picked for the broadcast path as this may be easier than trying to recognize when the ACK was lost and they are receiving a retransmission of the initial cost packet. This choice may be simpler to implement and adds robustness to the protocol.

By using the first cost packet received from a given edge switch, the switch receiving the cost packet is picking the initial lowest latency path from the edge switch. The load balance protocol also gains in efficiency since it does not require a separate pass or packet type for broadcast path setup. The cost information in the packet is not necessarily relevant since it is the cost to the edge switch not from the edge switch. Both the ACK transmitter and receiver must keep track of which port the broadcast has been set up on. This information will be needed if a new port must be chosen due to link failure somewhere in the network.

The switch that requests the setup (sends the ACK with the broadcast learn flag set) must keep track of the number of broadcast paths it has set up on the link. This information is used on later link failure to evenly distribute broadcasts paths that need to be reestablished. When broadcasts are received at a switch from the pruned tree, the switch will forward the broadcasts out its other ports in the load balance domain which are deeper in the same pruned tree and all ports not in the load balance domain (assuming that VLAN tagging allows the broadcast packet out the given ports).

Figure 18:
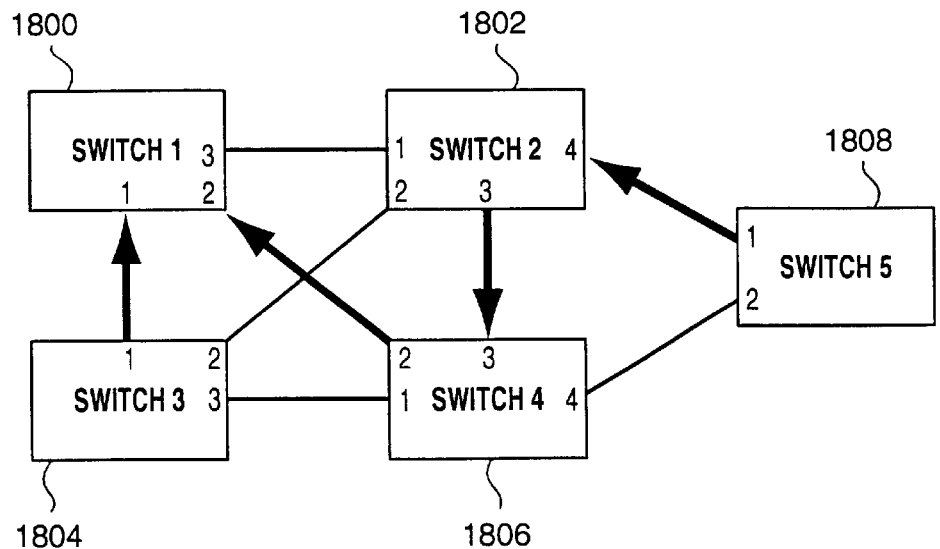
FIG. 18 depicts an exemplary pruned broadcast tree determined in accordance with the protocols of the present invention.

When a broadcast is received from a port outside the load balance domain, the packet is forwarded out all other ports not in the load balance domain and to those ports in the domain for which it is in the pruned tree. As above, VLAN configuration may limit the non-load balance ports. FIG. 18 shows a possible pruned tree in a switch mesh back to switch 1.

3.4.2. Link Failure (Re-learning the Broadcast Path)

A link fails when a hello packet dead interval expires, any one of the load balance packets that require ACK fails to receive it after the maximum number of retransmissions (5), or link beat disappears, goes away). When a link fails, the switch that lost the link must determine whether it had set up any broadcast paths back to other load balance switches. If so, it must find a new path for these broadcasts to follow.

This problem can be broken into 2 different scenarios, one where only a single new broadcast link needs to be set up between adjacent switches, and a second where the entire broadcast path between all the switches must be reconstructed. The first scenario is simpler and occurs when a given broadcast path is lost to a switch and no other switches depend on it to deliver the broadcasts. For example, referring to FIG. 18, the arrows show an exemplary path of cost packet ACKs with the broadcast learn flag set. The broadcast packets forwarded from switch 1800 travel the same paths in the reverse direction.

If the link between switch 1800 and switch 1804 is lost (port 1 switch 1800 to port 1 switch 1804), switch 1804 will need a new path for broadcasts from switch 1800 and the host MAC addresses connected to it. Since no other switches depend on switch 1804 for those broadcasts, switch 1804 can pick the highest throughput and lowest hop count available to switch 1800. Note that only throughput and hop count are used, path latency-cost is not used since latency is the latency cost associated with packets directed TO switch 1800, not FROM switch 1800.

Once this new path is determined, a switch broadcast add packet will be sent out this port to the adjacent switch to reform the link. The format of the switch broadcast add packet is shown in FIG. 19.

The packet type 1904 for the switch broadcast add packet is 5. Following the packet type is a field 1906 representing the number of switch ID's that the sending switch is requesting links for. Next is a 24 bit pad 1908 to get to the next 4 byte boundary. Following this are groups of 64 bits (e.g., 1910, 1912, 1914) that include a 16 bit pad followed by a 48 bit MAC address.

For each edge switch connection to be established, there needs to be one MAC address included. This will allow room for up to 184 edge switches in a given packet. If more are required, then a subsequent broadcast add packet must be sent. For each broadcast sent, an ACK packet must be received before another can be sent on a given port. Note that this packet is never forwarded, but only goes between adjacent edge switches. The following discussion describes the actions that an edge switch must take when sending and receiving a switch broadcast add packet.

Broadcast Add Packet Transmission: When a link goes down, the switch must remove all broadcast paths that it sourced for the adjacent switch on that link. It must then check for all edge switches that it set up to receive broadcasts from on that link. For those edge switches that it had set up to receive broadcasts for, it then checks whether any switches depended on it for broadcasts from those edge switches on links that are still up.

Next, those edge switches for which it does not need to propagate broadcasts are checked for alternate routes. The best throughput port is picked. In the event of multiple routes having the same throughput, hop count is used as a tie breaker. If the routes are still identical, the link with the fewest broadcast paths established is picked. Implementations should chose routes to evenly load the ports with broadcast paths if all other criteria are equal.

For all switch paths that are to be established on a given port, a switch broadcast add packet is constructed and sent out on the chosen link. Multiple packets may be needed if more than 184 broadcast paths need to be re-established on a given link. If no ACK is received within 1 second, the packet is retransmitted up to 5 times. If no ACK is received, the link goes back to the load balance hello initialization state and another alternate is picked if available. In the typical case, several ports may end up sending different switch broadcast add packets.

Broadcast Add Packet Reception: When a switch link receives a switch broadcast add packet, it will parse out all the edge switch MAC addresses in the packet. For each MAC address, it will add this port to the broadcast mask for the edge switch and all MAC addresses associated with the MAC address. This mask is the same for the edge switch MAC address and all its associated MAC addresses. Depending on hardware implementation, this may only be a single mask change.

The term "mask" is used here liberally. Different hardware may have a list of included ports rather than an & MASK. The concept is only to keep track of which ports broadcast packets from an edge switch are forwarded on. Note, the source MAC address in the packet determines which edge switch initiated the broadcast.

After modifying all the broadcast masks, the receiving switch sends out an ACK for the broadcast add, the format of which is identical to the broadcast add packet except that the ACK (response) bit is set in the packet type, making it 85 hex, and the source address is that of the ACKing switch. The ACK should include all the switch MAC addresses that it has successfully set up. In the event that the switch does not find one or more of the MAC addresses in the broadcast add packet, those MAC addresses must be removed from the ACK and the MAC address count must be reduced appropriately.

The only way this corner case condition could happen is if the switch that received the broadcast add packet had timed out a given edge switch. Upon receiving an ACK with missing edge switch IDs, the receiver of the ACK should immediately time-out the edge switch in question. Since the Broadcast Add packet has no sequence number, the receiving switch will not recognize a duplicate Broadcast Add Packet from a first time broadcast add packet. However since re-establishing a broadcast path on a port where the path has been established does no harm, detecting a duplicate broadcast add is not necessary.

The other case to examine is when the switch whose link went down had broadcast paths set up on the link and other adjacent switches depended on this switch for those broadcasts. At first glance, it might seem that the procedure described above could be employed. Unfortunately, this could lead to situations were switches could indirectly point to each other for the broadcast path and effectively cut all broadcasts out to the involved switches.

To picture this we will again use FIG. 18. Assume that the link between switch 1800 and switch 1806 is broken (port 2 switch 1800 to port 2 switch 1806). If switch 1806 picked switch 1808 to re-establish the broadcast path to switch 1800 (this could happen depending on link throughput) we would have a condition were no broadcasts from switch 1800 could reach any of switches 1802, 1806, or 1808. Upon examination, it becomes obvious that this can only happen if the switch whose link has broken has other switches that depend on it for these broadcasts.

To solve this problem, the method chosen in the preferred embodiment protocol is to rebuild the broadcast tree back from the edge switch. To do this, the switch whose link broke will send out a type 1 query which will, in turn, trigger the sending of a directed switch update cost packet as described in section 3.3.4 when the query has discovered the target edge switch.

In the normal case, the edge switch will respond with the switch update packet ACK and subsequently send out a new cost packet with the overwrite newest sequence bit set. This in turn will force all switches along the route to form a new pruned broadcast tree. As each switch receives the new cost packet, it removes all broadcast paths to those switches that depend on it for broadcasts from the given edge switch.

Note that to delete the broadcast path in this case, the switch removes the port(s) from the broadcast mask for the edge switch and the associated MAC addresses. Before acknowledging the cost packet, it must request the deletion (send a broadcast delete packet) and receive the delete ACK on any current broadcast path already set up on its behalf. This is necessary since a small window could open up where a broadcast packet could be duplicated if the old path is not torn down before the new path is established.

If the port that the cost packet came in on is the one it already had, the broadcast setup for it does not need to send the delete since it will already have been deleted by the switch that forwarded the cost packet. Doing so should cause no harm, but is unnecessary from a protocol point of view. Once the deletion is complete, it can ACK the cost packet to set up the broadcast path and forward it out the other switch ports as described in the cost packet section. This technique could be used for the case were the switch does not have any adjacent switches dependent on it for broadcast paths. However, these actions are more obtrusive to the network in that more switches need to get involved to re-establish broadcast paths. For this reason, the broadcast add packet was created so a less obtrusive procedure could be performed in many cases. An implementation may chose not to implement the broadcast add packet and always perform the complete broadcast path reconstruction described above.

3.4.3. Broadcast Path Removal

As mentioned above, there are cases were a switch will need to tell an adjacent edge switch that it has removed the broadcast path that it depended upon, and there are cases where it will request the deletion of a broadcast path that it had previously requested (or depended on). To perform these actions, the switch will send a switch broadcast delete packet.

The format of the switch broadcast delete packet is shown in FIG. 20. The packet type 2004 for the switch broadcast delete packet is 6. Following this is the switch ID 2006 (MAC address) of the switch broadcast path to remove. If the value of the MAC address to remove is 0xFFFFFFFFFFFF (all ones), then all broadcast paths associated with the port are removed with a general broadcast delete message (as described elsewhere herein).

Broadcast Delete Packet Transmission: When a switch needs to either inform an adjacent switch that the broadcast path it was using is going away, or is requesting an adjacent switch not to send it broadcasts for a given edge switch, it will send the broadcast delete packet. If it does not receive an ACK for the packet within 1 second, it will retransmit the broadcast delete up to 5 times, after which the link goes into the hello initialization state.

The source MAC address in the packet is that of the sending switch. The destination is the generic load balance protocol destination address. When the switch ID (MAC address) is set to 0xFFFFFFFFFFFF, then all broadcast paths to and from the port are removed. This general form of the packet (referred to above as a general broadcast delete message) is typically used when the hello link is first established and guarantees that both sides agree on the broadcast status of the link. This plugs a small corner case were one side believes that the link has dropped out of the hello established state and the other side does not. This can only occur if an unlikely sequence of hello request/responses are lost and others not (i.e., all the hellos in one direction are lost long enough for the other side to drop the link while hellos in the other direction keep the local link alive).

Note that when issuing a broadcast delete packet, a switch must await the ACK of the broadcast delete before ACKing any outstanding cost packets for the switch being deleted. This prevents one switch from thinking the removed switch is used for broadcast while other switches do not.

Broadcast Delete Packet Reception: Upon reception of a broadcast delete packet, the receiving switch will check if the switch ID (switch MAC address) is one that it currently is forwarding broadcast packets on this port. If so, it will remove this port from the broadcast mask for the given edge switch and associated MAC addresses learned on it.

The switch is not removed from the table. If it is not a port that it was forwarding the edge switch broadcasts on, then it checks whether it was expecting to receive broadcasts on the port. If so, it will wait for the next cost packet from the switch. If the next cost packet does not have the override newest sequence flag set, it will send a type 1 query to trigger it. Note that as with the broadcast add packet, the lack of a sequence prevents the receiver from detecting duplicate delete packets. However, since deleting a path that has already been deleted does no harm, duplicate detection is not necessary. In any case, the ACK is still sent.

3.4.4. Broadcast Path Moving

When a link fails, the procedures described in section 3.4.3 can be used to move broadcast paths to those links that are still up. However, if nothing is done to redistribute the links when a line comes back up, the domain could end up with some links bearing most of the broadcast traffic. To correct this situation, the following procedures for newly enabled (or re-enabled) links is defined.

When a link comes up and receives a cost packet for the very first time from a given edge switch, this port will become the broadcast path link, but if and only if no other ports received the cost packet (packet with the same switch ID and sequence number) first. This will tend to move broadcast paths to ports with the lowest current latency from the edge switch. Note that if this is not the first time a given edge switch cost packet has been received, it is not used to change the broadcast path since broadcast path changing can be disruptive.

Like the case of link failure, two cases need to be examined. The first and simpler case is where no other load balance switches depend on this switch to pass them broadcasts from the edge switch. Here, when the switch receives the cost packet that meets the criteria outlined above, it will delete the current broadcast path (if it exists) with a broadcast delete packet and return an ACK packet to the cost packet with the learn broadcast flag set. The ACK of the cost packet must wait until after the delete has been confirmed with the delete ACK. At this point, the cost packet can be forwarded as before.

The second case is where other switches depend on this switch for broadcasts from the edge switch. Although unlikely, it is possible that the cost packet went through an adjacent switch dependent on this switch broadcast path before it got to the switch with the newly enabled port. For this reason, the switch cannot merely move the broadcast port as in the simple case above. To handle this situation, the switch needs to send a directed update packet to the edge switch in question. No state changes need to occur. The switch can continue to use the currently set up broadcast path until the new cost packet arrives with the overwrite newest sequence number flag set. If in the recover state, the update packet is still sent and the path will be automatically re-established when the subsequent cost packet arrives with the overwrite newest sequence flag set.

3.4.5. Broadcast State Machine

Figure 21:
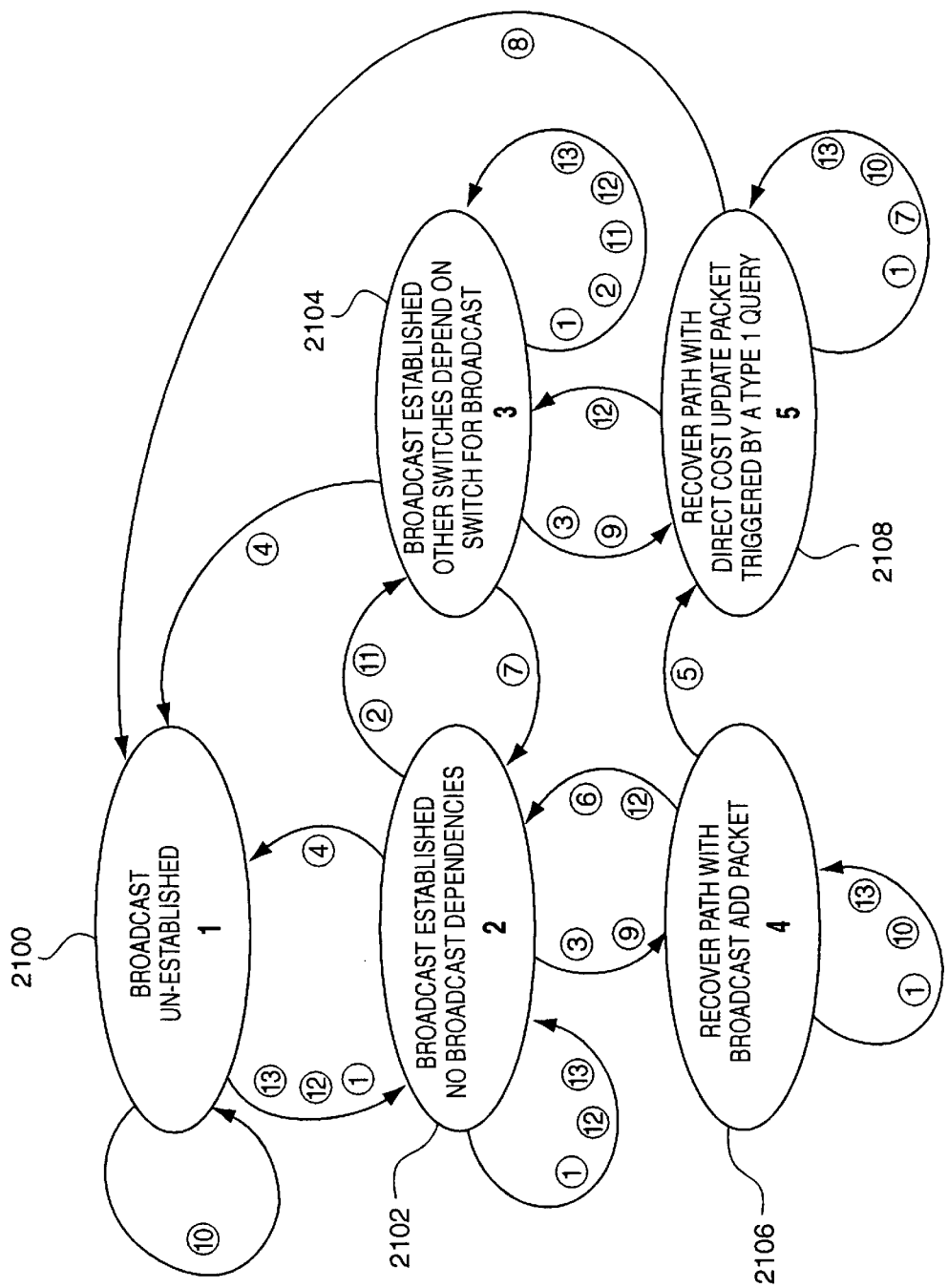
FIG. 21 depicts the broadcast path determination protocol state machine operable in the protocols of the present invention to determine a pruned tree broadcast path for switches operable in accordance with the present invention.

FIG. 21 shows the state machine that would exist for each load balance switch known by a load balance switch. There are 5 states for the broadcast state machine. They are defined as follows:

Un-estab: (Un-established)—Indicates that no broadcast path has been established for the edge switch.

Estab-nodep: (Established no dependencies)—Indicates that a broadcast path is established to the edge switch and no other adjacent switches depend on it for broadcasts to the edge switch.

Estab-dep: (Established dependencies)—Indicates that a broadcast path is established to the edge switch and other adjacent switches depend on it for broadcasts to the edge switch.

Recov-nodep: (Recovery no dependencies)—Indicates that a broadcast path has been broken to the edge switch, recovery is in progress, and no other adjacent switches depend on it for broadcasts to the edge switch.

Recov-dep: (Recovery dependencies)—Indicates that a broadcast path has been broken to the edge switch, recovery is in progress, and other adjacent switches depend on it for broadcasts to the edge switch.

Table 7 expresses the relationships between these states and their related events. The numbered events correspond to the labeled arrows (circled numbers) in the state diagram of FIG. 21. The column labels represent the states for transitions of the state machine. The parenthetic number in the column labels indicate the reference number in FIG. 21 for the corresponding state.

TABLE 7

Broadcast Event/State Table

| Events/States | Un estab | Estab nodep | Estab dep | Recov nodep | Recov dep |
|---|---|---|---|---|---|
| 1. Cost packet received without the overwrite newest sequence flag set. When state goes to established state nodep, the learn flag is set in the cost ACK. | Estab-nodep | Estab-nodep | Estab dep | Recov-nodep | Recov-dep |
| 2. Forwarded cost packet and returned ACK has the Broadcast learn flag set. | NA | Estab-dep | Estab-dep | NA | NA |
| 3. Broadcast Path lost to edge switch and alternate routes exists. | NA | Recov-nodep | Recov-dep | NA | NA |
| 4. Broadcast Path lost to edge switch and NO alternate routes exists. Dependent switches are sent a Broadcast delete packet | NA | Un-estab | Un-estab | NA | NA |
| 5. Broadcast Add Packet sent and no ACK was returned or returned without the broadcast path established for the edge switch. | NA | NA | NA | Recov-dep | NA |
| 6. Broadcast Add Packet sent and successfully ACKd | NA | NA | NA | Estab-nodep | NA |
| 7. Broadcast Delete Packet received from for all adjacent switches that depended on the switch for broadcasts from the given edge switch | NA | NA | Estab-nodep | NA | NA |
| 8. Transmission of a directed cost update packet to the edge switch | NA | NA | NA | NA | Un-estab |
| 9. Broadcast Delete Packet received from adjacent switch that this switch was dependent on. | NA | Recov-nodep | Recov-dep | NA | NA |
| 10. Broadcast Add packet received and ACK sent without the requested edge switch included | Un-estab | NA | NA | Recov-nodep | Recov-dep |
| 11. Broadcast Add packet received and ACK sent with the requested edge switch included | NA | Estab dep | Estab dep | NA | NA |

TABLE 7-continued

Broadcast Event/State Table

| Events/States | Un estab | Estab nodep | Estab dep | Recov nodep | Recov dep |
|---|---|---|---|---|---|
| 12. First Cost Packet received with overwrite newest sequence number flag set with a given sequence number Returned ACK always has the broadcast learn flag set. | Estab nodep | Estab nodep | Estab dep | Estab nodep | Estab dep |
| 13. Port has just come up and received the first cost packet from a given edge switch with a given sequence number. | Estab nodep | Estab nodep | Estab dep | Recov nodep | Recov dep |

3.5. Switch MAC Address Learning and Discovery

When new host source addresses are learned by edge switches, they propagate this information throughout the switch domain. This information allows each switch in the domain to set up the best path for packets destined for this source to get back to it. This section will discuss the packet types used to pass this information and to query for the information. The query is used when a switch receives a packet for a destination MAC address it no longer has in its tables due to aging and in switch to switch communication to discover MAC address paths.

3.5.1. MAC Address Learning

When an edge switch receives a packet from a new source on a non load balancing link (port), it will generate a switch MAC address information packet and send it out all load balance domain links that have indicated that they accept MAC address information packets from this edge switch. (i.e., in accordance with the broadcast path for this switch). This information is then used by each switch and propagated down ports that also accept switch MAC address information packets for the given edge switch. Before a switch can propagate the received packet, it must send the MAC address information packet.

Figure 22:
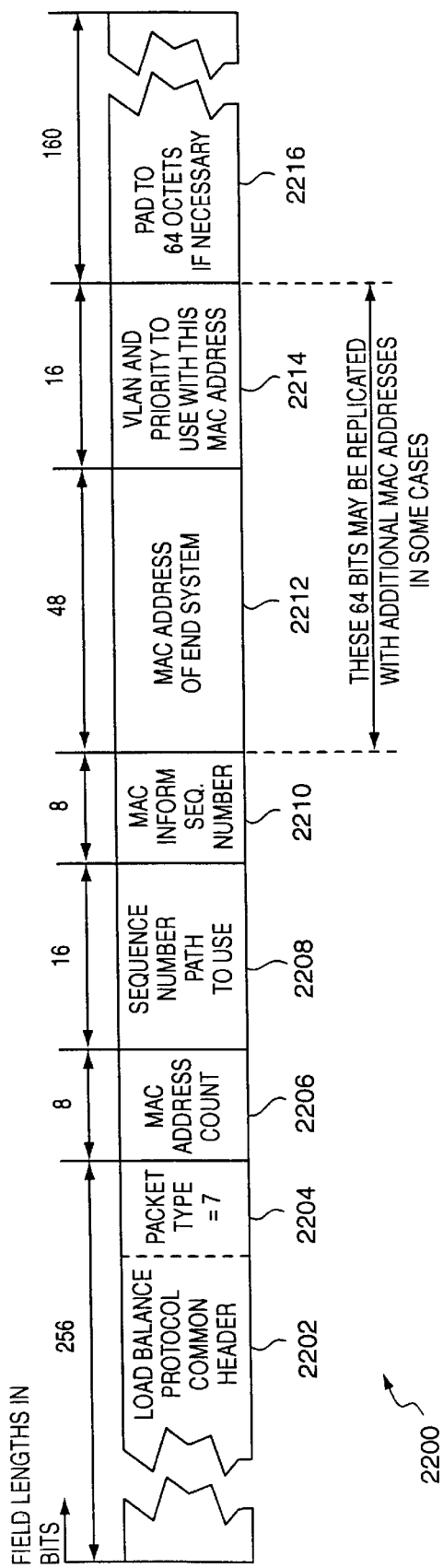
FIG. 22 is a diagram of a MAC address information packet used in MAC address learning and discovery protocols in accordance with the present invention.

The format of the MAC address information packet is shown in FIG. 22. The packet type 2204 for the switch MAC address information packet is 7. Following the packet type is an 8 bit reserved field 2205. At present reserved field 2205 is a pad to maintain desired 32 bit boundaries. Next is a field 2206 representing the number of MAC addresses included in the packet, the maximum allowed being 184. Following this is a 16 bit field 2208 that indicates the currently converged sequence number to use for the MAC address. This is followed by a 32 bit sequence number 2210 used to associate the later received ACK packet with the MAC address information packet.

Figure 23:
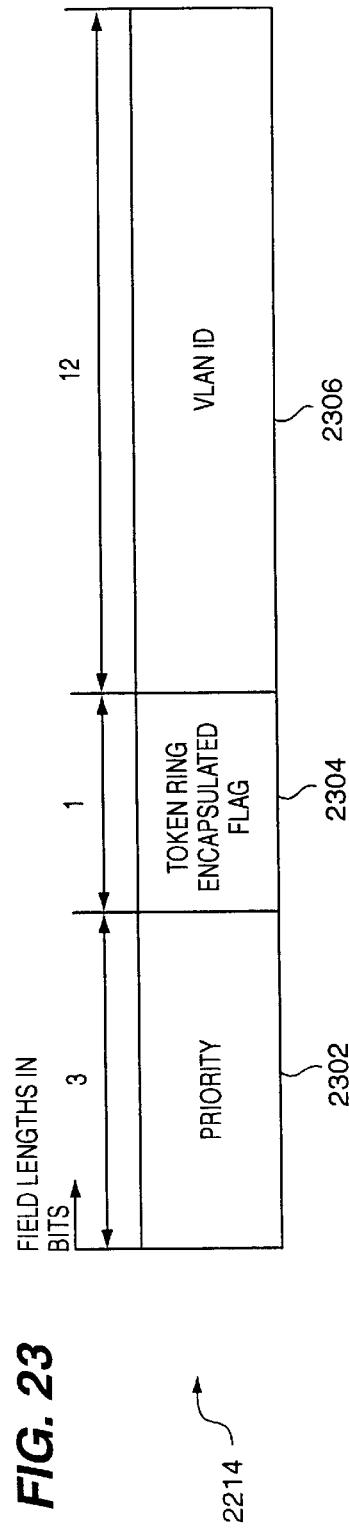
FIG. 23 is a diagram of a VLAN tag field in a MAC address information packet as in FIG. 22.

Following this is the 48 bit MAC address 2212 of the host to add to the switch addressing tables in switches receiving this packet followed by a 16 bit VLAN ID and priority field 2214 (same format as the IEEE 802.1q TAG). The VLAN ID (2306 of FIG. 23) is taken from the packet if the host has set it up. If not, the VLAN is defined by user configuration of the switch port. The same is true for the priority field (2302 of FIG. 23). The VLAN field is useful when the switches and end systems do not tag packets and can be used to force specific VLANs down specific ports based on user configuration. If the switch and/or end system tag packets, then these tags should be used instead of the defaults for the determination of which ports these packets are forwarded on. Note that within the load balance domain all ports in general are considered members of all VLANs.

In some cases, multiple MAC address may be passed in the packet if the switch architecture queues received learns or in the case of the type 4 query discussed below. In this case, multiple 64 bit fields are added to the packet, each of which contains the MAC address of additional hosts to add along with the VLAN ID.

MAC Address Information Packet Transmission—When a switch port outside the load balance domain receives a packet with a new source MAC address, it must not immediately forward the packet. It must first send the MAC address learn packet, and with high priority if the switch supports different priority queues. The programing of the switching ASIC must wait until the received packet is transmitted to prevent out of sequence packets. The MAC address information packet is sent out the pruned broadcast tree formed from the acknowledgment of cost packets as described in section 3.4.

Since the received packet can be forwarded as soon as the MAC address learn is sent, there is a chance that one of the next switches in line for the packet will receive it before the MAC learn has occurred. When this happens, a type 2 query packet will be initiated by the switch that received the packet. Implementations optionally may choose to queue the packet until the ACK packet is returned for the MAC address learn to prevent this. However this will cause added latency and require a more complex implementation since a timeout mechanism will be required as well as more sophisticated queuing. Since the occasional type 2 query is not significant, most implementations will probably choose to send the packet on its way quickly.

As with the other packet types, the MAC address information packet is retransmitted up to 5 times at one second intervals until the ACK is received. If all 5 retransmission fail, then an implementation may choose to have the link leave the hello established state or may simply ignore further retransmissions of this MAC address information packet. Ignoring the failure in this situation is permitted because the query mechanisms of the present invention will force the "learn" to occur later if this MAC address information packet transmission fails. The ACK packet has the same format as the MAC Address information packet, except that the type is set to 85 hex. The source MAC address of the ACK is the same as that of the MAC information packet and remains unchanged as the MAC address information packet propagates through the network. This source address along with the cost sequence number and MAC information sequence number uniquely identify associate the ACK with a corresponding MAC information packet.

The sequence number (cost packet sequence number) to use in the packet is not the sequence number in the last cost packet, but the sequence number in the packet before the last cost packet. In this manner, the MAC address is associated with a converged path.

Care should be taken to not program the ASIC destination for this MAC until the completion interrupt has occurred on the forwarded packet. Once the forwarding table of the ASIC is programed, no further unicast packets for that MAC address should be forwarded via the CPU. If they do happen to be received by the CPU after the ASIC forwarding path is programed, they should be dropped. If these steps are not taken, the potential exists to send a few unicast packets out of sequence. If the forwarded packet is a broadcast, this typically will not be a concern.

The 32 bit MAC address information packet sequence number field 2210 associates a transmitted MAC address information packet with the later received ACK packet. This way multiple MAC address information packets may be transmitted from the same edge switch and await corresponding ACKs in a queue structure. Once the ACK packet is received, the corresponding MAC address information packet can be located in the queue and removed from future retransmissions.

As an optimization, an implementation may use the reserved sequence number of 0xFFFF in the cost sequence number field 2208 to indicate that the receivers of the MAC address information packet should put the MAC address on the broadcast path of the sending edge switch. This allows the transmitter to send out a MAC address information packet even if no converged sequence numbers exist yet. Doing so allows for quicker user connectivity when a load balance link comes up for the first time or when the first link comes back up after a loss of all load balance links. The switch in these cases may quickly follow a cost packet with a MAC address information packet with all MAC addresses it currently has learned on its non-load balance links.

MAC Address Information Packet Reception—When a switch port receives a MAC address information packet, it will immediately forward the packet down the pruned broadcast tree for the initiating the edge switch, update its MAC address table, and send out an acknowledgment packet. To update its MAC address table, the switch will use the following rules:

1. If the edge switch ID (source MAC address of the MAC address information packet) is not in the table, then a directed switch update cost packet is sent back out the port that the MAC address information packet was received on. This should never happen since cost packets should constantly keep all switches up to date. If a switch does not know about a given edge switch, then it should never receive a MAC address information packet from it since it must have acknowledged the cost packet in the first place to be in the broadcast pruned tree. However, if it is received due to some unforeseen situation, the switch MAC address information packet cannot be forwarded since the receiving switch does not have a broadcast path to forward the packet on. To construct the directed switch update cost packet, the receiving switch can use the source address in the MAC address information packet as the destination and send the packet out the port the packet was received on. Once the switch has sent the cost update packet, an implementation can handle the learning of the MAC address in one of two ways. The easy way is to ignore the MAC address. If the MAC address is received as a source or destination in a packet, the mechanisms to handle an unknown source or unknown destination packet will be used. Since this is a corner case, the easy solution should be sufficient. A more complex method would entail saving the newly learned MAC address in a limbo state that does not program the ASIC. Then when the new cost packet triggered by the Cost Update Packet is received, the MAC address (or addresses) in this limbo state are set up. Convergence with the paths other switches have set up for this MAC address should not be a problem since no other switches depended on this switch for the path to the new MAC address, so any path picked will be a non-looped path.

2. If the edge switch ID is found but the sequence number to use is not in the table, the MAC address(es) can be programmed on the port the MAC address information packet was received on since this is the broadcast path from the edge switch. Although the optimal path may not be chosen, a non-looped path will result. A non-looped path is created in this situation since other switches that know the sequence number will not use this switch as a path since no cost packet with that sequence number has passed from the receiving switch to other switches. If it had, it would know about the sequence number. If other downstream switches also do not know about the sequence number, they too will use the broadcast path. The packet is then forwarded out all ports that depend on this switch for the broadcast path to the edge switch. This situation could only occur in the corner case were a switch has just come up and received 1 cost packet from the edge switch but the MAC address information packet is associated with the previous cost packet that has converged.

3. If the edge switch ID and the sequence number are found but the MAC addresses of the host are not in the table, then it is recorded along with its VLAN ID. Note that the MAC address for a given host is not learned by looking at the port on which the host source MAC address comes in on inside the load balance domain, but only from this packet, and learn/move interrupts should be ignored within the load balance domain. The information in the packet is used to set up the path to this MAC address based on the group load factors, as described in section 3.3.3. This should be the typical case.

4. If the edge switch sequence number and host MAC address (not necessarily associated with the edge switch) are found, then the MAC address table is updated with the new information and associated with possibly a new path. However, since this may be a duplicate MAC address, or possibly a retransmitted MAC information packet, the VLAN ID must be checked. If the VLAN ID is the same, then the entry is updated with the best path as described above. If the VLAN ID is different, then there is a duplicate MAC address. If the switch cannot handle this situation, an error must be logged and the packet dropped. If the switch can handle duplicate MAC addresses and VLAN tags, the MAC address table is updated along with the VLAN information. Note that, to handle this case, the switching engine must look at the packet tag as well as the MAC address when making the forwarding decision to determine the correct path for a MAC address. This also requires that packets passed through the load balance domain must be tagged since all ports within the load balance domain are considered to be in all VLANS. When duplicate MAC addresses exist, either the end stations or the switch must add a VLAN tag before the packet is passed into the load balance domain. If a duplicate MAC address is seen with the same VLAN tag but from different edge switches, the table is updated and a message is logged, with the assumption being that the end system has moved. A switch may have intelligence built in to watch for rapid changing of the location, which would indicate that devices are trying to use the same MAC address. The typical situation were a MAC address learn is received and the MAC address is in the table occurs when the MAC address is to be redistributed after a link failure somewhere in the network (reception of a type 4 query) or in the corner case were the MAC address had timed out of the edge switch and not in the switch receiving the packet. If the packet was just a duplicate MAC information packet, the above procedures work without any special handling.

3.5.2. Switch MAC Address Query Packet

In several cases, switches will need to query other switches about MAC addresses. This will occur when a link fails and a switch needs to figure out how to reset the destination MAC address table, when unknown sources are received from a load balance switch, and when packets with an unknown destination are received. The details on the use of the packet will be covered in the parts of this document that deal with the specific situation. This section will describe the format of the switch MAC address query packet and actions switches take upon receiving the different flavors of the packet.

Figure 24:
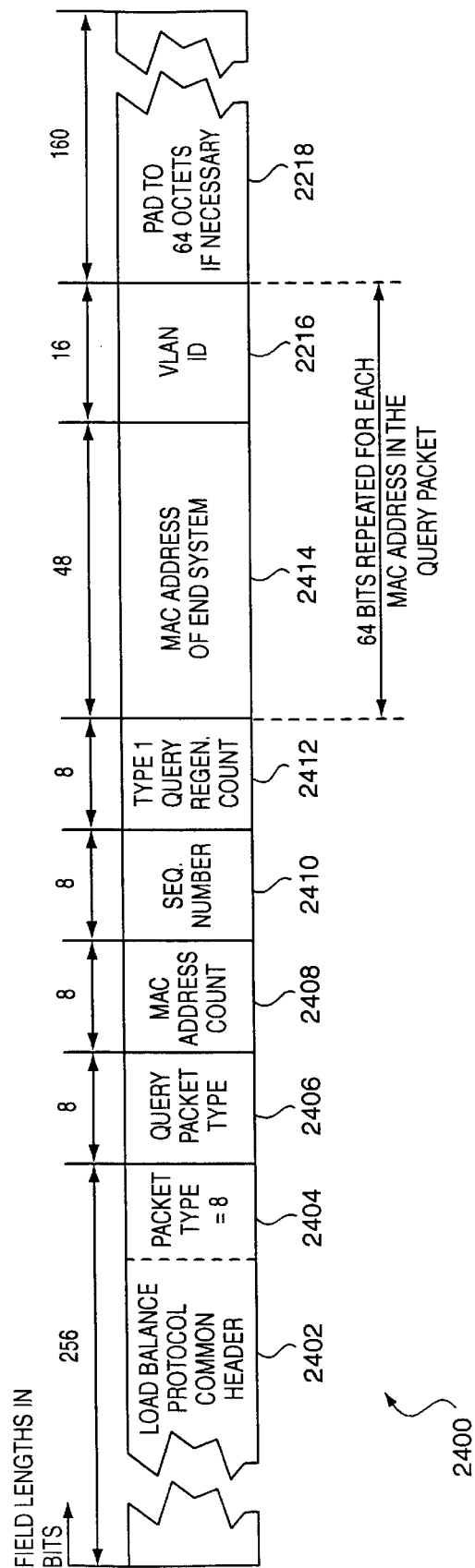
FIG. 24 is a diagram of a MAC address query packet used in MAC address learning and discovery protocols, in accordance with the present invention.

The format of the packet is shown in FIG. 24. The packet type 2404 for the switch MAC address query packet is 8. Following the packet type is the query type 2406. There are currently 4 types of query packet (types 1 through 4). Following this is an 8 bit field 2408 that indicates the number of MAC addresses included in the packet. An 8 bit reserved field 2409 is next and is reserved for future use. Presently the reserved field 2409 is used as a pad to ensure 32 bit alignment of key fields of the packet.

Next is an 8 bit value 2410 used to count the number of times a given type 1 query is transmitted back down a port it was received on (as opposed to being forwarded). This value is necessary to distinguish a retransmission from a regenerated packet so that consistent paths are picked by the switches. This is followed a 32 bit sequence number 2412 used to identify a sequence of queries triggered by a given switch. Next are 64 bit fields that each contain the MAC addresses 2414 and a 16 bit VLAN ID 2416. The VLAN ID allows duplicate MAC addresses to exist as long as they are in different VLANs, The switch hardware would need to support duplicate MAC addresses in its MAC address table to take advantage of this. The maximum number of MAC addresses that can be included in a single packet is 184.

In some cases, multiple query packets are needed to query all the MAC addresses necessary. The query ACK has the same format as the query packet except that the packet type is 86 hex and in some cases the number of MAC addresses passed back in the ACK may be different from the query packet or even 0, In this case, the MAC address count is modified accordingly.

When transmitting any of the query packets, an ACK must be received within 1 second. If not, the packet is retransmitted. After the 5th retransmission without an ACK the port goes to the Hello Init state. As noted above, the source address of the ACK to a query is that of the initiating switch. This along with the sequence number (query sequence number) uniquely associates the ACK with the query for clearing the initial query from a retransmission queue.

Type 1 queries are used upon link failure to force the edge switch whose MAC addresses need to be moved to query/re-direct MAC addresses on an adjacent switch. The switch issuing the query will include all MAC addresses that it wants to move due to a link failure associated with a given edge switch. A separate query is sent for MAC addresses associated with each different edge switch to which connectivity is lost. The first MAC address included in the data portion of the packet is always the target edge switch. The query is sent out the lowest cost alternate port (a port presently configured as an alternate path for the failed link). The receiving switch will forward the query out the port it wants to use for the MAC address(es). In some cases, this is the port the MAC address is(are) already assigned to. In all cases, all the MAC addresses are propagated with query packets. Each switch in turn will forward the MAC addresses with the query packet until the adjacent switch is the edge switch that originally initiated the MAC address learn or until no alternate path is found.

The packet is ACKd along the way and may selectively reject some of the MAC addresses, forcing the sender of the query to look for another alternate. For process details see the link failure description below. The initial sender of the query will keep track of the MAC addresses that were redirected and later (optionally) issue a type 4 query directed at the specific edge switch to trigger a MAC address information packet to re-distribute the MAC addresses. This packet type can also be used to build a path for a unknown destination MAC address received on a load balance link after the edge switch has been discovered. See section 3.6.3.1 on unknown destination address discovery below for more details.

A flag is used in the common header of the protocols for special use of the type 1 query. When the type 1 query is used to rebuild broken paths, this reserved flag in the header is set to trigger the transmission of a directed cost update when the type 1 query has located the edge switch (i.e., generated by the switch adjacent to the target edge switch).

Type 2 queries are used when an unknown source MAC address is received on a link in the load balance established state. If the other load balance switch also issues this packet type (i.e., it sends one and receives one), the result is the illegal configuration described in the hello section above where 2 load balance switches are interconnected via a hub or non-load balance switch and the hub is also connected to some host devices. As noted above with respect to FIG. 4, a bit in reserved bytes 408 in the packet header identifies the use of a type 2 query in this situation as requesting information on an unknown source MAC address. The bit is set to indicate that the query is for an unknown source MAC address.

The ACK returned in this case leaves the MAC in question out of the packet, and the MAC address count is set to 0. This case is handled in the same way as the multiple hello packets case. The switch with the lower MAC address leaves its port in the enabled state. The other switch will block the port. This condition should also be logged to the console or error file or cause issuance of an SNMP trap depending on the switches' capabilities.

After this point, the switch with the lower MAC address can send the normal MAC address information packets. The state of the link is left in the MAC address error condition so that cost packets and other load balance packets are not sent out. An implementation may optionally chose the simpler approach of just bringing down all the offending links and warn the user. The onus will then be on the user to correct the topology.

The other more typical case occurs when the switch has timed out the source address of a packet or the packet beats the MAC address information packet to a switch. In this case, the ACK response to the packet contains the MAC address in question. However, the source MAC address in the packet identifies the edge switch that is associated with the MAC address in question. This condition is discussed further in the section on packet forwarding. Since the ACK is the only action for this packet type, no special handling is necessary for the reception of a retransmitted packet.

The type 2 query is also used to query an adjacent switch in the load balance domain when an unknown destination MAC address is received from within the load balance domain. The adjacent switch must know the unknown destination since it wouldn't have forwarded the packet otherwise. As noted above with respect to FIG. 4, a bit in reserved bytes 408 in the packet header identifies the use of a type 2 query in this situation as requesting information on an unknown destination MAC address. The bit is cleared to indicate that the query is for an unknown destination MAC address.

This case should be rare since the switch that does not recognize the unknown address should also know the a addressing information. Such an event would principally occur when the unknown destination MAC address was timed out and removed from the addressing table of such a switch but not from the tables of it's neighboring switches.

Type 3 queries are used when an unknown destination address is received on a non-load balance port. There are two cases for unknown destination addresses that are explored in detail in section 3.6.3, one where the packet is received from a load balance switch, and the other where the packet arrives from outside the load balance domain. The reception of a type 3 query triggers the sending of an IEEE 802.2 test packet to find the unknown destination and the forwarding of the query down the broadcast path for the initiating switch. This type of query is sent down the broadcast path for the switch and is ACKd by the receiving switches. In the case of the reception of a duplicate type 3 packet, the only action taken by the receiver is to ACK the packet. If the unknown destination address is an IP protocol packet, it may be preferred to broadcast ARP packet since not all end systems respond to IEEE 802.2 test packets.

Type 4 queries are used to trigger an edge switch to re-send MAC address information packets for the MAC addresses included in the packet. Unlike the other packets that use the special load balance destination MAC address, this packet is directed at the target edge switch. The target edge switch will reply with an ACK directed at the sender of the query. In this way, the intervening switches pass the packet through with the least delay and overhead. If the ACK is not received after 5 retransmissions, the link is not brought down, but the target switch is removed from the switch table. If a switch receives a duplicate type 4 query (one with the same source MAC address and sequence number) it will ACK the packet but not send another MAC address information packet.

3.5.3. Path Recovery on Link Failure

A link fails when a hello packet dead interval expires, any one of the load balance packets that require ACK fails to receive it after the maximum number of retransmissions (5), or link beat goes away. When a link fails, the switch that lost the link must check whether it had set up any MAC addresses to be forwarded out the port. If it did, then there are two cases to consider. The first is where no alternate links exist that have access to the edge switch whose associated MAC addresses were severed with the link failure. The second is where alternate links exist.

The first case is easy to deal with. If no alternate links exist to the required edge switch, then there is no route for these addresses. In this case, the MAC addresses are removed from the table. Should the link come back up at a later time or should an alternate path become available, a type 2 query will be initiated when the MAC address is received as an unknown source address within the load balance domain or a type 3 query will try to discover the address when hosts send this unknown destination address into the switch from outside the load balance domain (see section 3.6 below). No other action is required.

The second case is somewhat more complicated. In this case, alternate links exist, so the MAC addresses must be distributed to them. This distribution must be performed with the cooperation of the other intermediate switches. Otherwise loops could be formed. First the MAC addresses that need to be moved are left pointing to the downed links or are re-programed in the forwarding table to be dropped, the key point being that the packets are not forwarded during this time, nor are they seen as unknown MAC addresses.

The next step is to inform the intermediate switches of the change. This is done with the switch type 1 query. The query packet is sent out on the port chosen as the alternate path. The alternate path chosen is the best path still up to the edge switch. This is the previous sequence number path to the edge switch, not the newest, since a given switch does not know if it has converged yet. Note that, since many MAC addresses may be involved, different queries may be sent out different ports depending on the best alternate cost to the edge switches associated with the included MAC addresses.

A separate type 1 query is made for each target edge switch. The target edge switch MAC address is the first MAC address in the list of addresses supplied in the data portion of the query packet. Also as noted above, the switch which is adjacent to the target edge switch will also set the reserved bit discussed above to request an update of the target edge switch's addressing tables. The first type 1 query to a given edge switch will triggers the cost update as described herein above.

As soon as a successful acknowledgment is received for the query, the MAC address is assigned to the alternate ports so that it can be forwarded again. In some cases (i.e., multiple link failures), the acknowledgment may include MAC addresses that could not be put on an alternate port. In this case, the sender of the query must pick another alternate to try and leave the MAC entry in a state to be dropped. If no other alternates exist, then the MAC address is removed from the address table. As each switch receives the query, the MAC address forwarding table for that switch programs the MAC address entries in the query packet to drop packets destined for that address.

As the switch forwards the query and receives an ACK for MAC addresses included in the query, it can update its forwarding table to move these MAC addresses to the alternate port. In this way, packets whose destination is one of these MAC addresses are prevented from looping while the new path is being established.

As each query is initially sent out, the sequence number of the query packet is incremented. As the query gets forwarded, both the source MAC address and the sequence number of the packet remain the same.

Figure 25:
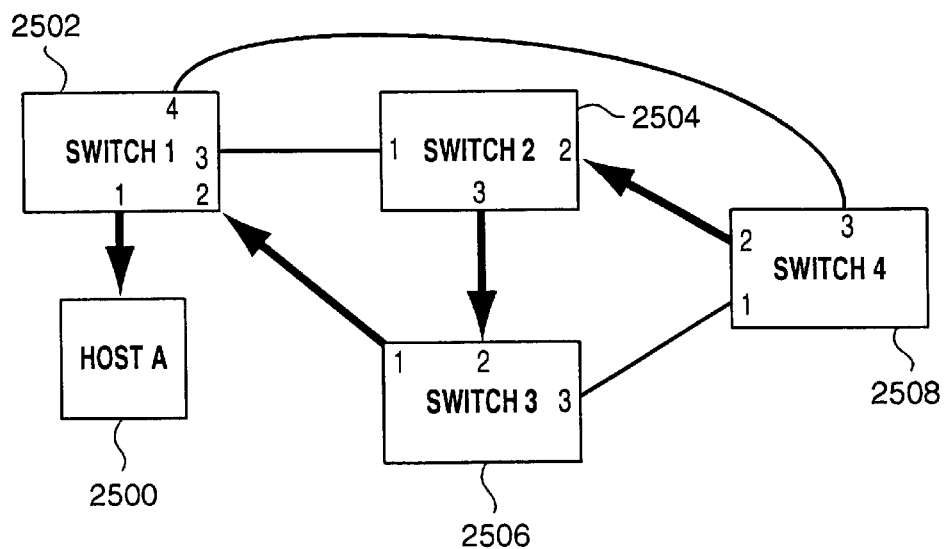
FIG. 25 depicts an exemplary path between switches determined in accordance with the protocols of the present invention.

FIG. 25 illustrates the process described above. Assume that the link between switch 2502 port 2 and switch 2506 port 1 is broken and the second best path is via switch 2508 port 3. Switch 2506 now needs to find an alternate path for packets destined to Host 2500. Switch 2506 has 2 alternate paths. However, for this example, the best alternate is towards switch 2508, which has the lowest converged port load factor of ports that are still up and leads to switch 2502

(and hence Host 2500). So switch 2506 creates a type 1 query packet containing Host 2500's MAC address. Note that in a real scenario, many MAC addresses would probably be included in the query packet and different type 1 query packets might be created with different MAC addresses depending on the port load factor to those edge switches that service the MAC addresses lost.

Returning to FIG. 25, switch 2506 continues by sending the query packet to switch 2508 via switch 3 port 3. When switch 2508 receives the packet, it will check whether it has a route to Host 2500 other than back to the initiating switch. In this case, it has 2 other choices. Since switch 2508 does not realize that its path out port 2 goes through switch 2506, it may still have this as the best path. Assuming that it uses port 2, it ACKs switch 2506 without Host 2500's MAC address included in the packet (MAC address count=0) and passes the query to switch 2504, leaving the source MAC address of switch 2506 in the query packet.

Now having received the ACK, switch 2506 can move its MAC address table entry for Host 2500 to port 3. Switch 2504 receives the query and checks its best path to Host 2500. If it has any paths other than that of the initiating switch, it will send back an ACK without Host 2500's MAC address. In this case, it has a direct route to switch 2502, so it sets the MAC address count of the ACK to 0. If the best path to Host 2500 for switch 2504 is the direct route via port 1 on switch 2504, the algorithm is done and no further packets need to be sent. Switch 2504 sets the destination port for Host 2500 to 1, and switch 2508 sets it to port 2504 when it receives the ACK from switch 2504.

However if the best path is not port 1 on switch 2504, but rather port 2 back towards switch 2508, switch 2504 will send the query packet back towards switch 2508. This is a regenerated type 1 query and contains the original source MAC address and sequence number, but increments the regeneration count. Switch 2504 is allowed to send the query back in this case since it noticed that the best path it had was originally pointing to the switch that initiated the type 1 query.

The rationale here is that the type 1 query was passed to switch 2504 assuming it could use this path that is no longer available, but that the initiator of the query knew that an alternate existed on the path somewhere before switch 2504 was passed the packet, so switch 2504 can pass the query back to look for the path originally intended by switch 2506. Switch 2508 will send the packet back, and since it still contains switch 2506's MAC address as the source and the sequence number is the same, it will not send it back towards switch 2506 unless the only alternate is the initiating switch. Alternates should exist since switch 2504 would not have sent the query back if there were no alternates.

However, since switch 2508 has already sent the query down port 2 and has now received the packet on port 2, it will try any alternate ports it has. If it has no other alternates (perhaps due to a dual link failure), it will regenerate the packet and send it back to switch 2504. If switch 2504 had now tried all its alternates and been NAKd on them all (or they were all down), it would NAK the regenerated query from switch 2508. Switch 2508 would then have no choice but to regenerate the query and send it back to switch 2506.

Note that only the switch that originally received the query can send the query back to the initiating switch (i.e., the switch that received the query on a port adjacent to the source MAC address in the query packet), in this case switch 2508, and it would only do so after every alternate had been NAKd. Further note that it may take multiple regenerations of the query before a path ends up getting NAKd as the queries probe the paths.

Although the above example of multiple regenerations of the query is somewhat contrived since switch 2504 is adjacent to switch 2502, if many switches are in the path, then a switch may ACK a query and only later, after forwarding the query, find that the best alternate is back out the path the query originally came in on. In the example above, it should be the path that switch 2506 initially intended, since it knew that a second best non-looped path existed via switch 2508.

It should also be noted that a loop exists if a type 1 query with a given sequence number is transmitted out a given switch port and received by the same switch on a port that had never sent out the query. In this case, the packet should be NAKd to prevent the loop. This unlikely scenario could occur if multiple links break in a short span of time.

The regenerated type 1 query packet is a way for a first switch to inform a second switch that it has a better route than the first switch, that the second switch sent a packet in error because the first switch is adjacent to yet another switch whose link went down but that the first switch has not exhausted the possible routes available to it. The regenerated type 1 query packet is also a way for a switch to turn the path around when all the possible routes it has were NAKd.

When a switch receives a regenerated packet, it would try the next alternate that it has that had not been tried before (i.e., the next alternate in cost that this query had not been sent out on). Once a path has been NAKd for a given query, it is not sent back down the path again. Each time the query will work its way down the paths until it is NAKd or regenerated. The regeneration count is only needed in the case were queries might end up crossing due to retransmission.

For example, and referring again to FIG. 25, if the ACK for the initial forwarding of the query from switch 2508 to switch 2502 was lost, and switch 2502 sends back the regenerated query, only later to receive the query back due to retransmission, it could end up creating the less optimal path to switch 2502 since it would think that this was a regenerated packet from switch 2508. However, if the regeneration count in the received query is less than what it has transmitted, it would know that this is a retransmission and merely reply with the same ACK it sent out this port previously. No other action would be taken.

Without the regeneration, count extreme cases could exist where the same query is propagating through the switch network through multiple paths simultaneously. This in turn could create a situation where the same query is received on multiple ports of the same switch, since one of these queries could be NAKd because it would appear as a loop, and connectivity would be lost.

Note that the algorithm described above creates a non-looped path and finds one of the better alternates, but does not necessarily guarantee the best alternate. For example, and referring again to FIG. 25, if switch 2504's best alternate cost had been to use port 1, it would not have sent the query back to switch 2508 even though the best cost for switch 2506 may have been for switch 2508 to use port 3 rather than port 2504. There is also the strong chance of momentary packet loss during re-routing and a very small chance of a packet getting out of order if the CPU can reroute fast enough. The algorithm can be simplified slightly by only regenerating the type 1 query if every alternate has sent a NAK.

This leads to the following rules for handling of type 1 query packets by the initiating switch:

1. The initiating switch finds all the MAC addresses affected by the port failure. It then generates query packets with all the affected MAC addresses grouped together whose edge switch is the same and therefore have the same alternate path. The first MAC address in the list of addresses of the query is that of the target edge switch. It uses the port's port load factor of the current sequence time (oldest sequence number in its table) to determine the best alternate route. These queries are then sent out the respective ports. Note that multiple queries may be needed on a given port since not all MAC addresses may fit in a single packet and/or multiple edge switches may use the same alternate port at this point in the topology). In the case of a broken link, the update cost flag is set in the type 1 query packet header. Only the first type 1 query generated for a given switch needs to set the flag to trigger a cost update packet transmission.

2. For MAC addresses returned in the ACK packet, another alternate route must be tried. If none exists, then the address entries are removed from the switch. This will trigger a type 2 query if and when an alternate path becomes available and the source MAC address sends a packet. With the simplification of grouping all MAC address in the same query that are associated with the same edge switch, the ACK will either contain no MAC addresses, or all the MAC addresses passed in the type 1 query.

3. If the initiating switch ever receives its own query, it must look for another alternate route for those MAC addresses left in the query packet. If none exists, then those are removed from the address table. The ACK returned in this case must never have any MAC addresses returned (MAC address count must be 0). Note that the query can only be received on the port it was sent out on and only it no alternates exist down that path.

4. The initiating switch must keep track of all ports it has tried and not re-use a port that it has either received a NAK on or received its own query back on for the MAC addresses included.

5. Only after receiving an ACK that does not include the MAC address can the MAC address table be modified to point to the new port.

6. The initiating switch will increment the sequence number for each type 1 query it sends out.

7. If no ACK or NAK is received within 1 second, the query is retransmitted out the same port up to 5 times. If after the 5th retransmission no ACK is received, the port goes to the initial hello state and another alternate is tried. Note that putting the port in the initial hello state would potentially trigger new type 1 queries for the MAC addresses that were associated with the port. When an alternate is chosen due to retransmission failure, the sequence number should be incremented in the query sent out the new alternate. This prevents the extremely unlikely case of duplicate queries from being injected into the system should one of the previous retransmissions actually get through and all the ACKs were lost.

The following are the rules for handling of type 1 query packets by intermediate switches:

1. When receiving a type 1 query, a switch must check the MAC addresses in the packet and forward the query out the appropriate port to the edge switch based on the best port load factor. The target edge switch is the first address in the list of address in the query.

2. In all cases after forwarding (or re-generating the query), the switch must ACK (or NAK) the port it received the query on.

3. The switch receiving the query packet must update its forwarding table to drop all packets whose destination MAC address is passed in the query packet unless it sends a NAK to the switch that sent the query (see rule 20).

4. Once an ACK has been received, the switch can update the forwarding table to associate the MAC address with the alternate port(s). Note that not until all the switches have finished agreeing on the path would a packet make it all the way through, since the first switch in line that has not been ACKd yet will drop any packets with this destination MAC address.

5. In all cases the source MAC address and sequence number of the packet is passed as set by the initiating switch.

6. If the switch receives a MAC address in the query and the only route it has for that MAC address is the port that the query came in on, then the MAC address is put in the ACK packet (a NAK of the MAC address). This should typically not occur since the sending switch should not send the query if the route does not exist. Only in the corner case of dual link failures is this possible.

7. If the receiving switch does not know the edge switch, it must NAK the type 1 query.

8. If a switch receives a type 1 query from an adjacent switch that is not the initiator of the query in that the source MAC address of the packet is not that of the adjacent switch, any ports that it has to the initiator of the query must be considered dead (i.e., this is not an alternate path).

9. If a switch receives a type 1 query from an adjacent switch that is not the initiator of the query in that the source MAC address of the packet is not that of the adjacent switch, the current path of the switch points to the initiator of the query, and the best alternate the switch sees is back down the port that the query came in on, then it can ACK the query, regenerate it and send it back down the port if other alternates exist. If no other alternates exist, then the query should be NAKd. This is the only case where an alternate that a switch has received a type 1 query on can be used before an alternate where no queries have been received.

10. If a switch receives a type 1 query on a port and its current path is not pointing to the initiator of the query or it receives the query from the initiator of the type 1 query, then it must not regenerate the query down the path it received the query on. It must instead forward the query down an alternate port. If no alternates exist, then the query should be NAKd. An alternate that queries have been received on is only chosen after all the alternates without queries have been tried (a counterpart to rule 9).

11. If all alternate paths that a switch forwards a query on are NAKd, the switch must regenerate the query and sent it back out the port it came in on. The regeneration count is incremented in this case. Once all alternate paths have been NAKd to the switch that first received the query, it will regenerate the query and send it back to the initiating switch. This could only happen in the event of multiple link failures at the same time. Typically the best alternates will be found rapidly since all switches agree on the best path, second best path, etc. for a given sequence time.

12. If a switch receives a receives a type 1 query from on a port that it had already received the same query on and the regeneration count is equal to the regeneration count of the previous packet it received on this port, then the packet is a retransmission and must be ACKd with the same ACK it previously used. No other action is necessary.

13. If a switch receives a type 1 query from a port that it had already sent the same query on and the regeneration count is greater than the regeneration count of the previous packet it sent on this port, then it must try any alternate paths that it has not already been NAKd on. If all alternates had been NAKd, then the regenerated packet is NAKd. To save overhead in the rare case of a lost ACK, an implementation may optionally chose to use the regenerated query in lieu of the ACK and not retransmit the original query.

14. If the regeneration count gets to 255 (the maximum allowed in this embodiment), then the query is NAKd. This will potentially break connectivity until the hosts are relearned after aging out or via type 2 queries. This should never happen since the reroute should never take 255 regenerations. If it did, then something went wrong, and it is best to drop those MAC addresses and relearn them later.

15. If a switch ever receives a type 1 query that it had previously forwarded on a port other that the one it had last forwarded the query on, then a loop exists and the query must be NAKd.

16. If a switch receives a NAK in response to type 1 query, then it must forward the query down the next best alternate port. If the only alternate is back on a port it previously received a query on, then it must regenerate the packet before forwarding.

17. Whenever a query is regenerated, the regeneration count is incremented.

18. If a switch receives a type 1 query and the best path (or alternate path if the best path points to the initiating switch) points to target edge switch, the packet is ACKd and no forwarding occurs (i.e., the target edge switch will not receive the query packet). The MAC addresses are assigned to the port of the target edge switch. If the cost update flag is set, then a switch update is sent to the target edge switch. The algorithm is complete.

19. If no ACK or NAK is received within 1 second, the query is retransmitted out the same port up to 5 times. If after the 5th retransmission no ACK is received, the port goes to the initial hello state and another alternate is tried. If no other alternates exist, then a regenerated type 1 query is sent back out the port the packet came in on. Note that putting the port in the initial hello state would potentially trigger new type 1 queries for the MAC addresses that were associated with the port.

20. Whenever a switch NAKs a MAC address received in a type 1 query, it leaves the MAC address table alone. The MAC address is left pointing to the port it was on when the type 1 query was received.

3.5.4. Link Failure Detailed Example

This section will use the above rules in an example to detail the sequence of events as a link fails and a new path is re-established. The example chosen is not the typical case, but will demonstrate the use of many of the rules.

Figure 26:
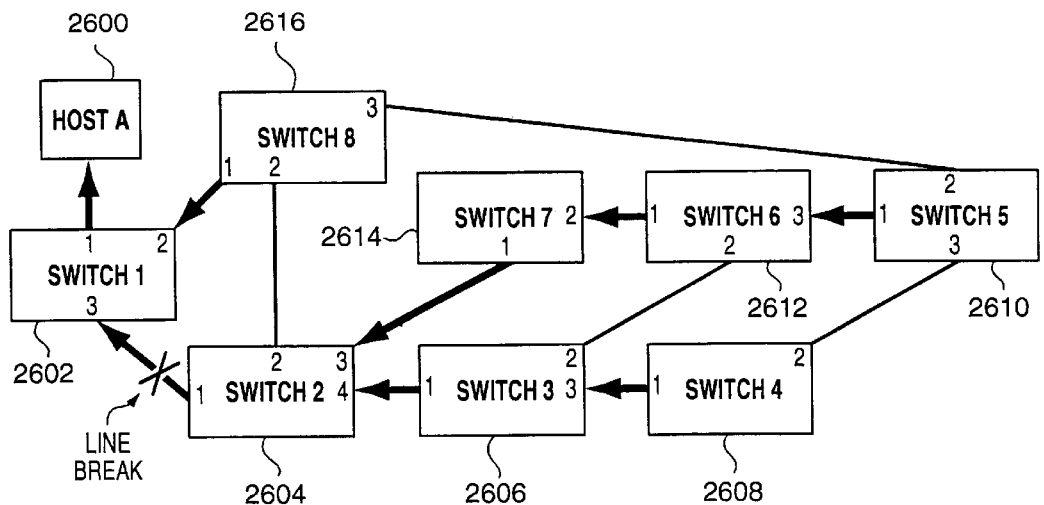
FIG. 26 depicts an exemplary present state for a network of switches operable in accordance with the present invention prior to link recovery triggered by a line failure.

FIG. 26 shows a diagram of the topology for this example. The arrows show the current path to Host 2600 for the switches in the load balance domain. The thin lines show other available inter-switch connections.

When a break occurs between switch 2602 port 3 and switch 2604 port 1, switch 2604 loses its current path to Host 2600. For this example it is assumed that the best alternate path from switch 2604 to switch 2602 is via switches 2606, 2608, 2610 and 2616. The direct path to switch 2616 on port 2 is assumed to be congested or very slow.

Therefore switch 2604 sends out a type 1 query with the update cost flag set and containing its address as the source MAC address and switch 2602 and Host 2600's MAC addresses in the data portion of the packet (the regeneration count at this port is 0). The update cost flag is also set in the header of the type 1 query. (see rule 1 for initiating switch). When switch 2606 receives the type 1 query, it will point Host 2600's MAC address to the "bit bucket", a term used to imply that any packets passed to this address are dropped or discarded (see rule 3 for intermediate switches).

Switch 2606 now looks up the best alternate path it has to switch 2602. Since it received the packet from the initiator of the query and it has an alternate path, it will ACK the received query and forward the query out port 3 to switch 2608 port 1 in this example (see rules 1, 2, 5 and 10 for the intermediate switch). When switch 2604 receives the ACK it can point Host 2600's MAC address down port 4 towards switch 2606 (see rule 5 for initiating switches).

Switch 2608 now receives the query on port 1, It will discard the MAC address of Host 2600, ACK the packet, and forward it down port 2 towards switch 2610. (see rules 1, 2, 3, 5 and 10 for intermediate switches). Switch 2606 now receives the ACK and can point Host 2600's MAC address down port 3 towards switch 2608 (see rule 4 for intermediate switches).

Switch 2610 receives the query and its best path is the old path it had (via switches 2612, 2614, and 2604) since it does not realize that this leads back to the switch with the broken port (switch 2604 port 1). So it discards Host 2600's MAC address, forwards the query out port 1 towards switch 2612, and ACKs the query from switch 2608 (see rules 1, 2, 3, 5 and 10 for intermediate switches).

Switch 2608 now receives the ACK and can point Host 2600's MAC address down port 2 towards switch 2610 (see rule 4 for intermediate switches). Likewise switch 2612 will discard Host 2600's MAC address, forward the query on to switch 2614, and ACK switch 2610 (see rules 1, 2, 3, 5 and 10 for intermediate switches).

For this example, we will assume that the ACK from switch 2612 to switch 2610 has been lost. This will force the retransmission of the query from switch 2610 shortly. Since switch 2614 has no alternate other than the port the query was received on, it will send a NAK back to switch 2612 (see rules 8, 9 and 20 for intermediate switches). Note that the path to Host 2600 from switch 2614 is left pointing to switch 2604.

Now that switch 2612 has received the NAK, it will be forced to send the query down the next best path (see rule 16 for intermediate switches). If the next best path is port 2 switch 2612 to port 2 switch 2606, switch 2606 will NAK the packet since it had already forwarded the query down a different port (see rule 15 for intermediate switches). Switch 2612 will now be forced to regenerate the query and send it back down port 2 towards switch 2610 (see rule 16 and 17 for intermediate switches). Around this time, switch 2610 is retransmitting the query packet since the ACK had previously been lost (see rule 19 for intermediate switches).

When switch 2612 receives the retransmitted query, it must ACK it as it did before (see rule 12 for intermediate switches). When switch 2610 receives the ACK, it can point Host 2600's MAC address towards switch 2612 (see rule 4 for intermediate switches). However, when it receives the regenerated packet, it must again discard Host 2600's MAC address and try the next alternate path that no query has been received on. Therefore switch 2610 will forward the regenerated packet out port 2 towards switch 2616 and ACK the regenerated query from switch 2612 (see rules 1, 2, 3, 10 and 13 for intermediate switches).

When switch 2612 receives the ACK, it can assign the MAC address of Host 2600 to port 3 (see rule 4 for intermediate switches). Note that if the regenerated packet is received by switch 2610 before it retransmits the query, it can use the regenerated query in place of the ACK, but it must always point Host 2600's MAC address to the bit bucket until it has been ACKd for the query with the largest regeneration count that it has forwarded.

Figure 27:
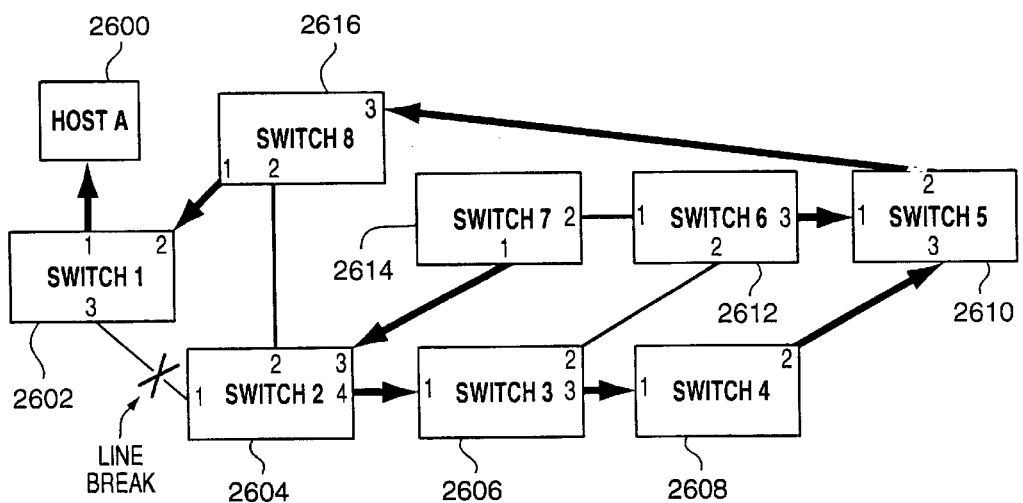
FIG. 27 depicts a second exemplary state for the network of switch of FIG. 26 wherein an alternate path has been selected in accordance with a first embodiment of failure recovery of the present invention.

When switch 2616 receives the packet, it will ACK it (see rule 18 for intermediate switches). When the ACK is received by switch 2610, it can then point Host 2600's MAC address towards switch 2616 (see rule 4 for intermediate switches). Since switch 2616 is adjacent to the target edge switch 2602, it can now send a cost update packet to switch 2602 in response to the update cost flag in the type 1 query packet. Since switch 2616 is adjacent to the target edge switch it will issue an update request to rebuild the broadcast path. The path recovery is now complete and the new paths for communication with Host 2600 are as depicted in FIG. 27. As above for FIG. 26, the thicker directed arrows depict the current path from each switch to Host 2600. The thinner lines depict other paths not presently preferred.

3.5.5. Simplified Recovery Method

The method discussed in this section removes some of the complexity of the previous algorithm by not using the regenerated packet and never returning a NAK to the sending switch. It will not necessarily find as optimal a path as the previous algorithm in some topologies and may take longer to converge.

The main idea of this algorithm is that the type 1 query will always be forwarded down the current path the switch has for the edge switch whose MAC addresses are in the query. Just as with the more complex type 1 query, multiple queries would be sent if multiple edge switches are involved or if the number of MAC addresses targeted at a given edge switch exceed 184. If a query reaches a dead end because, for example, no alternate paths other than the path it came in on, or the only alternate is back to the initiating edge switch, the receiving switch will reflect the query back down the path it came in on.

Alternate paths are chosen based on Port load factor and where the switch has received and or sent a specific query. By using the port where a query was received on as the last resort, removes the need for the regeneration count. The reflection of the query removes the need for the NAK and should be simpler to implement since the packet can be taken without any change and sent back out.

This depth first search algorithm leads to the following rule set for the initiating switch:

1. The initiating switch finds all the MAC addresses affected by the port failure. It then generates query packets with all the affected MAC addresses grouped together, those whose edge switch is the same and therefore has the same alternate path. The first MAC address in the list of addresses is the target edge switch. It uses the port's port load factor of the current sequence time (oldest sequence number in its table) to determine the best alternate route. These queries are then sent out the respective ports. Note that multiple queries may be needed on a given port since not all MAC addresses may fit in a single packet and/or multiple edge switches may use the same alternate port at this point in the topology. In the event of a broken link use of a type 1 query, the update cost flag is also set in the query packet header. The first such query sent for each edge switch will have the update cost flag set.

2. If the initiator has no alternate paths, then the MAC addresses should be removed from the table. Otherwise they are pointed to the bit bucket until an ACK is received for the type 1 query. Note that in the case of the initiator, the MAC addresses may be left pointing to the downed port so long as this forces the packets to be dropped. Removing the MAC addresses when no alternate exists allows for a type 2 query if and when an alternate path becomes available and the source MAC address sends a packet (see section 3.6).

3. A switch will initiate a given query (or set of queries if all the MAC addresses will not fit in the same packet) out a given port once. In other words, if a switch initiates a query to reconnect to a specific edge switch, it will send it out a given port once for given target edge switch, sequence and initiating switch. This allows a switch to initiate a query for the same edge switch and forward another query out the same port if the initiator is different. This only happens when 2 or more switches detect a line break and all initiate type 1 queries for the same edge switch within the same convergence time. This rule prevents a situation where queries could be tried endlessly should no path be found back to the edge switch.

4. If an initiating switch receives its own query back on a port that it has not sent the query out on, then a loop has been found and it must echo this query unchanged back down the port it was received on. This will force the receiving switch to try any alternates it has. This port should also be marked so that it will not be tried as an alternate. Note that the MAC address table is left untouched by this event. The query in this case is not ACKd. This rule allows intermediate switches to send the query back to the initiator on a port other that it was originally transmitted on to inform it that this path is an not a viable alternate. Note that the intermediate switch that sent this query does not need to check that the query it is forwarding is going back to the initiator. It merely learns that a loop was found when it gets the query echoed back. If an implementation chooses, it may first ACK the query and then send the query back down the line. However, if it does this, it must discard the MAC addresses until it receives the ACK back for the query to prevent a loop.

5. Only after receiving an ACK can the MAC address table be modified to point to the new port. Note that ACK's never contain MAC addresses (i.e., no NAKs are sent in this simplified algorithm).

6. The initiating switch will increment the sequence number for each type 1 query it sends out. The sequence number may be reused for different target edge switches since the uniqueness of each packet is determined by the tuple of initiating switch, target edge switch and sequence number.

7. If no ACK is received within 1 second, the query is retransmitted out the same port up to 5 times. If after the 5th retransmission no ACK is received, the port goes to the initial hello state and another alternate is tried. Note that putting the port in the initial hello state would potentially trigger new type 1 queries for the MAC addresses that were associated with the port. When an alternate is chosen due to retransmission failure, the sequence number should be incremented in the query sent out the new alternate. This prevents the extremely unlikely case of duplicate queries from being injected into the system should one of the previous retransmission actually get through and all the ACKs were lost.

The following rules apply for the intermediate switches:

1. When receiving a type 1 query, a switch must check the MAC addresses in the packet and forward the query out the appropriate port based on the best port load factor to the edge switch. The edge switch MAC address is the first MAC address in the list of addresses in the query (see rules 6, 7, and 8 for non-appropriate ports).

2. In all cases but rule 4 for initiating switches, and rules 7 and 10 for intermediate switches, the receiving switch must ACK the port it received the query on.

3. The switch receiving the query packet must update its forwarding table to drop all packets whose destination MAC address is passed in the query packet (subject to the exception in rule 4 for initiating switches and rules 7 and 11 below).

4. Once an ACK has been received, the switch can update the forwarding table to associate the MAC addresses with the alternate port(s). Not until all the switches have finished agreeing on the path would a packet make it all the way through, since the first switch in line that has not been ACKd yet will drop any packets with this destination MAC address. The reception of the same query back on the port it was just transmitted from replaces the ACK for the purposes of the query retransmission timer. However, the MAC addresses are left pointing to the bit bucket and the packet is forwarded per rule 1 above. This interaction occurs in the cases described by rule 4 for initiating switches and rules 7 for intermediate switches.

5. When forwarding a type 1 query, the source MAC address and sequence number of the packet is passed as set by the initiating switch.

6. A switch must not forward a type 1 query out of a port if this port has ever transmitted this specific query out before (the "forward only out a given port once" rule).

7. If the switch previously received this same query (i.e., a query with the same source MAC address, sequence number and target edge switch MAC address) on any other port, then the query is not forwarded since this is a loop. In this case, the query is not ACKd, but is instead echoed back down the port it was received on. If a query has been received on any port and is subsequently seen on a port that it has not forwarded the query on, the query is echoed back. The port is then marked as not usable as an alternate path. An implementation can mark it the same as any port it has sent the query out on. By echoing the packet back, it will force the receiving switch to find another path. If an implementation chooses, it may first ACK the query and then send the query back down the line. However, if it does this, it must discard the MAC addresses until it receives the ACK back for the query to prevent a loop.

8. Any time the same query is received on the same port, a retransmission has occurred. In this case, no forwarding is done. Only an ACK is returned. This includes the case of an echoed query (a query received in place of an ACK). The query is ACKd in this case but no further action is taken.

9. If the received query cannot be forwarded per rule 6, or there are no other alternate ports (possibly due to dual link failures), then the switch will still ACK the packet. After doing so, the switch will forward the packet back down the port it originally received the query on. In this way, all paths are tried and the packet is passed back towards the initiator. If no paths are found along the way, the packet will eventually get back to the initiator via the path the initiator sent the packet in on.

10. If the receiving switch does not know the edge switch associated with the MAC addresses included in the packet, then the switch should echo the query back to the sender as in rule 7 above. This situation should be rare and can only occur when the MAC address of the edge switch has timed out (cost packets should keep the MAC address alive).

11. If a switch receives a type 1 query and the best path points to a target edge switch, the packet is ACKd and no forwarding is done. The MAC addresses are assigned to the port of the target edge switch. The algorithm is complete. If the type 1 query packet has the update cost flag set, then a cost update packet is sent to the target edge switch.

12. If no ACK is received within 1 second, the query is retransmitted out the same port up to 5 times. If after the 5th retransmission no ACK is received, the port goes to the initial hello state and another alternate is tried. If no other alternates exist, then a new type 1 query is sent back out the port the packet came in on. The switch becomes the initiator of the query packet. Note that putting the port in the initial hello state would potentially trigger new type 1 queries for the MAC addresses that were associated with the port.

Figure 28:
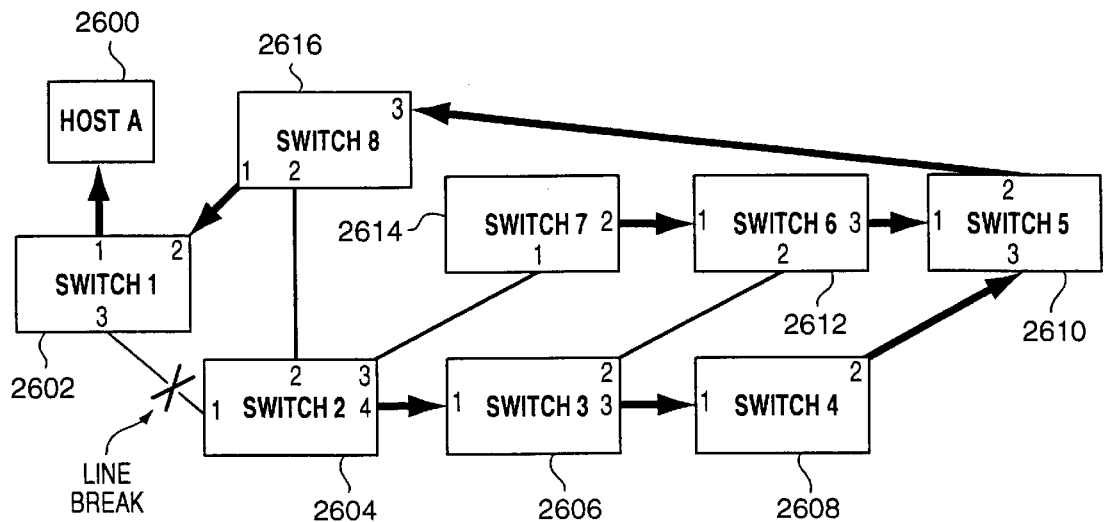
FIG. 28 depicts a second exemplary state for the network of switch of FIG. 26 wherein an alternate path has been selected in accordance with a second embodiment of failure recovery of the present invention.

FIG. 28 is useful in demonstrating how this simpler algorithm works. Assuming the same starting conditions as discussed above with respect to FIG. 26, everything would proceed as discussed above until switch 2612 passes the query to switch 2614. Switch 2614 will forward the packet to switch 2604, ACK switch 2612 and point the MAC addresses to the bit bucket (see rule 1, 2 and 3 for intermediate switches). Switch 2612 will update its MAC address table to point the MAC addresses to switch 2614 (see rule 4 for intermediate switches). Switch 2604 will echo the query back to switch 2614 (see rule 4 for initiating switches).

Note that switch 2604 will also mark port 3 as a port that has already been tried and not use it as an alternate. Further note that switch 2604 leaves the MAC addresses pointing towards switch 2606 in this case.

When switch 2614 receives the query it will stop its query retransmission timer (see rule 4 for intermediate switches). Since the only alternate path switch 2614 has not transmitted this query on, is back along the path it originally received the query on, it will forward the query back out this path (see rules 1, 6, and 9 for intermediate switches).

Switch 2612 will ACK switch 2614, discard the MAC address, and forward the packet to switch 2610 (see rules 1, 2, 3 and 9 for intermediate switches). When switch 2614 receives the ACK it will point the MAC address towards switch 2612 (see rule 4 for intermediate switches). Switch 2610 will ACK switch 2612, discard the MAC addresses, and forward the query towards switch 2616 because this is an alternate path that the switch has not tried yet and one that it did not originally receive the query on (see rules 1, 2 and 3 for intermediate switches).

Switch 2612 will point the MAC addresses towards switch 2610 when it receives the ACK (see rule 4 for intermediate switches). Switch 2616 will ACK switch 2610 and point the MAC addresses to switch 2602 (see rules 2 and 11 for intermediate switches). Switch 2610 will point the MAC addresses towards switch 2616 when it receives the ACK (see rule 4 for intermediate switches). The path now appears as in FIG. 28. Since the update cost flag is set, an update cost packet is sent to switch 2602 to rebuild its broadcast pruned tree.

3.5.6. Redistribution of MAC Addresses after Link Enable (Optional)

When a link comes back up after failure, the MAC addresses that used to use this port have been assigned to different links. Since this may not be optimal, it may be worthwhile to redistribute those MAC addresses to potentially use the newly enabled link.

To do this, the switch that detects the enabled link would send a type 4 query packet to the edge switch with the MAC addresses to redistribute after the first convergence time since the link has been up. It will only send 20 MAC addresses at a time and wait until the next cost packet from the target edge switches before sending more MAC addresses. This will prevent large changes to the network while eventually redistributing all the MAC addresses. This process should stop once the link's port load factor is within 20% of the other links or until all the moved MAC addresses have been redistributed. To implement this feature would require a switch to keep track of those MAC addresses that were either lost or moved due to the link failure, the idea being that the protocol will keep trying to optimize the load as new MAC addresses come and go. Since no loss in connectivity occurs in this case, this functionality has been left as optional. Eventually the loads should re-distribute as MAC addresses time out and come back.

The moving of the MAC addresses has the potential to generate an out of sequence packet immediately after the move. For this reason, users may want to be able to disable this functionality if it is provided.

Another method that has proven effective is to redistribute MAC addresses when a given load balance link is dropping packets. In this case, when the switch detects packet drops (already detected as part of cost calculations), it will check for another path that is currently not dropping packets for the destination addresses assigned to the port. The switch can then remove one or more MAC addresses from the overloaded link which is detected to be dropping packets. The switch then issues a type 1 query out the detected alternate path for the MAC address(es) removed from the port. Note that the issue of the type 1 query will occur automatically if the address is merely removed from the port since the removed address will be seen as an unknown destination address from a load balance port and will therefore trigger the type 2/type 1 query combination discussed herein to find the best path. Since the path that is currently dropping packets will typically not be the best path at the present time due to cost computation adjusting rapidly for dropped packets, this method works well for load balancing among the switches. Additionally, since the time required to locate a new path is typically much longer then the time required to empty a transmit queue, out of sequence packets will not be a problem. Note that the MAC address to delete should have a lower cost path at this point in time and must not be one where the only other alternate path is also dropping packets. Otherwise, MAC addresses will be continually moved. The preferred embodiment and best presently known mode of implementing this method moves up to 1 MAC address per second when this congestion scenario arises.

3.6. Packet Forwarding
3.6.1. Unknown Source, Broadcast Destination

A new source MAC address with a broadcast/multicast destination MAC address is probably the most common case of the unknown source cases (at least for most commonly used level 3 protocols). When this type of packet is received on a port not in the load balance domain, then the packet is queued and the appropriate MAC address information packet is sent out on the broadcast paths. The packet is then forwarded out the broadcast path (including local ports not in the load balance domain but within the VLAN of the packet). If any unicast packets for this source happened to be received, then they too would be queued as described in the MAC address information section above, or simply be dropped to avoid the problems of preventing out of sequence unicast packets.

In the rare case where the source address is received as a destination MAC address in another packet while waiting for the ACKs, the implementation should forward the packet to the correct destination. However, this may be handled like the unknown destination case where the packet is either dropped (simple implementation) or queued until the address has been learned (optional but more advanced method). (See the unknown destination cases below). If a packet with this new destination MAC address is received at the CPU after the ASIC has been programed to handle it, then this packet was queued before the ASIC was programmed. In this case, the packet should be dropped to prevent out of sequence packets.

If this type of packet is received on a port in the load balance domain, then for some reason this switch missed the MAC address information packet that was originally sent. This switch may have booted after the MAC address was learned or timed out the source MAC entry, or the packet beat the MAC address information packet. In these cases, the switch must queue the packet and issue a type 2 query to find out the associated edge switch. It cannot forward the packet since it does not know the broadcast path to use until it knows the associated edge switch.

The query packet is constructed and sent back out the port the broadcast was received on since the adjacent switch that forwarded the packet must know the edge switch associated with the unknown source MAC. The source MAC address in the ACK tells the switch who the edge switch in question is. At this point, it can forward the broadcast since it knows the broadcast tree for the edge switch and hence broadcasts from the source. Before it can enter this MAC address in its MAC address table, it must pick the current best path to the edge switch and, to be absolutely sure that no loops exist, it must send out a type 1 query with this source MAC address. When the ACK from the type 1 query is returned it can add the entry. Note, the type 1 query in this case will not have the update cost flag set because no broadcast path need be rebuilt.

The path used for the type 1 query is picked based on the best current port load factor, just as in the case of the downed link. However, the best path in this case should be found right away since the chance that the path would loop back to the query sending switch is very small. Only if this switch timed out the MAC entry, its adjacent switches did not, and the current path is very different from the path established when the source was originally learned is there a chance that it could loop back to this switch. In any case the type 1 query and associated procedures prevents loops in this small corner case. If a MAC address information packet is received before the type 2 query ACK, then the switch can immediately forward and add the address to its table and does not need to issue the type 1 query. This may happen if the packet beats the MAC address information packet.

The unknown source multicast destination is also handled as described above.

3.6.2. Unknown Source, Known Unicast Destination

A new source MAC address with a known unicast destination MAC address can occur when one switch has timed out a MAC address but the end host or adjacent switch has not. When this type of packet is received on a port not in the load balance domain, then the packet is queued and the appropriate MAC address information packet is sent out on the broadcast paths. The packet is then forwarded on its way and the switching ASIC is programed.

Since this packet is relatively rare, an implementation may chose to only forward the first packet of this type from a given source and drop the rest, rather than queuing it for transmission before programing the ASIC. This reduces the chance of out of sequence unicast packets even if the completion interrupt for the transmission is not waited for. For example, a unicast IP ARP reply (the Address Resolution Protocol of the TCP/IP protocol standards) may have an unknown source address, so sending the first instance through would be critical to connectivity but sequencing would not. The same could happen temporarily on IPX RIP replies and NSQ replies if the IPX server had just come up.

In these unicast cases there would be no out of sequence problem so the implementation could freely forward these and not wait for a completion interrupt before programing the ASIC. This would require the code to either now look at specific packet types before making the decision to forward or drop, or always forward the first unicast of this type. If the MAC address is received as a destination MAC address in another packet after the address has been set up in the ASIC, then the procedure described in the broadcast case above for this situation should be used.

If this type of packet is received on a port in the load balance domain, then for some reason this switch missed the MAC address information packet that was originally sent (or it was delayed). In this case the switch can immediately forward the packet, since its knows the destination path, and issue a type 2 query to find the associated edge switch. The query packet is constructed and sent back out the port the unicast packet was received on since the adjacent switch that forwarded the packet must know the edge switch associated with the unknown source MAC.

The source MAC address in the ACK tells the switch who the edge switch in question is. Before it can enter the unknown source MAC address in its MAC address table, it must pick the current best path to the edge switch. To be absolutely sure that no loops exist, it must send out a type 1 query with this source MAC address.

When the ACK from the type 1 query is returned, the switch can add the entry. Since the ASIC will automatically forward packets with this source address and a known destination, any queued packets must be completely sent before the MAC address is programed in.

As with the broadcast case above, the path used for the type 1 query is picked based on the best current port load factor. The reception of the MAC address information before the reception of the type 2 query ACK allows the switch to immediately add the address to its table and removes the need for issuing a type 1 query. If the result of the type 2 query indicates that the switch sending the type 2 query is the destination for the unknown source, the switch should initiate the discovery process described below for unknown unicast destination addresses not received on the load balance port.

3.6.3. Known Source, Unknown Unicast Destination

The reception of unicast packet with an unknown destination MAC address should be very rare. This can only happen when an end system knows the MAC address of a destination and the switch does not. To create this situation, each switch has timed out the destination MAC address before the end system, or a switch has been re-booted and is in the path of the destination.

In a standard switch, this type of packet is flooded. Flooding of unicast packets within the load balance domain is not done, so the switch must discover the location of the MAC address. The simplest way is to only flood the packet out non-load balance ports. If the destination is across another switch, the end system will eventually re-issue a broadcast packet to discover the location of the end system. This method should work for IP and IPX traffic since broadcasts are used to discover the MAC addresses of hosts. Since this event should be rare, this simple method may be acceptable in some cases.

3.6.3.1. Unknown MAC Address Destination Discovery

An alternate and better approach is to queue the packet and proactively find the unknown destination. There are two cases to look at here, one where the unknown destination comes from a load balance link, and the other where it is received on a non-load balance link.

The first case is handled much like the unknown source case. Since an unknown unicast destination is never flooded within the load balance domain, any switch that forwards it must know the associated edge switch. Therefore it can issue a type 2 query to find the edge switch. Unlike the unknown source case, it can not forward the packet until it has tested the path with a type 1 query. Once the ACK for the type 1 query has been received, the switch can forward the packet.

In the degenerate case where the type 2 query return indicates that the initiating switch is itself the edge switch, it can flood the packet out all the non-load balance ports and no type 1 query is needed. It should also trigger the type 3 discovery process described below should the MAC address have been moved to another switch. In the corner case were the switch was setting up the MAC address from the source being received, but had not yet programed the ASIC because, for example, it was waiting for the MAC address information ACKs, it can immediately forward the packet to the correct port or optionally drop it. Dropping it in this case is probably acceptable since this should be a very rare corner case.

In the case where the unknown destination originates from a non-load balance link, the switch has no idea which if any switch knows the location of the MAC address. In this case the switch will send out a type 3 query. This packet is sent out all the broadcast paths within the load balance domain. On every port not in the load balance domain, it will send out an IEEE 802.2 test packet. The type 3 query contains the VLAN ID of the source of the unknown destination MAC address. If the test packet is responded to, then a MAC address learn is generated by the switch that received the response. If the packet was an IP protocol packet, the switch should issue an ARP request on all ports in the VLAN for the unknown destination MAC address. This is more robust than the IEEE 802.2 test packet since not all end systems (hosts) respond to the test packets.

The idea is that if the MAC address is out there, it can be found. When the type 3 query is received, it will be propagated down the broadcast path within the load balance domain. If a switch receiving the type 3 query knows about the MAC address, it will still forward the packet down the broadcast paths. However, it will not send the IEEE 802.2 test packet out on the non-load balance links.

If a switch receiving the query is the edge switch for the MAC address in question, it will not forward the query or send out the IEEE 802.2 test packet. Instead, it will issue a new MAC address information packet for the address. When the switch that queued the packet has processed the MAC address information packet, it can forward the packet (or packets if several were queued).

Note that the type 3 query differs from the type 4 query in that the type 4 query is targeted at a specific edge switch (destination MAC address is that of a specific edge switch) and its reception will never trigger the sending of an IEEE 802.2 test packet. Both, however, will trigger then sending of a MAC address information packet if they are the edge switch attached to the unknown MAC address passed in the query packet.

A simplification of the above procedures is possible if the packet is always dropped but the discovery process is engaged. In the case of the unknown destination from a non-load balance port, the unknown destination MAC address may never be learned. Therefore if the packet is queued, a timer would be required to eventually drop it. To prevent the possible down sides of sending great numbers of unknown destination packets, an implementation may want to limit the rate at which it would send out IEEE 802.2 test packets for discovery.

Since it is always undesirable to receive a unicast packet with an unknown destination MAC address, the MAC address time-out value for a load balancing switch should be large (greater than the host timeout values) to minimize the chance of this type of packet.

For the IP protocol, the switch receiving the unknown destination address from outside the load balance domain could choose to also send out an ARP broadcast (much as a router would). This would generate a response for the unknown destination should the end system not support IEEE 802.2 test packets. Note that if the switch doesn't have an IP address it could borrow the IP address from the source packet that contained the unknown destination address. In this case however, the switch must be careful not to send the ARP back down the path the unknown destination came in on otherwise the host that initiated the original packet may assume that the IP addresses have been configured in the system. As in the case of the test packets, the ARP must be targeted for the VLAN of the source of the unknown destination MAC address.

3.6.4. Unknown Source, Unknown Unicast Destination

Like the other MAC address cases above, this case can be broken into two situations, one where the packet is received on a load balance link, and one where it is received on a non-load balance link. In the non-load balance link case, the switch would issue a MAC address information packet for the source address, just as in the known destination case. The queued packet is not transmitted on reception of the ACK packets. After sending the MAC address information packet the procedure for the unknown destination for a non-load balance link is followed. The simple method here would be to flood the packet out on the other non-load balance links.

When the packet is received on a load balance link, two type 2 queries are issued for each MAC address. These are followed by two type 1 queries to make sure that the paths formed do not loop. If the packet is queued, it must not be forwarded until the ACK is received for the type 1 query used to set up the destination MAC address path. As above, a simplification may be had by never queuing (always dropping) this type of packet, particularly when the packet is received from a non-load balance port.

3.6.5. Known Source Moves

Should a packet with a known source MAC address and VLAN ID be received on a non-load balance port of a switch that was not originally associated with the MAC address, then the source address has moved. The switch that receives the packet should issue a log and/or an SNMP trap for the event and then send out a MAC address information packet as in the case of the unknown source address.

If the VLAN ID is different than the current switch, then the duplicate MAC address is allowed if the switch supports duplicate MAC addresses in its MAC address table. In this case, it would be handled as a new source MAC address. If the VLAN ID is the same, or the switch does not support duplicate MAC addresses, the MAC address table is updated.

If the edge switch is the same but the non-load balance port has changed, no MAC address information packets need to be sent if the VLAN ID is the same. In this case, the MAC address table is updated on the local switch and a log and/or SNMP trap should be sent to inform the user that the MAC address has moved.

4. Technology Background 4.1 VLAN Considerations

When load balance switches learn about MAC addresses outside the load balance domain, they propagate the MAC information packets to all the other load balance switches. One piece of this information is the VLAN to associate the MAC address with. This tag information is determined either by the port the packet was received on in the case if port based VLANs, or the tag in the packet if the packet arrived at the switch using IEEE 802.1q tagging.

The MAC address information packet passes this information out to other switches in the load balance domain so that a switch receiving this MAC address in a packet will identify the VLAN and priority. When tagging is done, the tag should be used when the packet is received. Note that in a fully tagged switch to switch environment the VLAN and priority information packet in the MAC address information are not needed. The switch in this case should use the information in the VLAN tag.

Since the ports in the load balance domain are members of all VLANs, the question arises as to whether a packet destined for a host in one VLAN from a host in another VLAN should be stopped at the initial load balance switch or the final load balance switch. Although it makes sense to stop the packet as early as possible from a network loading point of view, this may entail extra logic in the initial switch and may not be worthwhile for this very rare corner case.

Figure 29:
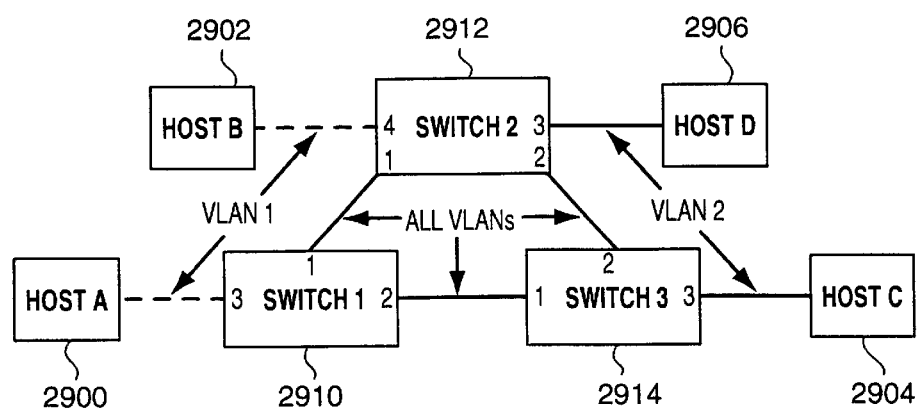
FIG. 29 depicts a network of switches operable in accordance with the present invention and host systems wherein VLAN standard switching techniques are integrated with the load balancing protocols of the present invention.

FIG. 29 clarifies this issue. If Host 2900 and Host 2902 are in the same VLAN (VLAN1), Host 2904 and Host 2906 are in another VLAN (VLAN2), and Host 2900 sends a unicast packet directed at Host 2904, the packet should be dropped. However, when switch 2910 receives the packet from Host 2900, it will check which ports it can send packets from VLAN1 on. Since the load balance domain lines are members of all VLANs, the packet can go out port 2 towards switch 2914. Switch 2914 would then determine which ports it can send VLAN1 packets on. Since the route to Host 2904 is now only on a port that is in VLAN2, the packet will be dropped. Although it might be more efficient if switch 2910 had noticed that Host 2904 was in a different VLAN and drop the packet initially, most switch architectures only check whether the destination port is in the correct VLAN. Since the destination port is in all VLANs for switch 2910, the packet would be forwarded.

To drop the packet at switch 2910 would require switch 2910 to check the VLAN of the destination MAC address against the VLAN of the source MAC address. Although this may be desirable, it is probably not worth the extra effort. This case should be very rare since Host 2900 would typically have to send some type of broadcast packet to initially find the MAC address of Host 2904. Since the broadcast would not be sent out port 3 of switch 2914, Host 2900 could never learn the MAC address of Host 2904 in the first place.

When Group Virtual LAN Membership Resolution Protocol (IEEE GVRP GARP—Generic Attribute Registration Protocol) is used, its packets would follow the broadcast tree within the load balance domain (its destination address is a multicast address). Since GVRP indicates the VLANs connected to each switch, it may be possible to remove some VLANs from some of the load balance links. To do this, the load balance code would need to keep track of which switches supported which VLANs. When a non-looped (a legitimate alternate path) cost packet for a given switch arrives, the receiving switch would need to associate all those VLANs with that load balance port.

By not forcing all the load balance ports to be in all VLANs, some efficiency may be gained since the sending switch can immediately drop some packets that would try to cross VLAN boundaries. This would be particularly true if a separate broadcast trees were setup per edge switch per VLAN. In this case, broadcast and multicast packets would be limited to only going down ports were they are necessary. Making multiple broadcast trees would mean that multiple GVRP packets would need to be sent out the different ports depending on the VLANs included on those ports.

If VLAN inclusion is to be limited by using GVRP information, then the source MAC address used by GVRP on a given switch and sent down the load balance links must be the same as the source MAC address used in the load balance protocol. This is necessary so that the VLANs received for a given switch can be identified with the switch.

Normally the GVRP protocol would indicate by its reception which VLANs are supported on a given port. However, in the load balance case this must be extended to include all alternate ports to this switch, not just the port the GVRP packet was received on.

4.2 IGMP Considerations

IGMP packets are used to indicate which hosts wish to receive specific multicast addresses. This can be used by switches to filter multicast packets from ports that do not require the packet. In the case of load balancing, if any port in the mesh topology requests a given multicast address, then all ports in the mesh should be sent the those packets (much like a trunked port). In no case should MAC address 01-00-5E-00-00-01 be filtered since this is the MAC address that IP address 224.0.0.1 rides on. This is the all IP hosts address that is used by IGMP (See RFC 1700 Assigned Numbers RFC for more information).

From an IGMP point of view, it is probably easiest for it to treat all the load balance ports as a single logical port, much in the same way as it would a trunk port. The main difference between this and a trunked port is that IGMP protocol and multicast packets would only be sent out one physical port of a trunked port, but may be sent out several physical ports in the load balance domain (as would any other broadcast or multicast packet). This, however, should be kept transparent to IGMP and be the job of a load balance module that should already exist to forward broadcast packets.

The main implementation consideration will occur with respect to the module that controls port status (from here on referred to as Port Manager). As the first port comes up in the load balance domain (hello established state), the load balance code will need to inform the Port Manager that the logical load balance domain is up. The port that was previously not in the domain now would be gone from an IGMP point of view. The Port Manager would therefore inform IGMP that a port had come up (the load balance domain) and a port had gone down (the port that previously was not in the load balance domain).

As further ports enter the hello established state, they too would appear to go down from an IGMP point of view, and tracking this would be the job of the Port Manager, which will need to understand the concept of a load balance port and inform modules about the port status. One consequence of this method is that if any switch in the domain requests a given multicast address, then all the switches in the domain will receive it and the blocking would then occur on only the non-load balance ports.

Note that in a non-fully meshed network, it is possible to use IGMP to filter multicast packets on some load balance ports and not others. This will require that the implementation compare which MAC address requested a given multicast address and then filter the multicast address on load balance ports that do not have access to the MAC address in question. However, since connectivity in the load balance domain is dynamic, an implementation may choose to never filter the multicast addresses on load balance ports and always treat the load balance domain as a single logical port.

4.3 Filtering Across Load Balancing Switches

Although implementations may allow filtering of different types on load balance switches, care must be taken on those ports that are in the load balance domain. For example, if an AppleTalk filter is applied to one port in the load balance domain and not another, then AppleTalk traffic could still get to the end station depending on the load balance port taken by the traffic.

In general, the load balance ports can be treated as one would treat a trunked port. If a filter is set up for one port, it should be set up for all load balance ports. The one difficulty that arises is that load balance ports can dynamically enter or exit the load balance domain. It is recommended that filter configuration include a construct that defines filters for load balance domain ports. These filters would apply to all ports in the load balance domain. If a port enters the load balance domain, then filters previously specified for the port would be disabled and it would inherit the filters specified for load balance ports. If a port exits the load balance domain, then it would lose the load balance filters and use filters specified for the port.

Figure 30:
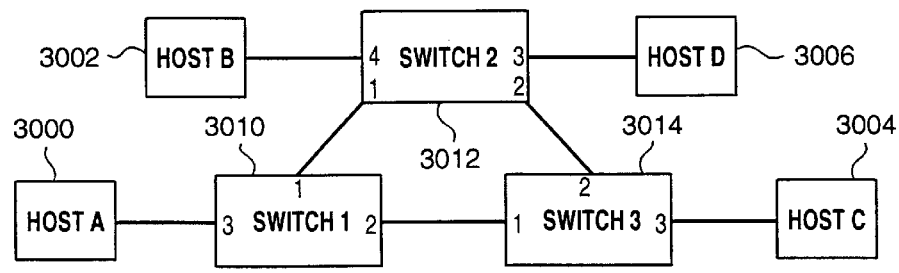
FIG. 30 depicts a network of switches operable in accordance with the present invention and host systems wherein VLAN standard switching techniques are integrated with the load balancing protocols of the present invention.

If the filtering spans across switch boundaries, then no filtering should be done on the load balance ports. The filters instead must be applied to the non-load balance ports of the individual switches. For example, with reference to FIG. 30, if Host 3000 was allowed to talk to Host 3006, but not Host 3002 or Host 3004, a source MAC address filter would need to be added for Host 3000 on switch 3012 port 4 and switch 3014 port 3.

Figure 31:
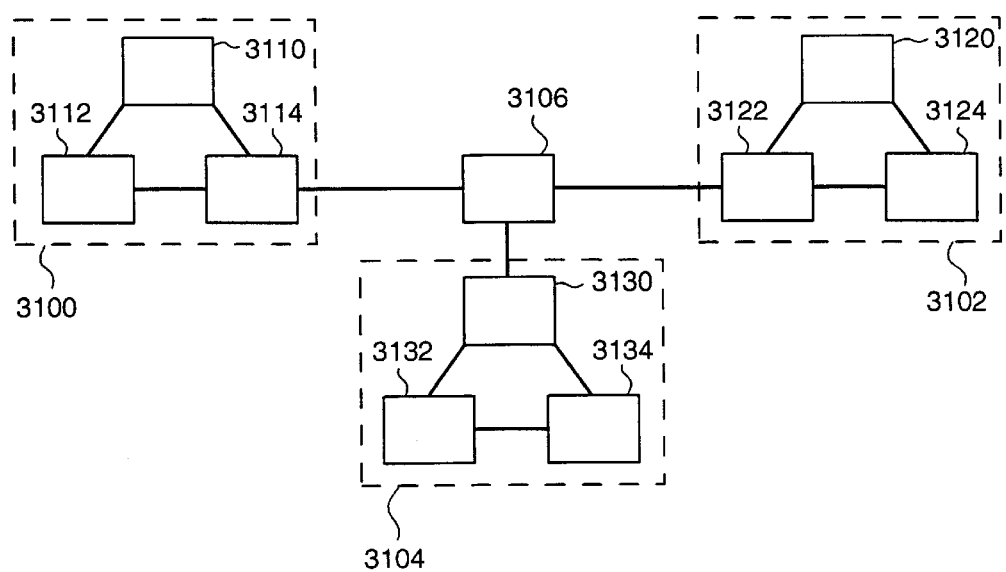
FIG. 31 depicts a typical connection of multiple load balancing domains through a common non-load balancing switch.

4.4 Detection and Correction of Non-load Balance Devices Interconnecting Different Load Balance Domains FIG. 31 illustrates a situation where a non-load balance device interconnects multiple load balance domains. From the switches' point of view this appears much like the case of a non-load balance device connecting multiple ports in the same load balancing domain.

The solution described above in section 3 closes ports when multiple different hello sources are received on the same port. This solution will work for the single load balance domain, but in the multiple load balance domain this would cause loss of connectivity between the domains. There are two solutions to this scenario, one that requires user configuration and the other that is automatic.

The easy solution is to have the user configures those ports that interconnect several different load balance domains. This configuration parameters would force the interconnected ports to sit in the load balance not established state, except that these ports would never send out any hello packets. Spanning-tree protocol should be enabled on all switches if redundant links are allowed to interconnect the domains.

The automatic solution requires that the load balance domain switches block ports as described above in section 3 when multiple different hello sources are detected on the same port. They then compare the switch ID of the cost packets received with the switch ID (MAC addresses) of the multiple hello packets received. If a cost packet with the same ID is received, then this is indeed a loop within the load balance domain and should be blocked. If it is not received within a 30 second period, then this is a link between different load balance domains and the link should be allowed to forward traffic.

4.5 Using Spanning-tree and the Load Balancing Protocol

In several situations, it may still be desirable to run the spanning-tree protocol along with the load balance protocol. These situations occur when an implementation wishes to allow the connection of non-load balance devices to create redundant connections through the load balance domain, but does not support all the optional loop correction mechanisms discussed. Using spanning-tree protocol also allows for the creation of separate load balance domains as described in section 4.4 above with the addition of redundant paths between the different domains.

Using spanning-tree with the load balance protocols of the present invention entails a few modification/considerations. The main implementation consideration will relate to the Port Manager that controls port status (as defined earlier). From the spanning-tree point of view, the load balance ports would appear as a single logical port. The main difference between this and a trunked port is that a spanning-tree packet would only be sent out one physical port of a trunked port, but may be sent out several physical ports in the load balance domain (as would any other broadcast or multicast packet). This, however, should be kept transparent to spanning-tree and be the job of a load balance module which should already exist to forward broadcast packets.

As the first port comes up in the load balance domain (hello established state), the load balance code will need to inform the Port Manager that the logical load balance domain is up, the port that was previously not in the domain now would be gone from a spanning-tree point of view. The Logical port manager would therefore inform spanning-tree that a port had come up (the load balance domain logical port) and a port had gone down (the port that previously was not in the load balance domain). As further ports enter the hello established state, they too would appear to go down from a spanning-tree point of view and this would be the job of the Port Manager, which will need to understand the concept of a load balance port and to inform modules about the port status. Note that as the port enters the load balance established state and becomes part of the load balance domain, no further up messages are sent to spanning tree as the logical port that is the load balance domain is already up.

This could also have ramifications on port status screens since they should be shown as being in the load balance domain and not as downed ports. Since the load balance domain connects to potentially many switches, this path should never be brought down by spanning-tree. Therefore the spanning-tree cost of the logical port that is the load balance domain must have the lowest cost of any spanning-tree path. Note that if all ports in a given switch enter the load balance domain (the switch is not an edge switch), then this should appear as a switch with one logical port from spanning-tree's point of view.

Since Spanning tree sums path costs from the root switch, it may be possible for the load balance path to appear as a higher cost path in some configurations depending on which switch becomes the root. To prevent this scenario, the code in a load balance switch must dynamically increase the cost of any non-load balance ports that have been put into the forwarding state if the load balance port has been blocked by spanning tree protocol. In most spanning tree implementations this should be fairly easy since the switch will know when it is putting the load balance port into the blocked state and will know what the alternate path and cost is. It will then only need to increase the cost of the non-load balance port to be more expensive. This in turn will trigger a topology change notification with spanning tree. From this point the spanning tree protocol will automatically block the non-load balance port and put the load balance port into the forwarding state. This process will however take the normal spanning tree convergence time once the cost has been corrected.

The reception of spanning tree packets on a load balance port has one effect that the implementor must consider. Since spanning tree packets are sent on a multicast address and are absorbed by the receiving switch, the implementation must allow a spanning tree packet received on a load balance port to be broadcast out other load balance ports based on the broadcast tree of the source of the packet (i.e. based on the broadcast tree set up for the transmitting switch). Since the ASIC on the receiving switch would typically not forward this packet but pass it up to the CPU, the software must perform the task of retransmitting the original received packet out the pruned broadcast tree as necessary. The receiving switch CPU would then regenerate the spanning tree packet out other non load balance ports using the port address as per the spanning tree protocol definition.

To make implementation easier a switch that initially transmits a spanning tree packet into the load balance domain should probably use the load balance switch ID (Default VLAN MAC address) as the source address of the spanning tree packet. In this way all the switches that receive the packet will not see it as an unknown source address. (remember the source address must be known to find the broadcast path).

A subtle interaction between spanning tree and load balancing exists when a switch in the load balance domain is completely severed from the domain, yet has an alternate route back to another load balance switch via non-load balance ports. In this case spanning tree will put the previously blocked non-load balance port into the forwarding state. This will allow the traffic to continue to flow and the path to some MAC addresses that was once reached via the load balance domain will now be learned on the non-load balance port. Other load balance switches will also potentially learn MAC addresses that they use to reach over the load balance domain over non-load balance ports. Now if the load balance connectivity is restored, MAC addresses may be left pointing to non-load balance ports or to the wrong edge switch for other switches connected to the load balance domain. Unfortunately somewhere along this path STP may now be blocking the path once the original load balance port that was broken is brought back up. This in turn can lean to packets being black holed since the wrong load balance switch will appear to be the edge switch for some MAC addresses. This situation will clear when either the MAC address(es) timeout or when these addresses send packet and the correct path is then relearned. To speed this process up, it would be good to flush (have a short timeout) for the switch MAC addresses when a load balance switch either connects for the first time or reconnects after being severed from the load balance domain. To trigger this short timeout the current implementation uses bit 2 of the reserved bits to indicate a flush should be done when the first cost packet is sent out and STP is enabled. Switches that receive this cost packet will then use the short timeout to clean out MAC addresses that are pointed the wrong way. Those addresses that send packets before the timeout are not flushed.

Another place where direct interaction between spanning tree and load balance may take place is on ports outside the load balance domain. If an implementation allows the load balance switch to detect external loops with the hello protocol and corrects those loops by blocking one or more ports, then spanning tree should not attempt to block on those ports. Probably the easiest automatic way to implement this is to always give one protocol precedence over the other.

Another way to handle this would be to have the load balance protocol go into load balance not established state whenever one of the loop situations or illegal situations occur and spanning tree is enabled on the switch. It would then NOT send out load balance hello packets and let spanning tree shutdown any redundant links. If at a later time spanning tree is disabled a message could be sent to the load balance protocol state machine to resume sending hello packets so that it will block illegal situations itself (see section 3.2 for details on illegal situations). The non-automatic approach would be to have the load balance protocol bring down links were illegal configurations exist and force the user to de-configure load balancing on those ports and enable spanning tree.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method operable within a network switch for determining costs associated with communication to other network switches and device through ports of said network switch, said method comprising the steps of:

computing periodically, within said network switch, a port latency value associated with operation of a port of said network switch, the port latency value equal to a queue depth of data stored in at least one queue associated with said port divided by a data transfer speed associated with a port of the network switch; and computing periodically, within said network switch, a port load factor cost value as a ratio of said port latency value and the available throughput of said port.

2. The method of claim 1 wherein the step of computing a port latency value comprises the step of:

computing a weighted average of a present port latency value and prior port latency values associated with operation of a port of said network switch.

3. The method of claim 2 wherein the step of computing said weighted average comprises the step of:

computing said weighted average as:

(present port latency value+(15×previous port latency value))/16.

4. The method of claim 1 wherein the step of computing a port load factor value comprises the step of:

computing a weighted average of a present port load factor value and at least one previously computed port load factor value.

5. The method of claim 4 wherein the step of computing said weighted average comprises the step of:

computing said weighted average as:

(present port load factor value+(15×previous port load factor value))/16.

6. The method of claim 1 wherein said available throughput is determined as the port speed of the slowest port on a path associated with said port of said network switch.

7. The method of claim 1 wherein the step of computing a port latency value comprises the steps of:

determining a queue depth as the amount of data stored in at least one queue associated with said port; and dividing said queue depth by a data transfer speed associated with a port of said network switch to generate the port latency value.

8. The method of claim 7 the step of determining a queue depth comprises the step of determining the depth of an outbound queue associated with said port and wherein said data transfer speed is the speed of outbound transfers on said port.

9. The method of claim 1 wherein the method further comprises the steps of:

receiving a cost packet from a first other network switch via a first port of said network wherein the steps of computing a port latency value and computing a port load factor are responsive to receipt of said cost packet;

updating information in said cost packet as a function of said port latency value; and forwarding said cost packet to a second other network switch via a second port of said network switch.

10. The method of claim 9 wherein the step of computing said port latency value comprises the steps of:

determining an outbound port latency value associated with said first port;

determining an inbound port latency value associated with said second port; and combining said inbound port latency value and said outbound port latency value to generate said port latency value.

11. The method of claim 10 wherein the step of determining said outbound port latency value comprises the steps of:

determining an outbound queue depth as the amount of data stored in an outbound queue associated with said first port; and dividing said outbound queue depth by a data transfer speed associated with said first port to generate said outbound port latency value.

12. The method of claim 11 wherein the step of determining said inbound port latency comprises the steps of:

determining an inbound queue depth as the amount of data stored in an inbound queue associated with said second port; and dividing said inbound queue depth by a data transfer speed associated with said first port of said network switch to generate said inbound port latency value.

13. The method of claim 11 wherein the step of determining said inbound port latency comprises the steps of:

determining an inbound queue depth as the amount of data stored in an inbound queue associated with said second port;

selecting another port having the fastest speed of all ports of said network switch known to be usable to forward packets to said first other network switch dividing said inbound queue depth by the data transfer speed associated with said another port of said network switch to generate said inbound port latency value.

14. The method of claim 1 further comprising the steps of:

determining a quantity of dropped data as a quantity of data dropped by said network switch from queues associated therewith; and increasing said port latency value in accordance with said quantity of dropped data.

15. The method of claim 14 wherein the step of determining a quantity of dropped data includes the step of:

determining a drop rate as a percentage of said quantity of dropped data as compared to a quantity of data transmitted from said network switch, and wherein the step of modifying said port latency value includes the step of:

multiplying said port latency value by the quantity $(2^{(said\ drop\ rate/10)})$.

16. The method of claim 1 wherein said network switch includes a plurality of ports logically grouped as a trunked port and wherein the method further comprises the step of:

distributing packets to said plurality of ports in said trunked port in accordance with said port load factor of each port of said trunked port.

17. The method of claim 16 wherein the step of distributing comprises the step of:

distributing said packets to said plurality of ports in said trunked port in inverse proportion to said port load factor of said each port.

18. A network switch including a computer readable storage medium tangibly embodying a method operable within said network switch for determining costs associated with communication to other network switches and device through ports of said network switch, said method comprising the steps of:

computing periodically, within said network switch, a port latency value associated with operation of a port of said network switch, the port latency value equal to a queue depth of data stored in at least one queue associated with said port divided by a data transfer speed associated with a port of the network switch; and computing periodically, within said network switch, a port load factor cost value as a ratio of said port latency value and the available throughput of said port.

19. The system of claim 18 wherein the method step of computing a port latency value comprises the step of:

computing a weighted average of a present port latency value and prior port latency values associated with operation of a port of said network switch.

20. The system of claim 19 wherein the method step of computing said weighted average comprises the step of:

computing said weighted average as:

(present port latency value+(15×previous port latency value))/16.

21. The system of claim 18 wherein the method step of computing a port load factor value comprises the step of:

computing a weighted average of a present port load factor value and at least one previously computed port load factor value.

22. The system of claim 21 wherein the method step of computing said weighted average comprises the step of:

computing said weighted average as:

(present port load factor value+(15×previous port load factor value))/16.

23. The system of claim 18 wherein said available throughput is determined as the port speed of the slowest port on a path associated with said port of said network switch.

24. The system of claim 18 wherein the method step of computing a port latency value comprises the steps of:

determining a queue depth as the amount of data stored in at least one queue associated with said port; and dividing said queue depth by a data transfer speed associated with a port of said network switch to generate the port latency value.

25. The system of claim 24 the step of determining a queue depth comprises the step of determining the depth of an outbound queue associated with said port and wherein said data transfer speed is the speed of outbound transfers on said port.

26. The system of claim 18 wherein the method further comprises the steps of:

receiving a cost packet from a first other network switch via a first port of said network wherein the steps of computing a port latency value and computing a port load factor are responsive to receipt of said cost packet;

updating information in said cost packet as a function of said port latency value; and forwarding said cost packet to a second other network switch via a second port of said network switch.

27. The system of claim 26 wherein the method step of computing said port latency value comprises the steps of:

determining an outbound port latency value associated with said first port;

determining an inbound port latency value associated with said second port; and combining said inbound port latency value and said outbound port latency value to generate said port latency value.

28. The system of claim 27 wherein the method step of determining said outbound port latency value comprises the steps of:

determining an outbound queue depth as the amount of data stored in an outbound queue associated with said first port; and dividing said outbound queue depth by a data transfer speed associated with said first port to generate said outbound port latency value.

29. The system of claim 28 wherein the method step of determining said inbound port latency comprises the steps of:

determining an inbound queue depth as the amount of data stored in an inbound queue associated with said second port; and dividing said inbound queue depth by a data transfer speed associated with said first port of said network switch to generate said inbound port latency value.

30. The system of claim 28 wherein the method step of determining said inbound port latency comprises the steps of:

determining an inbound queue depth as the amount of data stored in an inbound queue associated with said second port;

selecting another port having the fastest speed of all ports of said network switch known to be usable to forward packets to said first other network switch dividing said inbound queue depth by the data transfer speed associated with said another port of said network switch to generate said inbound port latency value.

31. The system of claim 18 wherein the method further comprises the steps of:

determining a quantity of dropped data as a quantity of data dropped by said network switch from queues associated therewith; and increasing said port latency value in accordance with said quantity of dropped data.

32. The system of claim 31 wherein the method step of determining a quantity of dropped data includes the step of:

determining a drop rate as a percentage of said quantity of dropped data as compared to a quantity of data transmitted from said network switch, and wherein the method step of modifying said port latency value includes the step of:

multiplying said port latency value by the quantity $(2^{said\ drop\ rate/10})$.

33. The system of claim 18 wherein said network switch includes a plurality of ports logically grouped as a trunked port and wherein the method further comprises the step of:

distributing packets to said plurality of ports in said trunked port in accordance with said port load factor of each port of said trunked port.

34. The system of claim 33 wherein the method step of distributing comprises the step of:

distributing said packets to said plurality of ports in said trunked port in inverse proportion to said port load factor of said each port.

* * * * *